US011190859B2

(12) United States Patent
Menard et al.

(10) Patent No.: US 11,190,859 B2
(45) Date of Patent: Nov. 30, 2021

(54) PHOTONIC SWITCHES, PHOTONIC SWITCHING FABRICS AND METHODS FOR DATA CENTERS

(71) Applicant: AEPONYX INC., Montreal (CA)

(72) Inventors: Francois Menard, Trois-Rivieres (CA); Martin Berard, Repentigny (CA); Jonathan Briere, Terrabonne (CA)

(73) Assignee: Aeponyx Inc., Montreal (CA)

( * ) Notice: Subject to any disclaimer, the term of this patent is extended or adjusted under 35 U.S.C. 154(b) by 0 days.

(21) Appl. No.: 16/673,115

(22) Filed: Nov. 4, 2019

(65) Prior Publication Data

US 2020/0154180 A1  May 14, 2020

Related U.S. Application Data

(62) Division of application No. 15/561,191, filed as application No. PCT/CA2016/000084 on Mar. 23, 2016, now Pat. No. 10,694,268.

(60) Provisional application No. 62/136,673, filed on Mar. 23, 2015.

(51) Int. Cl.
*H04J 14/00* (2006.01)
*H04Q 11/00* (2006.01)
(Continued)

(52) U.S. Cl.
CPC ....... *H04Q 11/0005* (2013.01); *G02B 6/3518* (2013.01); *H04J 14/02* (2013.01);
(Continued)

(58) Field of Classification Search
CPC ........... H04Q 11/0005; H04Q 11/0062; H04Q 11/02; H04Q 2011/0016; H04Q 2011/003;
(Continued)

(56) References Cited

U.S. PATENT DOCUMENTS 6,577,785 B1   6/2003  Spahn et al.
6,973,269 B1  12/2005  Britz et al.
(Continued)

FOREIGN PATENT DOCUMENTS

JP        4254776 A1   4/2009
WO   2013165390 A1  11/2013

OTHER PUBLICATIONS

Chi et al., "Monolithic Wavelength Selective Switches and Cross Connects with Integrated MEMS Mirror Array", Optics East 2006, Proc. SPIE vol. 6376m pp. 63760, International Society for Optics and Photonics.
(Continued)

*Primary Examiner* — Mohammad R Sedighian
(74) *Attorney, Agent, or Firm* — Rosenberg, Klein & Lee

(57) ABSTRACT

Data center interconnections, which encompass WSCs as well as traditional data centers, have become both a bottleneck and a cost/power issue for cloud computing providers, cloud service providers and the users of the cloud generally. Fiber optic technologies already play critical roles in data center operations and will increasingly in the future. The goal is to move data as fast as possible with the lowest latency with the lowest cost and the smallest space consumption on the server blade and throughout the network. Accordingly, it would be beneficial for new fiber optic interconnection architectures to address the traditional hierarchal time-division multiplexed (TDM) routing and interconnection and provide reduced latency, increased flexibility, lower cost, lower power consumption, and provide interconnections exploiting scalable optical modular optically switched interconnection network as well as temporospatial switching fabrics allowing switching speeds below the slowest switching element within the switching fabric.

19 Claims, 44 Drawing Sheets

3500A  3500B

(51) Int. Cl.
*H04J 14/02* (2006.01)
*H04Q 11/02* (2006.01)
*H04L 12/64* (2006.01)
*G02B 6/35* (2006.01)
*G02B 6/12* (2006.01)

(52) U.S. Cl.
CPC ..... *H04L 12/6418* (2013.01); *H04Q 11/0062* (2013.01); *H04Q 11/02* (2013.01); *G02B 2006/12145* (2013.01); *H04Q 2011/003* (2013.01); *H04Q 2011/0016* (2013.01); *H04Q 2011/0039* (2013.01); *H04Q 2011/0058* (2013.01); *H04Q 2011/0073* (2013.01)

(58) Field of Classification Search
CPC ... H04Q 2011/0039; H04Q 2011/0058; H04Q 2011/0073; H04J 14/02; G02B 6/3518; G02B 2006/12145; H04L 12/6418
USPC .......................................................... 398/48
See application file for complete search history.

(56) References Cited

U.S. PATENT DOCUMENTS

| | | | |
|---|---|---|---|
| 7,283,709 | B2 | 10/2007 | Doerr et al. |
| 2002/0131673 | A1 | 9/2002 | Hung |
| 2004/0071395 | A1* | 4/2004 | Hsu et al. ................ G02B 6/35 385/22 |
| 2005/0264131 | A1 | 12/2005 | Hong |
| 2006/0127029 | A1 | 6/2006 | Lin |
| 2007/0160321 | A1 | 7/2007 | Wu et al. |
| 2010/0246617 | A1 | 9/2010 | Jones |
| 2013/0194649 | A1 | 8/2013 | Zhou |
| 2016/0033849 | A1* | 2/2016 | Mazed ................ G02F 1/3521 398/48 |
| 2016/0327751 | A1* | 11/2016 | Wu ....................... G02B 6/3584 |
| 2017/0108651 | A1* | 4/2017 | Wagener ................ G02B 6/356 |

OTHER PUBLICATIONS

Chi et al., "Silicon-Based Monolithic 4x4 Wavelength-Selective Cross Connect with On-Chip Micromirrors", Optical Fiber Communication Conference 2006, Paper OTuF1, 3 Pages, Optical Society of America.

Liu et al., "A review of MEMS external-cavity tunable lasers", Journal of Micromechanics and Microengineering, (20070000), vol. 17, No. 1, ISSN 0960-1317, pp. R1-R13.

Liu et al., "Single-/Multi-Mode Tunable Lasers using MEMS Mirror and Grating", Sensors and Actuators A: Physical, vol. 108, No. 1-3, pp. 49-54, Elsevier.

Rader et al., "Demonstration of a Linear Optical True-Time Delay Device by use of a Microelectromechanical Mirror Array", Applied Optics, vol. 42, No. 8, pp. 1409-1416, Optical Society of America.

* cited by examiner

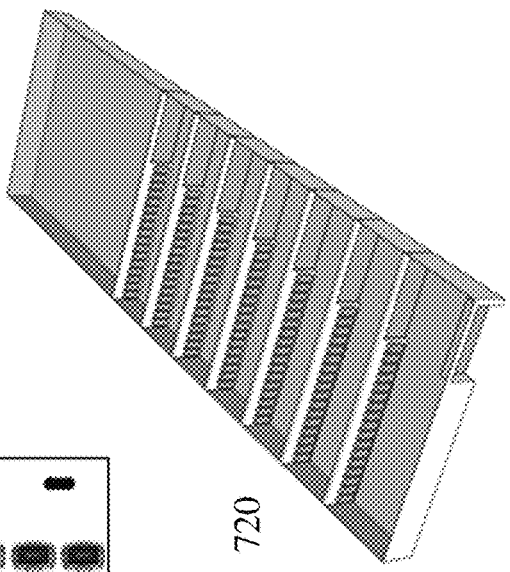
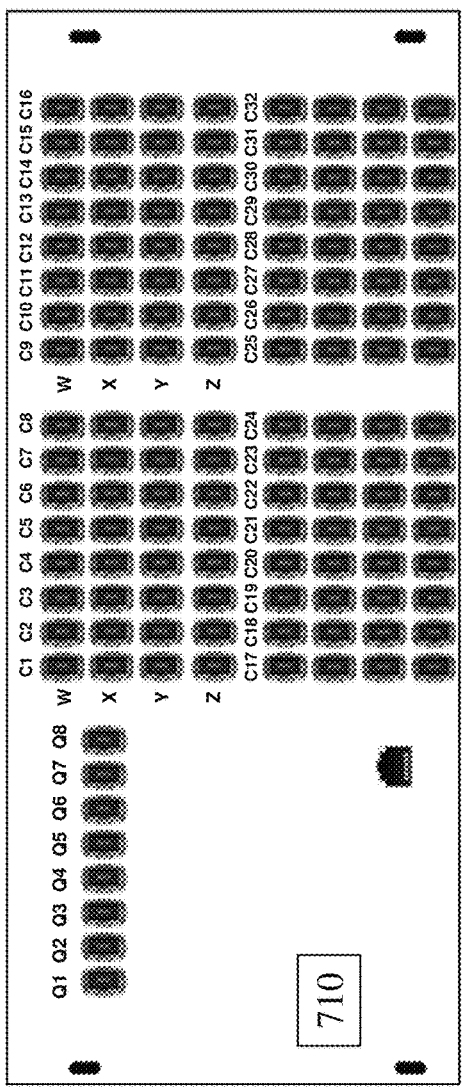
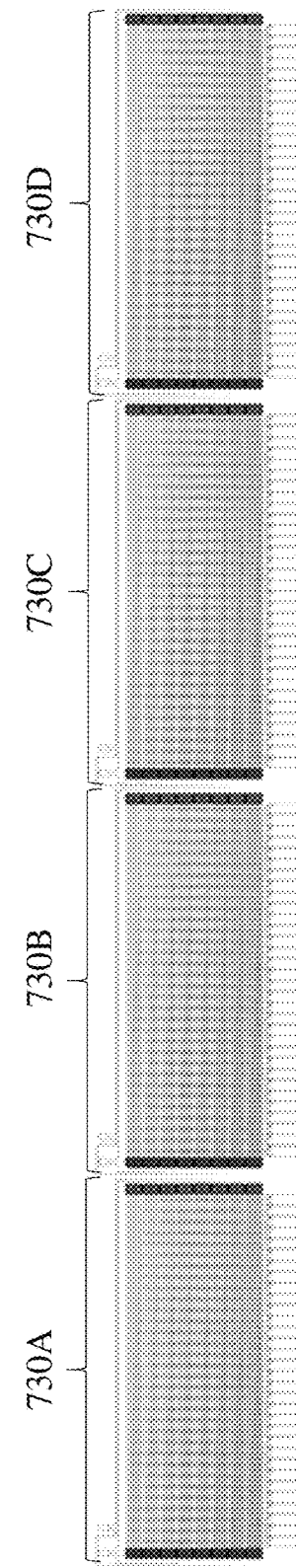
Figure 5A

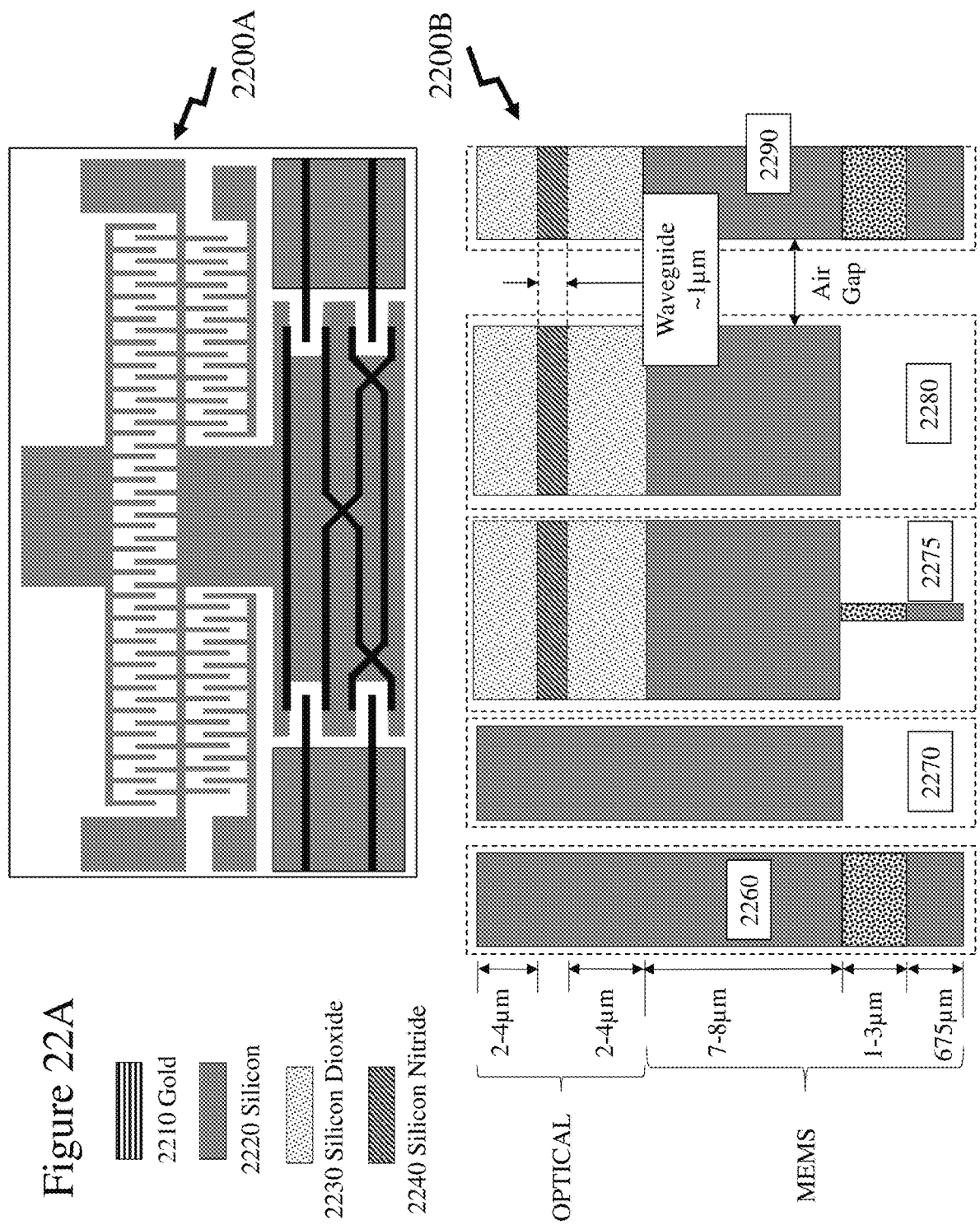

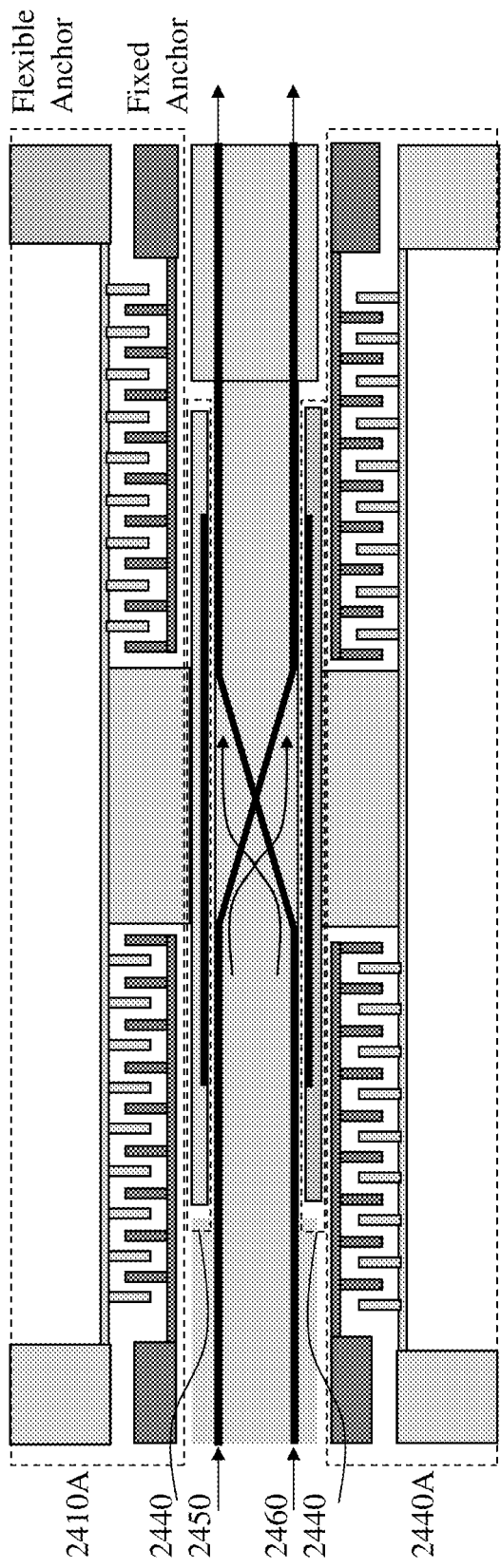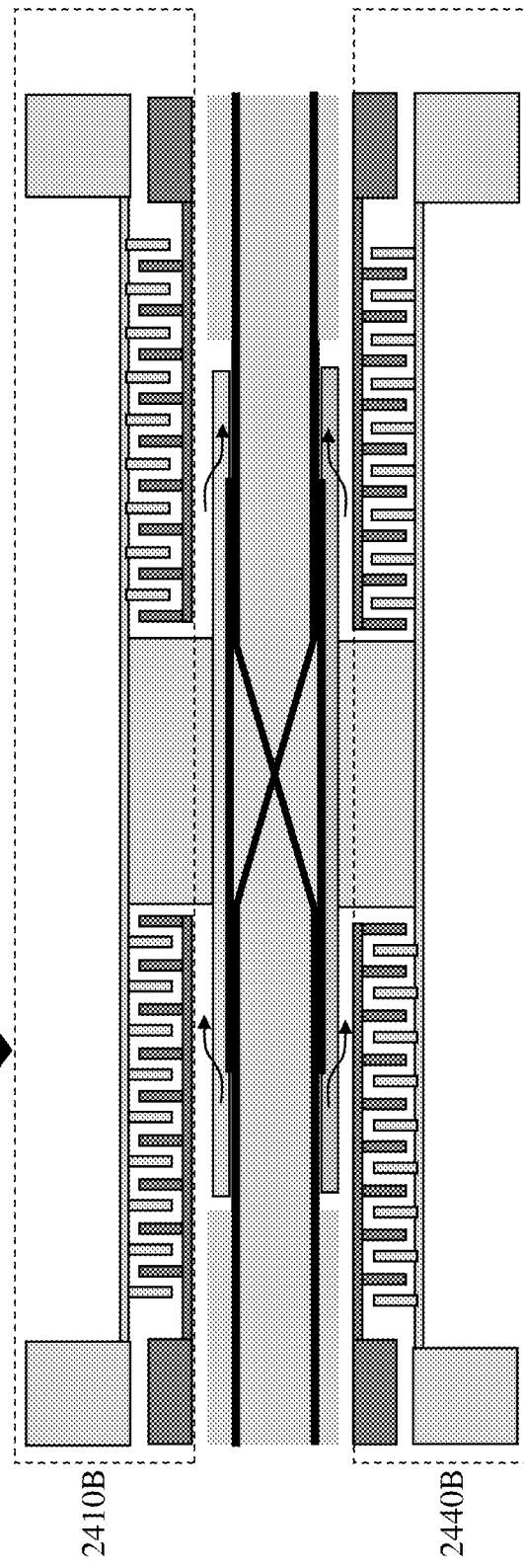
Figure 24

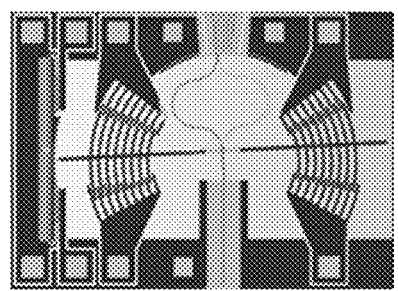
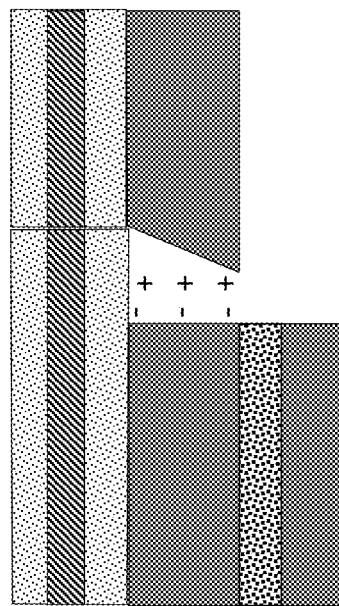
Figure 37
2210 Gold
2220 Silicon
2230 Silicon Dioxide
2240 Silicon Nitride

US 11,190,859 B2

PHOTONIC SWITCHES, PHOTONIC SWITCHING FABRICS AND METHODS FOR DATA CENTERS

CROSS-REFERENCE TO RELATED APPLICATIONS

This patent application claims the benefit of priority as a divisional application of U.S. patent application Ser. No. 15/561,191 entitled "Photonic Switches, Photonic Switching Fabrics and Methods for Data Centers" filed Sep. 25, 2017 which itself claims priority as a 371 National Phase patent application of PCT/CA2016/000084 filed Mar. 23, 2016 entitled "Photonic Switches, Photonic Switching Fabrics and Methods for Data Centers", which itself claims priority from U.S. Provisional Patent Application No. 62/136,673 filed Mar. 23, 2015 entitled "Photonic Switches, Photonic Switching Fabrics and Methods for Data Centers", the entire contents of each being included herein by reference.

FIELD OF THE INVENTION

This invention relates to photonic switches and photonic switch fabrics and more particularly to MOEMS photonic switching fabrics and photonic switching fabrics with fast and slow spatial and wavelength reconfiguration rates in combination for data center and cloud computing applications.

BACKGROUND OF THE INVENTION

Cloud computing is, strictly, a phrase used to describe a variety of computing concepts that involve a large number of computers connected through a real-time communication network such as the Internet. However, today "the cloud" or "in the cloud" generally refers to software, platforms and infrastructure that are sold "as a service", i.e. remotely through the Internet. Typically, the seller has actual energy-consuming servers which host products and services from a remote location, so end-users don't have to; they can simply log on to the network without installing anything. The major models of cloud computing service are known as software as a service (SaaS), platform as a service, and infrastructure as a service and may be offered in a public, private or hybrid network. Today, Google, Amazon, Oracle Cloud, Salesforce, Zoho and Microsoft Azure are some of the better known cloud vendors supporting everything from applications to data centers a common theme is the pay-for-use basis.

Major cloud vendors provide their services through their own data centers whilst other third party providers access either these data centers or others distributed worldwide to store and distribute the data on the Internet as well as process this data. Considering just Internet data then with an estimated 100 billion plus web pages on over 100 million websites, data centers contain a lot of data. With almost two billion users accessing all these websites, including a growing amount of high bandwidth video, it's easy to understand but hard to comprehend how much data is being uploaded and downloaded every second on the Internet. By 2016 this user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will flow to and from users via data centers and accordingly between data centers and within data centers so that these IP traffic flows must be multiplied many times to establish total IP traffic flows. Data centers are filled with tall racks of electronics surrounded by cable racks where data is typically stored on big, fast hard drives. Servers are computers that take requests to retrieve, process, or send data and access it using fast switches to access the right hard drives. Routers connect the servers to the Internet. At the same time these data centers individually and together provide homogenous interconnected computing infrastructures. At the same time as requiring a cost-effective yet scalable way of interconnecting data centers internally and to each other many datacenter applications are provided free of charge such that the operators of this infrastructure are faced not only with the challenge of meeting exponentially increasing demands for bandwidth without dramatically increasing the cost and power of their infrastructure. At the same time consumers' expectations of download/upload speeds and latency in accessing content provide additional pressure.

Fiber optic technologies already play critical roles in data center operations and will increasingly. The goal is to move data as fast as possible with the lowest latency with the lowest cost and the smallest space consumption on the server blade and throughout the network. According to Facebook™, see for example Farrington et al in "Facebook's Data Center Network Architecture" (IEEE Optical Interconnects Conference, 2013 available at http://nathanfarrington.com/presentations/facebook-optics-oida13-slides.pptx), there can be as high as a 1000:1 ratio between intra-data center traffic to external traffic over the Internet based on a single simple request. Within data center's 90% of the traffic inside data centers is intra-cluster.

Accordingly, it would be beneficial to enhance connectivity within data centers at multiple levels such as chip-to-chip, server-to-server, rack-to-rack, and cluster-to-cluster exploiting photonic interconnection architectures to address the multiple conflicting demands. It would be further beneficial to exploit photonic integrated circuit devices that support large photonic switch fabrics employing space and/or wavelength domains but have slower switching speeds by providing distributed photonic switch fabrics employing combinations of fast and slow photonic switching elements allowing these to provide reduced latency, increased flexibility, lower cost, lower power consumption, and provide high interconnection counts.

It would be further beneficial to be able to leverage the transparency and low latency within optical switching to enhance connectivity and reduce latency across the Internet and within web scale datacenters by exploiting optical switching. However, to date switching technologies exploiting three dimensional (3D) microelectromechanical systems (MEMS) or two dimensional (2D) Mach-Zehnder Interferometer (MZI) based optical switches have not justified the business case for optical switching within the datacenter. However, 2D planar microoptoelectromechanical systems (MOEMS) based optical switching provides the required features, performance, scalability, and cost balance to meet the datacenter business case and accordingly the establishment of optical switch blocks and matrices will support network deployments for the Internet.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to optical networks and more particularly to wavelength division multiplexed networks for data center and cloud computing applications.

In accordance with an embodiment of the invention there is provided a system for interconnecting a first set of leaf switches associated with a first spine switch and a second set of leaf switches associated with a second spine switch without routing through at least one of the first and second spine switches by providing a modular optically switched (MOS) interconnection network allowing programmable allocation of bandwidth from ports on each of the first set of leaf switches to ports on each of the second set of leaf switches.

In accordance with an embodiment of the invention there is provided a method of establishing a switching fabric providing a reconfiguration rate at a higher speed than that defined by the slowest switching element within the switching fabric comprising providing an input temporal switch array, a plurality of spatial switching fabrics, and an output temporal switch array wherein a configurable spatial switching fabric of the plurality of spatial switching fabrics other than the current active spatial switching fabric of the plurality of spatial switching fabrics is configured to a new configuration before the input and output temporal switch arrays route all optical signals to the configurable spatial switching fabric of the plurality of spatial switching fabrics.

In accordance with an embodiment of the invention there is provided a method of establishing a switching fabric providing a reconfiguration rate at a higher speed than that defined by the slowest switching element within the switching fabric comprising providing an input temporal switch array, a plurality of spatial switching fabrics, and an output temporal switch array wherein a path between a predetermined output port of the input temporal switch array and a predetermined input port on the output temporal switch array on a predetermined spatial switching fabric of the plurality of spatial switching fabrics other than the current active spatial switching fabric of the plurality of spatial switching fabrics coupled to the predetermined output port of the input temporal switch array is configured to the new configuration before the input and output temporal switch arrays route all optical signals to the configurable spatial switching fabric of the plurality of spatial switching fabrics.

In accordance with an embodiment of the invention there is provided a method of establishing a configuration of a second remote switch from a plurality of first switches by coupling into a predetermined subset of the outputs of each first switch out of band signaling signals and determining the configuration of the second remote switch from the out of band signaling signals from the plurality of first switches.

In accordance with an embodiment of the invention there is provided a method of switching wherein a first optical waveguide upon a beam extending from a pivot is rotated relative to the pivot point under the action of a first MEMS actuator laterally disposed relative to the beam so that the first optical waveguide evanescently couples to a second optical waveguide of a plurality of second optical waveguides geometrically disposed based upon at least the beam, pivot point, and the first MEMS actuator.

In accordance with an embodiment of the invention there is provided an optical switch comprising:
  a first waveguide portion having first and second input waveguides formed thereon;
  a second waveguide portion having first and second output waveguides formed thereon;
  a suspended waveguide portion having a plurality of optical waveguides formed thereon; and
  a MEMS actuator coupled to the suspended waveguide portion; wherein
    in a first position the MEMS actuator positions the suspended waveguide portion such that a first subset of the plurality of optical waveguides are evanescently coupled to the first and second waveguide portions placing the switch into a first state; and
    in a second position the MEMS actuator positions the suspended waveguide portion such that a second subset of the plurality of optical waveguides are evanescently coupled to the first and second waveguide portions placing the switch into a second state.

In accordance with an embodiment of the invention there is provided an optical switch comprising:
a non-suspended waveguide portion having first and second waveguides formed thereon; and first and second suspended waveguide portions each having an optical waveguide formed thereon;
first and second MEMS actuators coupled to the first and second suspended waveguide portions;
  wherein
    in a first position the first and second MEMS actuators position the suspended waveguide portions such that they are optically coupled to the first and second waveguides within the non-suspended waveguide portion placing the switch into a first state; and
    in a second position the first and second MEMS actuators position the suspended waveguide portions such that they are not optically coupled to the first and second waveguides within the non-suspended waveguide portion placing the switch into a second state.

In accordance with an embodiment of the invention there is provided an optical switch comprising:
a non-suspended waveguide portion having first and second waveguides formed thereon; and
first and second suspended waveguide portions each having an optical waveguide formed thereon; wherein
    in a first configuration the suspended waveguide portions are positioned such that they are coupled to the first and second waveguides within the non-suspended waveguide portion placing the switch into a first state; and
    in a second configuration the suspended waveguide portions are positioned such that they are not coupled to the first and second waveguides within the non-suspended waveguide portion placing the switch into a second state.

In accordance with an embodiment of the invention there is provided a network comprising interconnecting a plurality of electronic packet switches within a first tier via a plurality of optical switches within a second tier in order to form a two-tier folded Clos network topology, wherein the plurality of optical switches are not directly optically interconnected to each other, and each electronic packet switch is connected to multiple optical switches.

In accordance with an embodiment of the invention there is provided switching element comprising electronic packet switching and optical switching, the switching element for switching between a plurality of servers coupled to the switching element within a rack as a "top of rack" switch and at least another electronic device remotely located.

In accordance with an embodiment of the invention there is provided a system comprising:
a plurality R optical cables each coupled to a plurality of P parallel lane pluggable optical transceivers; and an optical switch matrix comprising a plurality P of M×N optical switch planes, wherein each optical cable is connected to the plurality P of M×N optical switch planes at least one of:
- statically by association of a predetermined parallel lane of the P parallel lane pluggable optical transceiver to an M×N optical switch plane of the plurality P of M×N optical switch planes; and
- dynamically by optical switching matrices forming part of the optical switch matrix such that one or more multiple pull-out connectors assembled onto the optical cable are coupled to multiple pull-out connectors onto the optical switch matrix.

In accordance with an embodiment of the invention there is provided a method of optical switching comprising establishing an optical coupling between a first optical waveguide of a plurality of first optical waveguides upon a movable element of a MOEMS based optical switch and at least one second optical waveguide of a plurality of second optical waveguides upon a fixed element of the MOEMS based optical switch, wherein
- in a first state the MOEMS based optical switch has optical coupling between the first optical waveguide and the second optical waveguide, and
- in a second state the MOEMS based optical switch has no optical coupling between the first optical waveguide and the second optical waveguide.

In accordance with an embodiment of the invention there is provided a method of optical comprising wherein a first optical waveguide upon a beam extending from a pivot is rotated relative to a pivot point of the pivot under the action of a first MEMS actuator laterally disposed relative to the beam so that the first optical waveguide butt couples across an air gap to a second optical waveguide of a plurality of second optical waveguides geometrically disposed based upon at least the beam, pivot point, and the first MEMS actuator.

In accordance with an embodiment of the invention there is provided optical switch comprising:
- a movable MEMS element of the optical switch supporting a first optical waveguide and a second optical waveguide wherein the first optical waveguide and a second optical waveguide intersect at an angle high enough to limit optical coupling between the first optical waveguide and a second optical waveguide;
- a curved optical waveguide disposed upon the movable MEMS element having a first end disposed towards a first end of the first optical waveguide and a second end disposed towards a first end of the second optical waveguide;
- third and fourth optical waveguides supported upon a fixed portion of the optical switch; wherein
- the movable MEMS element in a first state couples each of the third and fourth optical waveguides to the first end of a respective one of the first optical waveguide and the second optical waveguide; and
- the movable MEMS element in a second state each of the third and fourth optical waveguides are coupled to an end of the curved optical waveguide.

In accordance with an embodiment of the invention there is provided an optical switch matrix comprising:
- a plurality of inputs at a first end of the optical switch matrix;
- a plurality of outputs at a second distal end of the optical switch matrix;
- a plurality of unit cells, each unit cell comprising:
- a movable MEMS element of the optical switch supporting a first optical waveguide and a second optical waveguide wherein the first optical waveguide and a second optical waveguide intersect at an angle high enough to limit optical coupling between the first optical waveguide and a second optical waveguide;
- a curved optical waveguide disposed upon the movable MEMS element having a first end disposed towards a first end of the first optical waveguide and a second end disposed towards a first end of the second optical waveguide;
- third and fourth optical waveguides supported upon a fixed portion of the optical switch; wherein
- the movable MEMS element in a first state couples each of the third and fourth optical waveguides to the first end of a respective one of the first optical waveguide and the second optical waveguide; and
- the movable MEMS element in a second state each of the third and fourth optical waveguides are coupled to an end of the curved optical waveguide;
- wherein adjacent unit cells disposed along the other edges between the first end of the optical switch matrix and the second end of the optical switch matrix are coupled sequentially to each other via a reflective mirror.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 5A and 5B depict rack mounted embodiments of a Modular Optical Switch (MOS) together with exemplary modular fiber shuffle interconnection element according to an embodiment of the invention;

FIGS. 22A and 22B depict a 2×2 switching element according to an embodiment of the invention exploiting MOEMS elements, whereas the MEMS contains bar waveguide and cross waveguide and couples evanescently to input/output waveguide;

FIG. 24 depicts a 2×2 switching element according to an embodiment of the invention exploiting 2 MOEMS elements and optical evanescent coupling using a single crossing;

FIG. 37 depicts self-alignment in conjunction with electro-static gap closing within a rotary motion MOEMS based 1×5 optical switching element according to an embodiment of the invention.

DETAILED DESCRIPTION

The present invention is directed to optical networks and more particularly to use optical switching in data center and cloud computing networks.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

1. Current State of the Art without Optical Switching in Intra-Data Center Communications The majority of warehouse scale datacenters networks today are designed around a two-tier leaf/spine Ethernet aggregation topology leveraging very high-density switches. Servers first connect to leaf switches and then leaf switches connect to spine switches. Each leaf switch must connect to every spine switch in order to ensure that the network is never oversubscribed at any location beyond the chosen oversubscription threshold. By using such a network topology, and leveraging an equal cost multi-path protocol (ECMP), it is then possible to have an equal amount of bandwidth across the aggregated path between the upstream and downstream thereby providing a non-blocking network architecture via multiple aggregated link. The number of uplinks on the leaf switches limits the number of spine switches to which they can connect. The number of downlinks on the spine switches then limits the number of leaf switches that can be part of the overall network.

Figures 1, 2:
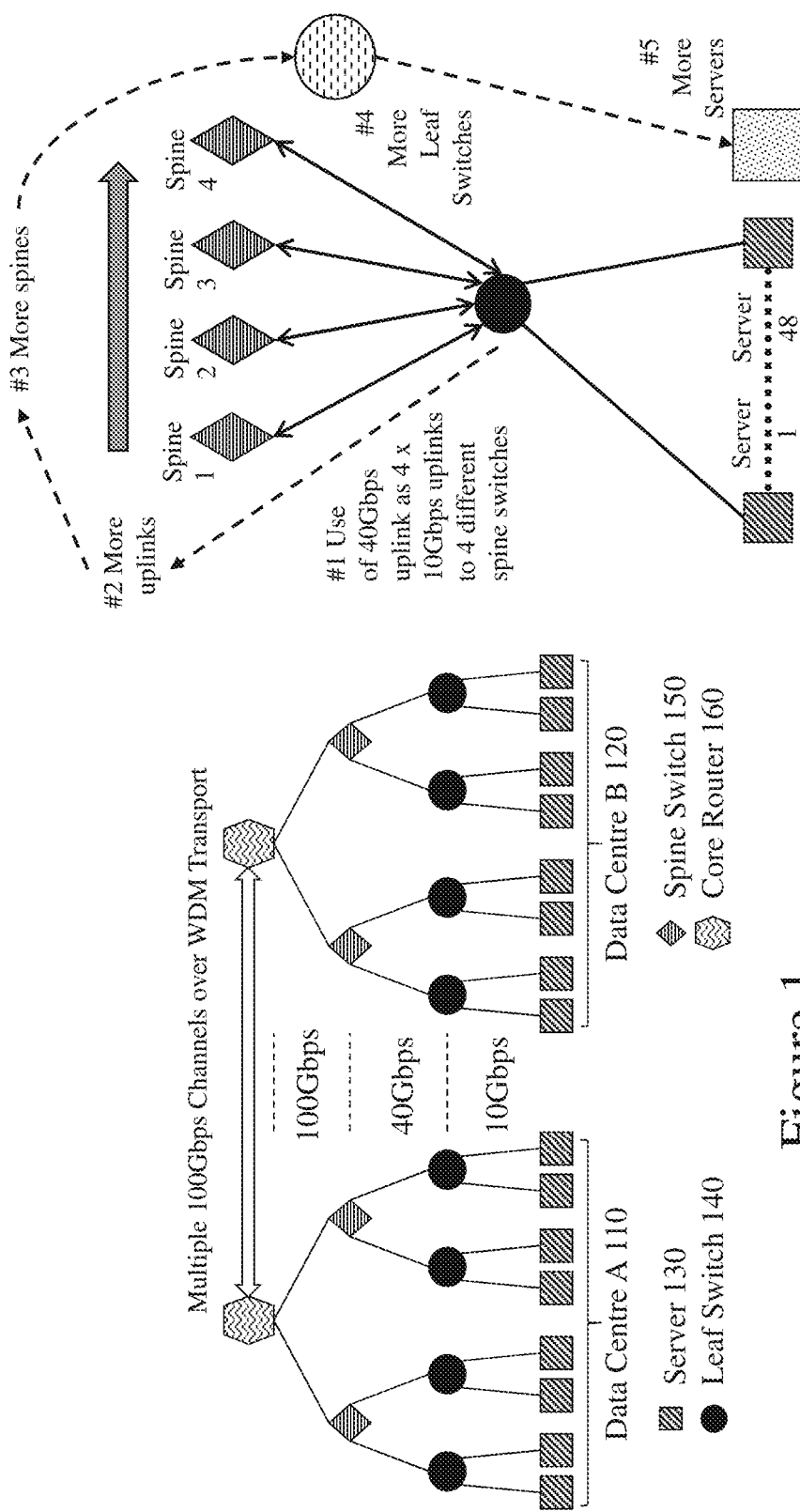
FIG. 1 depicts a datacenter network according to the prior art.
FIG. 2 depicts a two-tier leaf spine architecture according to an embodiment of the invention supporting scaling out.

Consequently, the number of computer servers that can be added to two-tier leaf/spine datacenter network architecture is a direct function of the number of uplinks on the leaf switches. A fully non-blocking topology requires that leaf switches have as much uplinks bandwidth as downlink bandwidth to computer servers. In contrast in FIG. 2, in a two-tier leaf/spine architecture according to an embodiment of the invention then it only scale out to add a maximum amount of servers within the chosen oversubscription parameter and at a constant latency, because every leaf switch is connected to every spine switch. Accordingly, to achieve this and scale out, the bandwidth of leaf switch uplinks at 40 Gbps is instead broken out as 4 links of 10 Gbps that are then connected to 4 distinct spine switches. Hence, more uplinks connect to more spines and thence more leaf switches and servers can be supported.

2. Leaf-Spine Connectivity Developments

Two-tier Leaf-Spine architectures have become the standard in data center network architectures and are known to the skilled in the art. The first tier is made of switches defined as leaves. The second tier is made of switches defined as Spines. In a three-tier network topology, there could be a second tier of leaf switches intermediating the first tier of leaf switches and a third tier made out of spine switches. For the purpose of the present patent application, a second tier of leaf switches would be referred as spine switches.

2A: Modular Optically Switched (MOS) Connectivity Exploiting Reconfigurable Optical Tunable Transmitters and Receivers Whilst WDM based ring networks can provide reduced latency between leaf nodes as well as a degree of programmable capacity between leaf nodes by removing the requirement for interconnection between spline switches as well as a programmable CDC optical switch to provide cross-ring connectivity. Such WDM ring based networks provide "within" spline latency reduction. However, the historical design methodologies based upon cost effective Ethernet switches, equal cost Multi-Path load balancing and simple hashing algorithms unaware of flow dimensions are inefficient when low capacity flows encounter congestion due to a preponderance of high capacity flows. Today with approximately 80% of the east-west traffic within a network representing less than 10% of the number of flows such scenarios are increasingly common. Within the prior art centralized traffic engineering may help improve overall network utilization at the expense of local knowledge routing. Accordingly, prior art architectures do not address short-lived latency sensitive low capacity flows that are choked by long-lived bandwidth-hungry high capacity flows thereby degrading application performance.

However, traffic engineering is challenging given that the goal is to save these low capacity flows whilst preventing high capacity flows from conflicting in order to avoid impacting these low capacity flows, or worst, the high capacity flows stall completely. With growing populations of both flows that is temporarily, or permanently, greater than any given Ethernet switch may be able to track, a way to scale out an architecture may be to drastically increase the number of addressable optical paths in the network and divert the "elephant" flows onto dedicated point to point optical paths. Solutions to offload data center leaf-spines from "elephant" flows, based on three dimensional (3D) MEMS M×N optical switches are now entering the market but as these solutions are based on optical switches designed for patch panel automation they are not modular, do not exhibit scale out properties, have a high acquisition cost and require centralized traffic engineering. Further, as 3D MEMS are based on free space optics, they are complex to package and bulky.

Figure 3:
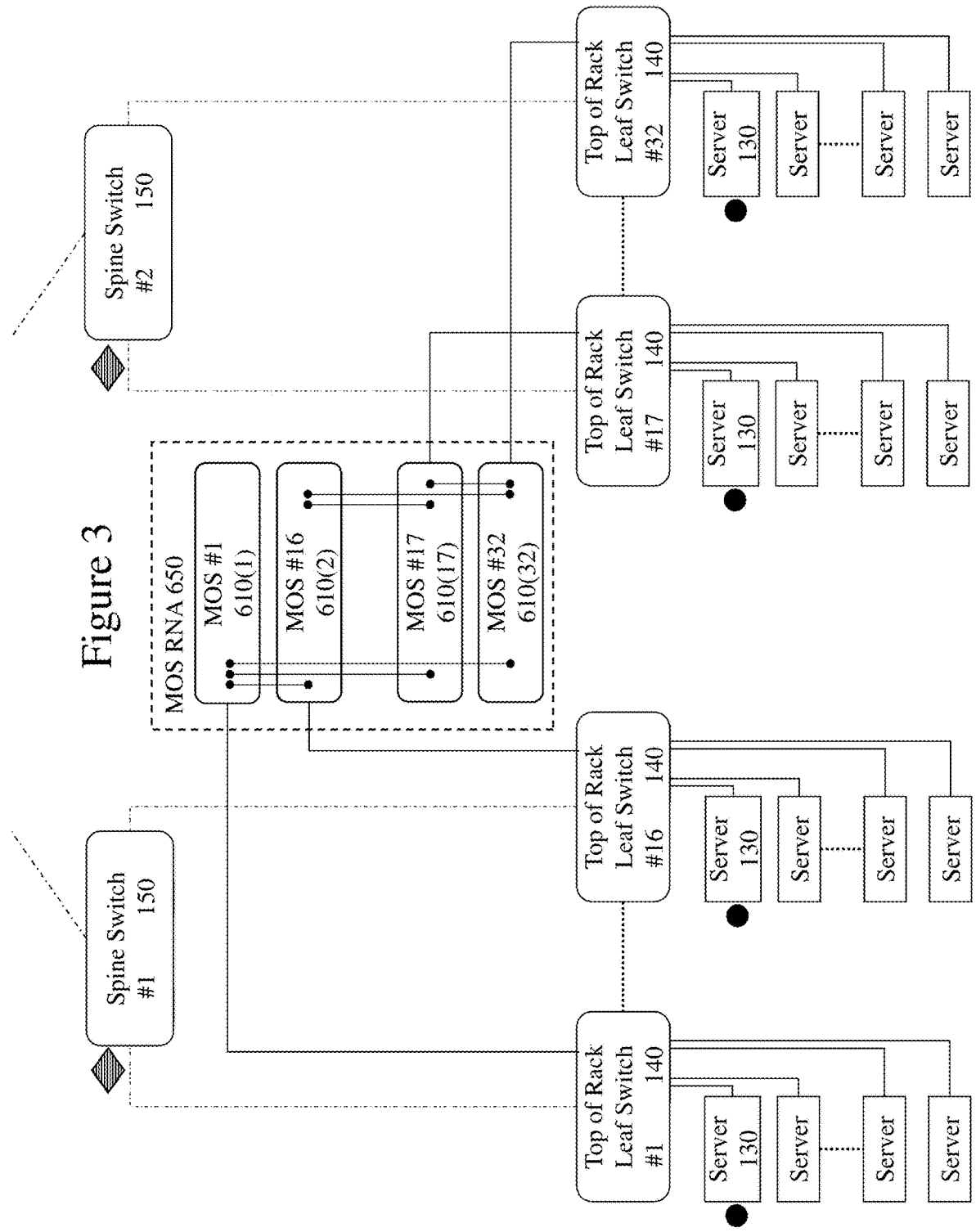
FIGS. 3 and 4 depict a Modular Optically Switched (MOS) network architecture for web scale data centers applied at the leaf switch and spine switch levels respectively.

Accordingly, the inventors have established a Modular Optically Switched (MOS) network architecture, such as depicted in FIG. 3, exploiting several instances of a single construct element, namely a 1×N, e.g. N=32, planar optical switch based upon novel microoptoelectromechanical structures (MOEMS) comprising MEMS rotational mirrors integrated with optical waveguides. Exploiting large-scale silicon photonics integration makes it possible to integrate multiple planar MOEMS optical switch instances onto a single silicon chip. It then becomes possible to manufacture hundreds of optical switches per silicon wafer and obtain a cost structure similar to what is possible within the microelectronics industry. For example, a system level product, a 64×2048 modular optical switch, may be integrated onto a single printed circuit board by employing 64 instances of these 1×32 planar optical switches. Due to their compact 2D MOEMS such a modular optical switch can then fit into a data center single rack unit configuration and make a stack of modular optical switches attractive to deploy and easy to interconnect together in the same cabinet.

Figure 4:
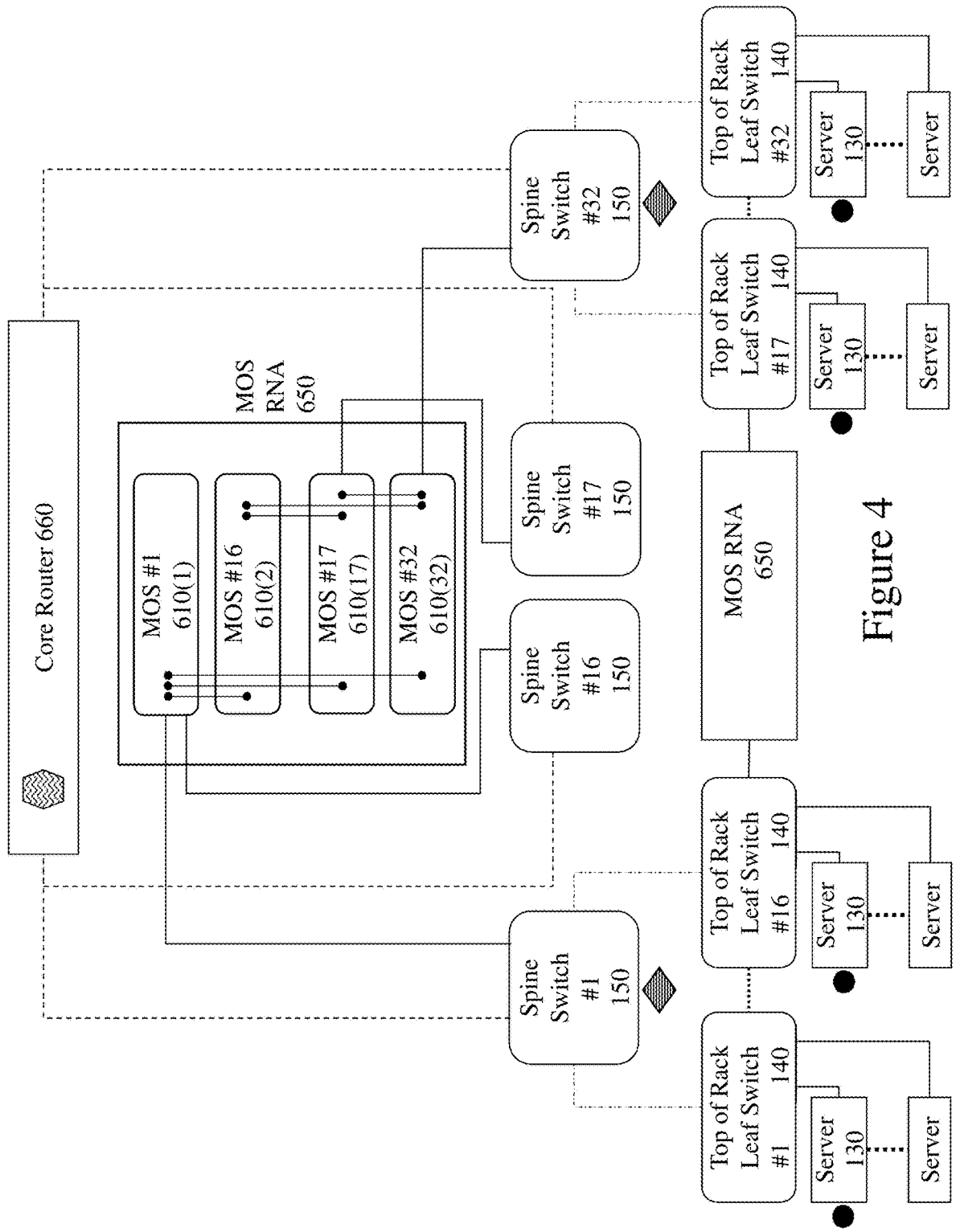

A scale out modular optical switch (MOS) according to embodiments of the invention may be deployed in tandem with every top of rack (ToR) switch with or without a leaf switch level WDM ring network such as described in respect of FIGS. 4 and 5 and the corresponding patent application of the inventors, U.S. Provisional Patent Application 61/950,238 entitled "Methods and Systems Relating to Optical Networks" filed Mar. 10, 2014 and associated World Intellectual Property Office Patent Cooperation Treaty Application entitled "Methods and Systems Relating to Optical Networks" filed Mar. 10, 2015. A MOS allows users to maintain the scale out and economic properties of web scale data center networks to increased data center dimensions. Accordingly, the ToR switches can make use of distributed local knowledge routing to assign "elephant" flows onto point-to-point optical paths to other ToRs without implementing network wide traffic engineering.

Top of Rack (ToRs) are switches installed in a data center cabinet (rack) above all the servers within that rack. They sit at the very edge of the data center network and connect the servers to each other and to the network infrastructure. Based on exemplary leading Ethernet switches then prevalent configurations for ToRs for the foreseeable future will exploit 32 ports of Quad Small Form-factor Pluggable interfaces supporting QSFP+10 Gbps 4× transceivers (QSFP10 or QSFT+) and evolving to QSFP 28 Gbps 4× transceivers (QSFP28) in a single rack unit configuration. Their low cost enables their use as spine switches in scale out designs. The QSFP+(QSFP10) interface enables 4 pairs of duplex lanes of 10 Gbps per ToR port, for a total of either 32 ports of 40 Gbps or 128 ports of 10 Gbps, using parallel lanes QSFP+ pluggable optics & break-out cables. The QSFP28 interface enables 4 pairs of duplex lanes of 25 Gbps per ToR port, for a total of 32 ports of 100 Gbps, 64 ports of 50 Gbps, or 128 ports of 25 Gbps, using parallel lanes pluggable optics & break-out cables.

The Modular Optically Switched (MOS) reference network architecture (RNA) depicted in FIG. 3 leverages the fact that ToRs can use parallel lane pluggable optics. These ToRs now not only have enough interfaces to connect a full rack of servers, but also enough interfaces to provide for the necessary connectivity to both the Ethernet spine switches of the data center leaf-spine and the modular optical switches of the MOS RNA. Within MOS RNA presented in FIG. 3 each Spine Switch 150 supports connections to 16 ToR Leaf Switches 140 and between a pair of Spine Switches 150 and their associated 32 ToR Leaf Switches 140 there is disposed a MOS 650 comprising 32 interconnected modules MOS #1 to MOS #32, labelled 610(1) through 610(32). Within an exemplary MOS RNA the inventors propose that the ports of a 32-port QSFP+ ToR are allocated as follows:

sixteen QSFP+ ports to 16 Servers 130 in the rack at 40 Gbps each or though parallel lane pluggable optics and breakout cables as 64 ports of 10 Gbps to 64 server ports in the rack (supporting up to 64 Server 130 according to design);

eight QSFP+ ports of 40 Gbps to 8 Ethernet Spine Switches 150 or through parallel lane pluggable optics and breakout cables as 32 ports of 10 Gbps to up to 32 Spine Switches 150 (or other combinations such as 40 Gbps to adjacent Spine Switches 150, 20 Gbps to next pair of nearest neighbour Spine Switches 130 and 10 Gbps to next 8 Spline Switches 150 either way); and eight QSFP+ ports of 40 Gbps connected to MOS 650 with parallel lane pluggable optics and breakout cables.

Within the MOS RNA 650 the focus is not towards the ports on the ToR Leaf Switches 140 which are connected to the Ethernet spine switches as this portion of the network behaves like any existing 2:1 oversubscribed leaf-spine. The novelty in the MOS network architecture lies in the ports on the ToR Leaf Switches 140, which are connected to the modular optical switches within the 32 interconnected modules MOS #1 610(1) to MOS #32 610(32). Once the eight QSFP+ ports of a ToR Leaf Switch 140 are connected to a single MOS module 610(X) modular optical switch then each of the individual 32 pairs of lanes of the parallel lane pluggable optics (40 GBase PSM4) are connected to individual 1:32 planar optical switches supporting therefore up to 1024 degrees of interconnection through the MOS modules MOS #1 610(1) to MOS #32 610(32) for each ToR Leaf Switch 140 connected to the MOS 650 network.

In the MOS RNA 650 each of the 32 ToR Leaf Switches 140 are connected to a separate MOS module 610(X). Then, by interconnecting the MOS modules 610 together across their fiber shuffles, it become possible to scale out the MOS RNA 650 to the following capacity given a full scale row/pod configuration of 32 racks/32 ToR Leaf Switches 140 with up to 2,048 server interfaces at 10 Gbps. In addition to a total capacity of 10.24 Tbps across the Ethernet switched leaf-spine network the following additional bandwidth across the scaled out MOS RNA 650 is available:

Point-to-point bandwidth between any two given ToR Leaf Switches 140 across the eight QSFP+ interfaces directly of 320 Gbps;

Bisection bandwidth in a row of 32 ToR Leaf Switches 140 each with eight QSFP+ interfaces: 2.64 Tbps;

Addressable bandwidth in a row of 32 ToRs, each with eight QSFP+ interfaces: 327.68 Tbps.

As the optical switches within the MOS 650 are protocol independent then by replacing the ToR Leaf Switches 140 32-port QSFP10 interfaces to 32-port QSFP28 interfaces and upgrading the Spine Switches 150 those with QSFP28 interfaces it then becomes possible to attain a full-scale configuration of 32 racks capable of interconnecting 2,048 server interfaces at 25 Gbps each. In addition to a total capacity of 25.6 Tbps across the Ethernet switched leaf-spine, the following additional bandwidth across the Modular Optically Switched network is achieved:

Point-to-point bandwidth between any two given ToR Leaf Switches 140 across eight QSFP+ interfaces: 800 Gbps;

Bisection bandwidth in a row of 32 ToR Leaf Switches 140, each with eight QSFP+ interfaces: 6.6 Tbps; and Addressable bandwidth in a row of 32 ToR Leaf Switches 140, each with eight QSFP+ interfaces: 819.2 Tbps.

Such large east-west bandwidth capacity is achievable through the interconnection of 32 individual MOS modules 610, which can be installed coincidentally with the ToRs, in a true scale out and highly resilient fashion. In the MOS RNA 650, this is all made possible by the interconnection of 2,048 individual 1:32 planar optical switch instances, distributed equally amongst the 32 modular optical switches. It would be apparent that the MOS RNA 650 directly interconnecting ToR Leaf Switches 140 within a single leaf-spine and/or between multiple leaf-spine arrays reduces the latency between the connected ToR Leaf Switches 140

It would be evident that the MOS RNA 650 depicted in FIG. 3 may be varied without departing from the scope of the invention. For example, the 1:32 planar optical switches may be replaced with 1:48, 1:16, or 1:64 planar optical switches or other port counts to interconnect a different number of ToR Leaf Switches 140 and/or ToR Leaf Switches 140 within each leaf-spine array. Optionally, the MOS RNA 650 may support operation in conjunction with or in isolation from a WDM ring network interconnecting the ToR Leaf Switches 140. Similarly, the MOS RMA may support operation in conjunction with or in isolation from a WDM ring network interconnecting the Spine Switches 150. Optionally, the MOS RNA 650 may be implemented at a higher level, such as depicted in FIG. 4 wherein a MOS RNA 650 is connected to the Spine Switches 150 in addition to the MOS RNA 650 coupled to the Leaf Switches 140.

Figure 5B:
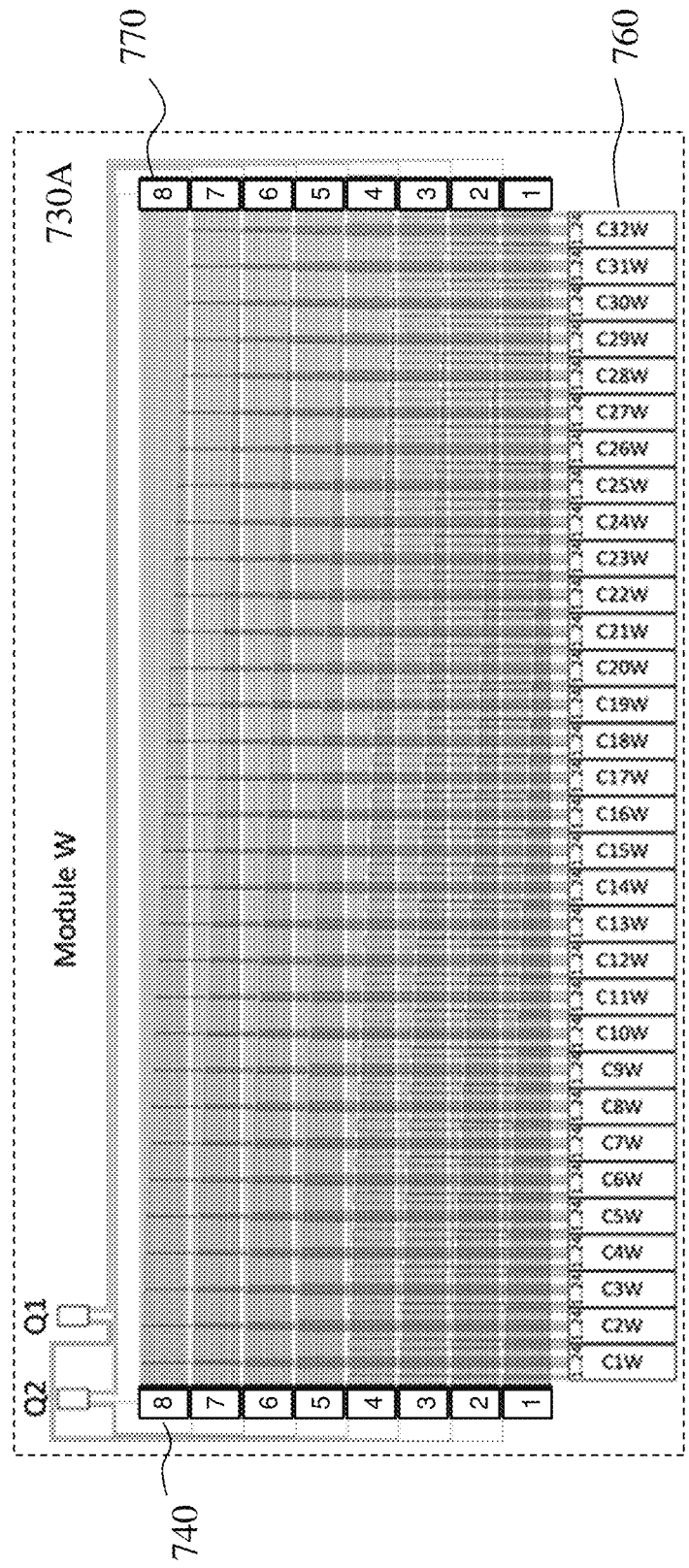

Referring to FIGS. 5A and 5B there are depicted 4U Rack Unit 710 and 1U Rack Unit 720 implementations of a MOS RNA 650 are depicted. Referring to 4U Rack Unit 710 then considering the MOS RNA 650 in FIG. 3 there are 8 connectors on the upper left labelled Q1 to Q8 which are each connected to a QSFP+(QSFP10) port of a ToR Leaf Switch 140 and hence the 4U Rack Unit 710 receives on each connector 4×10 Gbps transmit channels and provides 4×10 Gbps receive channels back to the ToR Leaf Switch 140. Within the 4U Rack Unit 710 these channels are coupled to one of four modules 730A to 730D such that these receive/provide the signals for Q1/Q2, Q3/Q4, Q5/Q6, and Q7/Q8 respectively. Accordingly, within each module the received 8 transmit signals are coupled to 8 1:32 transmit (Tx) optical switches (OS) 740 whilst the 8 receiver channels are coupled to 8 32:1 receive (Rx) optical switches 770. Each TxOS 740 within a module may therefore route to one of 32 output ports 760 which are labelled C1 to C32, which are themselves multiway connectors, and the received signals from these 32 output ports 760 C1 to C32 are coupled to the RxOS 770. As such the 4U Rack Unit 710 depicted receives on the 8 connectors Q1 to Q8 8×(4×10 Gbps) and routes these 32 10 Gpbs channels as either 8×(4×10 Gbps) to 8 output connectors 760 from C1 to C32 or as 32×(1×10

Gbps) to all output connectors 760 C1 to C32 or 16×(2×10 Gbps) to 16 output connectors 760 from C1 to C32 or other combinations thereof.

As depicted each one of the four modules 730A to 730D, identified as Module W, Module X, Module Y, Module Z provide transmit signals for Q1/Q2, Q3/Q4, Q5/Q6, and Q7/Q8 respectively to the ranks W, X, Y, and Z of output connectors 760 C1 to C32 within the single 4U Rack Unit 710 via the TxOS 740. At the same time the RxOS 770 within each module route received signals on the ranks W, X, Y, and Z of output connectors 760 C1 to C32 to the z 1/Q2, Q3/Q4, Q5/Q6, and Q7/Q8 connectors. Alternatively, a single module, e.g. Module W 730A, may be housed within a single 1U Rack Unit 720. Optionally, all the functionality within the 4U Rack Unit 710 may be housed within a 1U Rack Unit 720. Optionally, the connector count may be reduced for interconnecting between MOS units within either 4U Rack Units 710 or 1U Rack Units 720 through the use of higher count connectors, e.g. MPO24 24 fiber connectors rather than MPO12 12 fiber connectors.

Figure 6A:
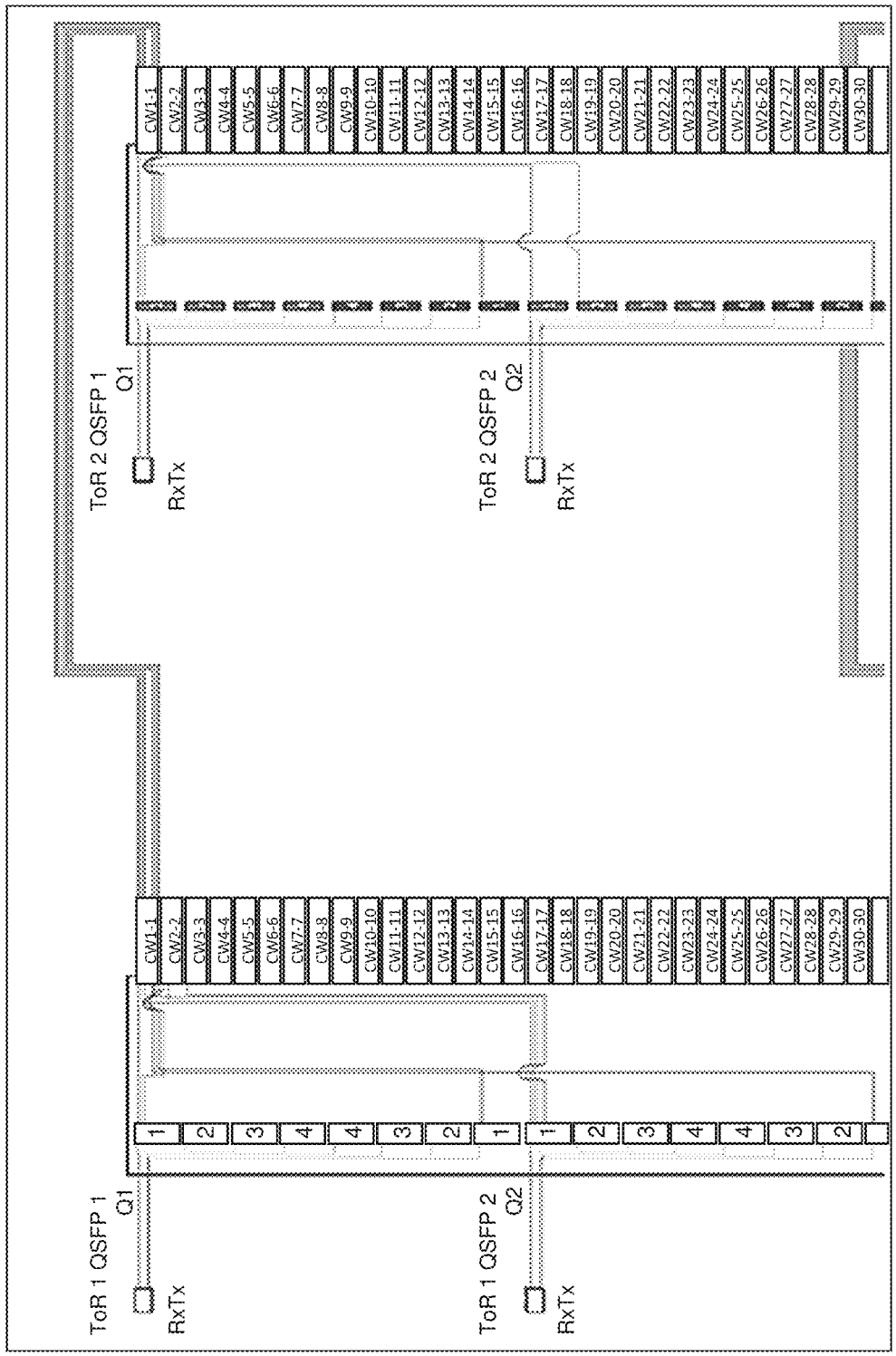
FIGS. 6A and 6B depict an interconnection between two MOS according to an embodiment of the invention.
Figure 6B:
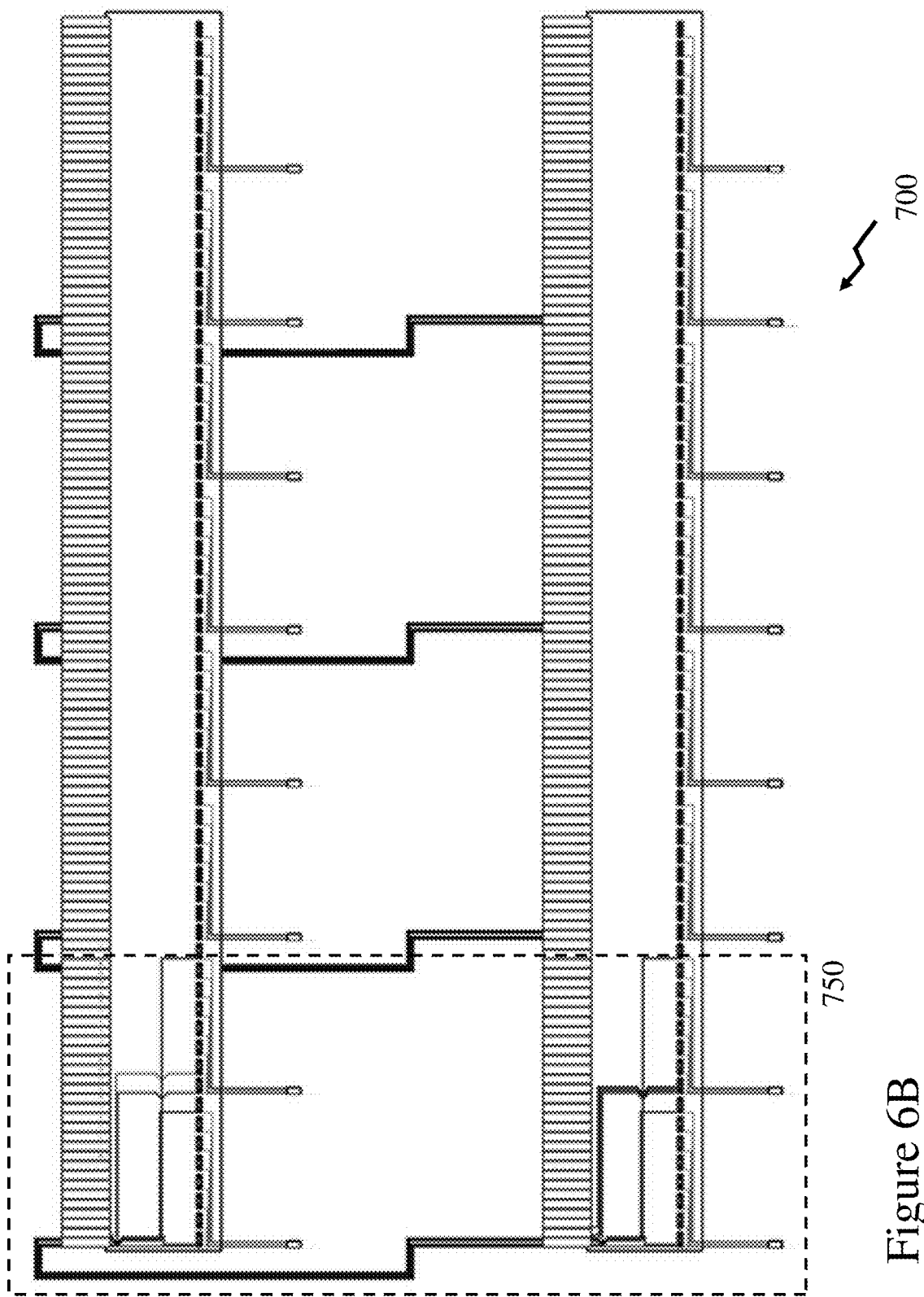

It would therefore be evident that 4U Rack Units 710 or 1U Rack Units 720 may therefore be connected through their C1 to C32 connectors to one another and therein to their respective Leaf Switch or Leaf Switches. An exemplary interconnection being depicted in FIGS. 6A and 6B with interconnection mapping 700 part of which is expanded in expanded view 750.

2B: Scaled Out Optically Switched (SOOS) Network Architecture for Web Scale Data Centers As discussed supra increased demand for cloud-based services can trigger bandwidth surges inside data centers, equivalent to 300 times the actual Internet traffic volume. Further, as discussed supra different traffic patterns must be supported within Web Scale Data Centers (WSDC) including, but not limited to, persistent "elephant flows" and short-lived delay sensitive "mice" flows. As noted more than 80% of the east-west traffic bandwidth can be represented by "elephant flows", which account for less than 10% of the number of flows, whereas "mice flows", which account for 90% of the number of flows, represent less than 20% of the bandwidth. Within the industry optical switching technology has been widely recognized as providing a solution to offload "elephant flows" from WSDC packet switched networks. However, prior art designs did not achieve high-bandwidth availability within a cost-viable scalable architecture.

Accordingly, the inventors have established an alternate architecture to the prior art and their inventive MOS described supra in respect of Section 2A. They refer to this as a Scaled Out Optically Switched (SOOS) network architecture for WSDC's. This architecture is based on optical switches containing several instances of silicon photonics planar optical switches, e.g. 1×48, which are parallelized to support quad parallel lane optics to then enable switching on each lane. Use of large 1×N switches avoids cascading smaller switches in a butterfly configuration. Further, by ensuring that there are no more than two optical switch stages occur in the path of any circuit, low power single mode silicon photonics transceivers can be used without requiring external amplification.

Figure 7:
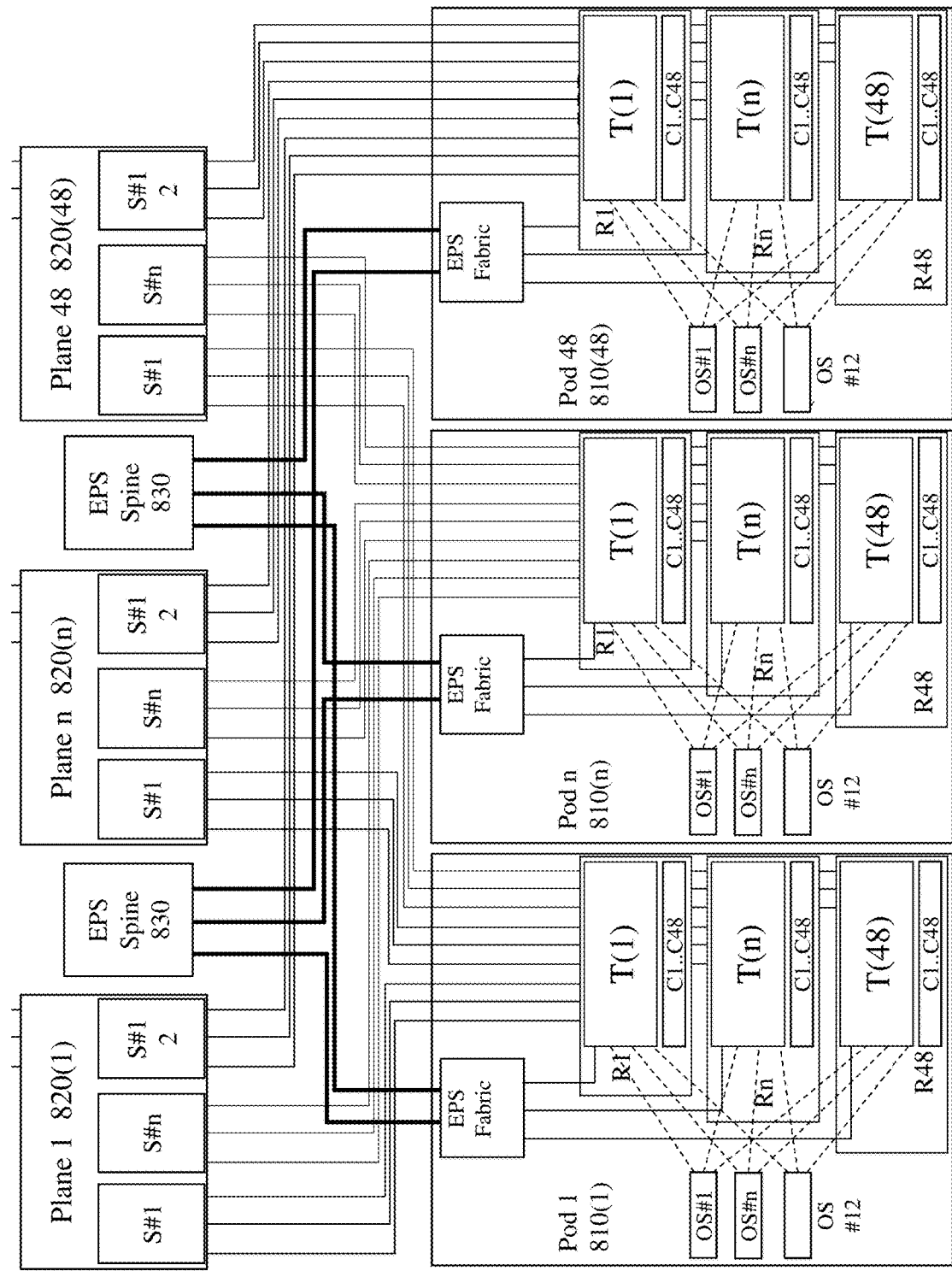
FIG. 7 depicts a Scaled Out Optical Switched (SOOS) network architecture for web scale data centers according to an embodiment of the invention.
Figure 8:
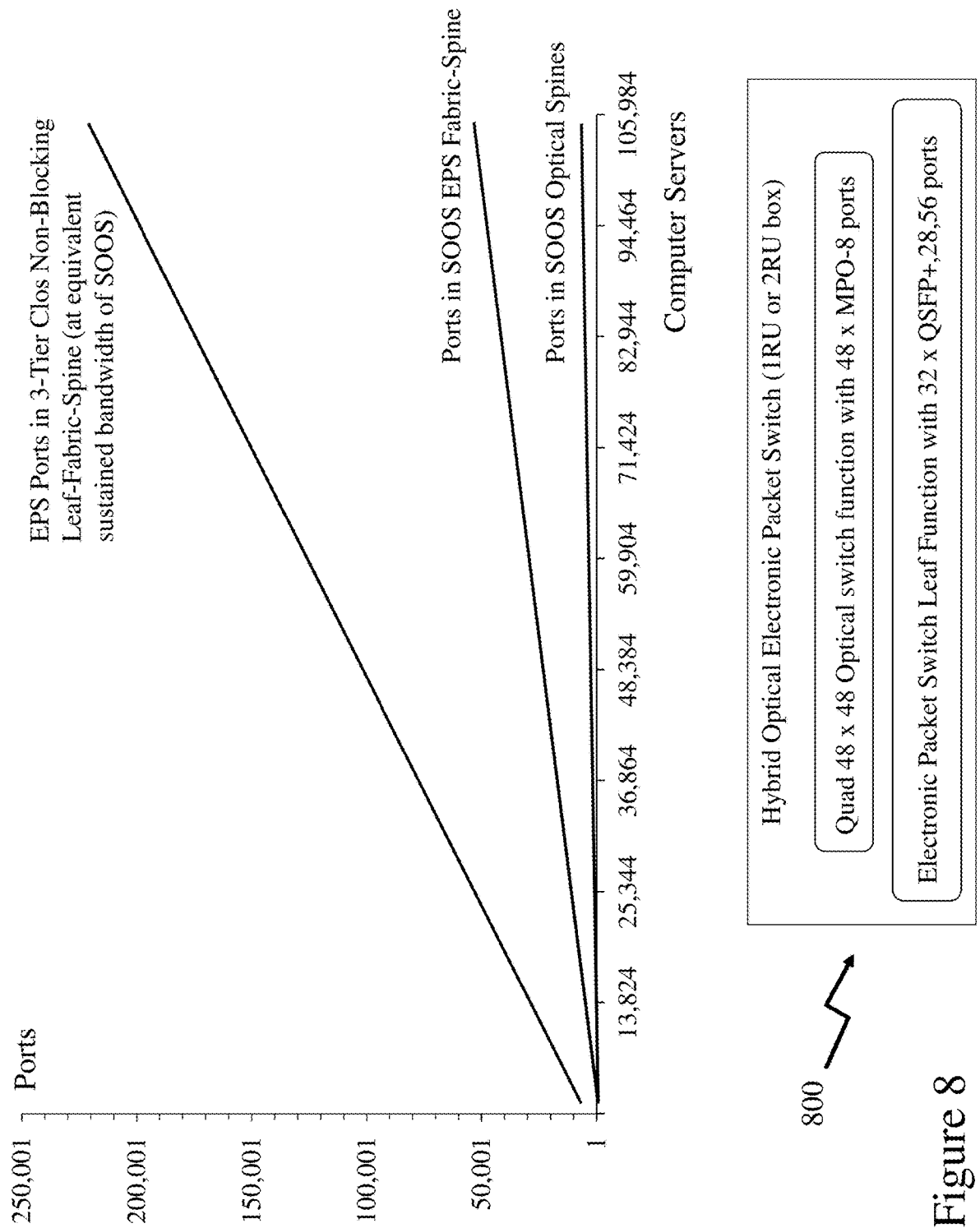
FIG. 8 depicts Ethernet switch port counts for SOOS architecture according to FIG. 7 against a prior art 3-Tier Clos Non-Blocking Leaf-Fabric-Spine switch versus number of computer servers.

Referring to FIG. 7 there is depicted a SOOS data center network architecture wherein the WSDC comprises 48 pods (Pod 1 810(1) to Pod 48 810(48)) wherein each Pod n 810(n) comprises 48 racks (R1 to R48) with 48 computer servers (C1 to C48) per rack resulting in 110,592 computer servers (48P×48R×48C=110,592C). As depicted in FIG. 8 the scaling out, amounting to 48P☐48R☐48C=110,592 C in total. Scaling out by way of optical switching is accomplished via 48 planes, Plane 1 820(1) to Plane 48 820(48) each containing 12 optical switches, S #1 to S #12, for switching between each rack, R, of each pod, P. The selection of a plane is accomplished via 12 optical switches (OS #1 to OS #12) inside each pod, P.

Quad parallel lane pluggable optics (Q) such as 40 Gbps QSFP+ or 100 Gbps QSFP28 expose each of the 8 lanes (L) (4 transmit lanes and 4 receive lanes) on individual optical fibers through an eight-position multi-push-on (MPO) single mode connector. A single Q can be configured as four individual full duplex transceivers at the 1/4 line rate (i.e. 40/4=10 Gbps for QSFP+ and 100/4=25 Gbps for QSFP28). In order to support a scale out network architecture with transceivers containing 8 L using a 1×48 switches (supporting 48 Top-of-Rack switches T(1) to T(4) within a single pod (P) and 48 pods (P) within a single WSDC), an efficient configuration for an Optical Switch (OS #n) is a Quad full duplex design with 48 eight-position (for 8 lanes (L)) single mode connectors. Inside the OS #n, 384 instances of 1×48 planar optical switches are interconnected by 4 fiber shuffles of 2304×2304 positions.

TABLE 1

Symbols and Quantities in SOOS Reference Network Architecture of FIG. 8

| Symbol | Definition | Total Quantity in SOOS WDC |
|---|---|---|
| P | Pod | 48R |
| R | Rack | 48P × 48R = 2304R |
| T | Top of Rack | 48P × 48T = 2304T |
| C | Computer Server | 48P × 48R × 48C = 110,592C |
| S | Optical Switch | 576 – Intra · P – S + 576 – Inter · P – S = 1152S |
| Intra P-S | Intra-Pod Optical Switch | 48P × 12S = 576 – Intra · P – S |
| Inter P-S | Inter-Pod Optical Switch | 48P × 12S = 576 – Inter · P – S |

Each rack (R) contains a Top of Rack switch (T(1) to T(48)), which is connected to 12 optical switches (OS #1 to OS #12), within the same pod (P). Accordingly, within the pod (Pod 1 810(1) to Pod 48 810(48)) these 12 optical switches (OS #1 to OS #12) perform the function of an intra-pod (intra-P) distributed optical fabric at the same hierarchical level as a spine switch within a prior art two-tier Leaf-Spine folded Clos network topology. In order to have enough resources to switch 12 QPLPO per Top of Rack switch (T), which allows for 12 QPLPO*4 Lanes=48 Lanes, allowing each Top of Rack switch (T) to have simultaneous connectivity to all other top of rack switches within the same pod at the 1/4 line rate of the QPLPO then 12 switches (OS #1 to OS #12) are required within each Pod n 810(n). Typically, within a given pod n 810(n) the 12 optical switches might be located within a rack at the middle of the pod and would connect to the 576 QPLPO evenly distributed across the 48 Top of Rack (T) switches via MPO eight-fiber jumpers.

In an alternative embodiment, depicted in image 800 in FIG. 8, then the optical switches may be integrated as a module within an Ethernet Top of Rack (ToR) switch, whereby a ToR may perform both Electronic Packet Switched Leaf functionality as well as Optically Switched Spine functionality for other ToRs within the same Pod or local environment.

In the 48 pods (Pod 1 810(1) to Pod 48 810(48)) of the entire WSDC, there would be 48P×12S=576 intra P-S. Exploiting the SOOS architecture all 48 pods of the WSDC are interconnected by 48 planes of inter-P optical switching, Plane 1 820(1) to Plane 48 820(48), wherein each plane comprises a further 12 optical switches (S #1 to S #12), for a total of 48P×12S=576 inter P-S. The intra P-S switching is used to select the plane between any two pods there allowing any Top of Rack switch within a given Rack R in a given pod P n to be optically switched to another Top of Rack switch within another rack R within another P. The entire WSDC deployment would ultimately contain 576 intra-P S+576 inter-P S=1152 optical switches.

In an alternative embodiment, it would be evident to one skilled in the art that the number of optical planes can be reduced or increased as a function of the Optical Switch radix to match the topology of the data center (i.e. radix of 64 for a WSDC of 64 planes across 64 pods of 64 racks of 64 servers per rack, or radix of 32 for a WSDC of 32 planes across 32 pods of 32 racks of 32 servers per rack).

Optical switching may be too slow for low latency "mice" flows and accordingly SOOS provides a minimalistic 3-tier Leaf-Fabric-Spine non-blocking Ethernet Packet Switches (EPS) 830 based on 1 QPLPO per Top of Rack (T), which is sufficiently large for all mice flows in the WSDC. In SOOS, 48 Ethernet Intra-P Fabric EPS 830 of 96 QPLPO and 48 additional Ethernet Inter-P Spine EPS of 48 QPLPO are added to the 2304 Top of Rack EPS for a total number of 2304+48+96=2400 Ethernet EPS. Consequently, to handle mice flows within the SOOS, there are (48×96Q)+(48×48Q)=691Q EPS ports in the Ethernet EPS Fabric-Spine tiers. By comparison, the 3+1 Posts 48R×48P prior art architecture of Facebook, see for example (https://code.facebook.com/posts/360346274145943/introducing-data-center-fabric-the-next-generation-facebook-data-center-network/, is designed to include up to 64 fabric switches of 96 QSFP+ and up to 192 fabric switches of 64 QSFP+, which amounts to (64×96Q)+(192×64Q)=18,432Q EPS ports in the Fabric-Spine tiers. Thus this prior art design requires 18432/6912=2.7 times as many EPS ports as the SOOS EPS Fabric-Spine tiers according to an embodiment of the invention.

Within the SOOS according to an embodiment of the invention, in any given pod Pod (n) 810(n), each top of rack T has its uplink ports allocated as follows, 12 Q to 12 different intra-P S, 12 Q to 12 inter-P S as well as 1 Q to each of 48 different Ethernet Fabric EPS, for a total of 25 Q. Each top of rack T of 32 Q, would thus have 32Q−25Q=7Q remaining for servers, which is enough for 7×4=28 computer servers C at the 1/4 line rate per rack. Similarly, a top of rack T of 48 Q (of the same size as the Spine EPS in SOOS), would have 48−25=23Q for 23 servers at the Q line rate and up to 23×4=92 computer servers C at the 1/4 line rate. Within SOOS only 3 T hops through the optical switches separate any two computer servers C across any two pods P, whereas in a 3-tier Leaf-Fabric-Spine, in addition to 2 T hops, there are 2 Fabric hops and 1 Spine hop, for a total of 5 hops between any two computer servers C across any two pods P. Consequently, the latency due to EPS is decreased within the inventive SOOS over a prior art 3-tier Leaf-Fabric-Spine architecture.

Within any given pod Pod n 810(n) of the exemplary SOOS architecture depicted in FIG. 8, at the QSFP+ line rate, the total optically switched bandwidth between all top of rack switches is 48T×12Q×40 Gbps=23,040 Gbps on a 48 degree radix, thus the optically addressable capacity is 23,040 Gbps×48 radix=1.1 Pbps (1.1 peta bits per second). At the QSFP28 line rate, however, the bandwidth is 48T× 12Q×100 Gbps=57,600 Gbps on a 48 degree radix. The addressable capacity therefore is 57,600 Gbps×48 radix=2.76 Pbps. Within the WSDC, the total number of transceivers in the top of racks T connected to Intra-P S and Inter-P S, is 24×230T(24QperT)=55,296Q. Since each circuit has 1 Q at each end, at the QSFP28 line rate, the total available bandwidth prior to optical switching would be (55296Q/2)×100 Gbp2.76 Pbps. This bandwidth is first optically switched on a 48-degree radix by all 576 Intra-P S optical switches and then optically switched again, on an additional 48-degree radix by all 576 Inter-P S optical switches. The total resulting addressable bandwidth across the entire WSDC is 2.76 Pbps×48×48=6,359 Pbpss (intra-P+inter-P). The entire WSDC has thus 6,359 Pbps/2.76 Pbps=2,304 times as much optically switched bandwidth as simultaneous bandwidth. Referring to FIG. 8 there is depicted the growth in EPS ports and optical switching ports in the entire SOOS WSDC as a function of the scale out. It is shown that the sum of SOOS ports is significantly smaller than the number of EPS ports of an alternative prior art WSDC design based upon a 3-tier Clos at the same sustained bandwidth as described in SOOS.

3. Large-Scale Silicon Photonics MOEMS Integration for Optical Switches

3A: Optical Switch Concept

Figure 9:
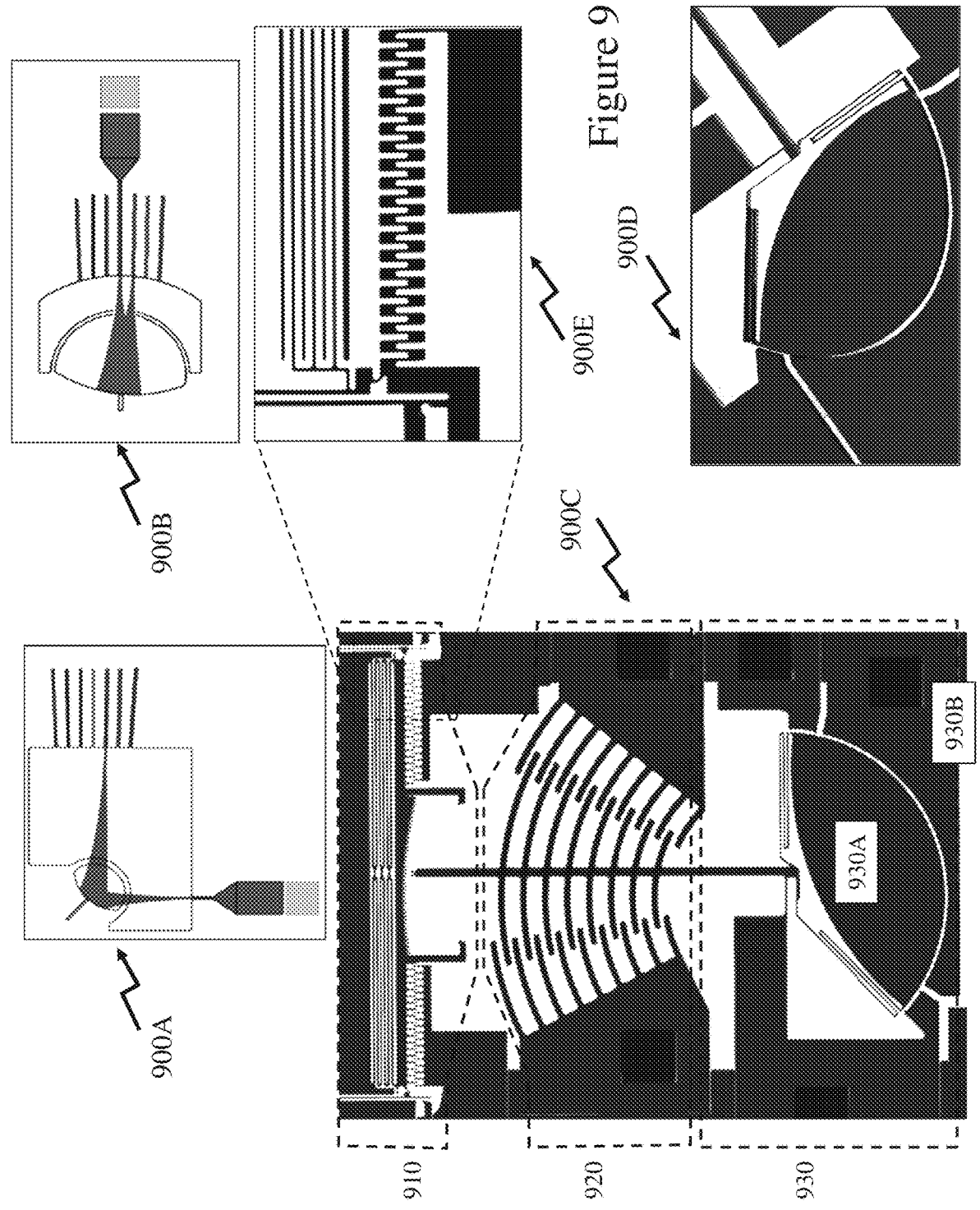
FIGS. 9 to 11 depict an optical switching technology exploiting MOEMS-turning silicon (MOTUS) supporting photonic switching fabrics such as MOS and SOOS as depicted in FIGS. 3 to 8.

Within each MOS RNA 650 described with respect to FIGS. 6 through 8 multiple 1:32 photonic optical switching devices are employed for the transmitter side routing TxOS 740 optical engines and the receiver side routing RxOS 770 optical engines. These exploit a micro-optic tunable switch (MOTUS) core based upon novel MOEMS developed by the inventors. Referring to FIG. 9 first and second optical engines 900A and 900B are depicted exploiting a tunable MOEMS for routing to/from N output waveguides from/to a single waveguide via a rotational MEMS mirror with the mirror on the rear or front facets of the MEMS mirror respectively. As depicted in optical micrograph 900C and first micrograph 900D the tunable MEMS comprises a mirror section 930 wherein the curved MEMS mirror 930A turns relative to a planar waveguide region 930B to which are coupled the channel waveguides. The curved MEMS mirror 930A is coupled to a MEMS actuator 920 which rotates the curved MEMS mirror 930A under electrostatic actuation. To reduce power consumption the curved MEMS mirror 930A may be latched into position using latching actuator 910 which is depicted in detail in second micrograph 900E. The latch lock comprises a movable part as depicted in second micrograph 900E on both sides of the latching moving into lock position whilst the latch moves down. The actuator of the lock allows the latch to move freely up and down.

Alternate embodiments of 1×N optical switches without a mirror element within the MOTUS are depicted and described below in respect of FIGS. 20A and 20B. An alternate embodiment using a directional coupler, or other optical coupler, network rather than a second optical switch on the combining stage of a circuit comprising multiple optical switches on the same silicon die are depicted and described with respect to FIG. 13B.

3B: Optical Waveguide Technologies

MOEMS and particularly MEMS mirrors and other MEMS actuators are typically fabricated with the silicon as the substrate of choice due to the availability of standard MEMS fabrication processes, prototyping facilities, and production operations, e.g. MUMPs (Multi-User MEMS Processes) from MEMSCAP, Sandia National Laboratories SUMMiT V processes, Teledyne DALSA's Multi-Project Wafer "Shuttle" runs and production facilities, and STMicroelectronics high volume MEMS manufacturing facilities for example.

3B.1: Silicon Nitride Waveguide Platform

Figure 10:
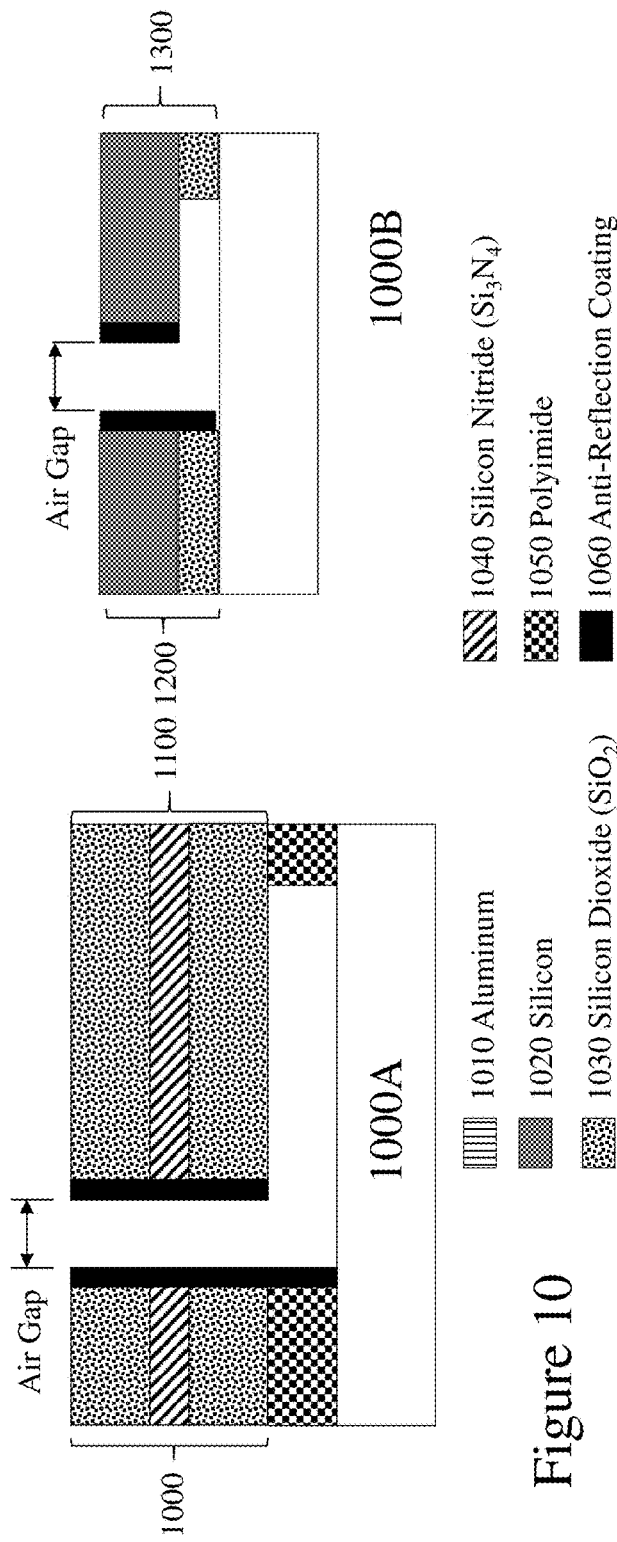

Amongst the optical waveguide technology options for optical waveguides in the telecommunication windows at 1300 nm and/or 1550 nm on silicon are silicon nitride ($Si_3N_4$) cored waveguides with silicon dioxide ($SiO_2$) cladding. An example of such a waveguide geometry is depicted in first waveguide cross-section 1000A in FIG. 10. Accordingly, the optical waveguide 1000 comprises a lower silicon dioxide 130 cladding, a silicon nitride ($Si_3N_4$) 140 core, and an upper silicon dioxide ($SiO_2$) 130 cladding. The waveguide cross-section 1000A is depicted where an optical waveguide 1000 couples via an air gap to the MEMS mirror (MEMSM) 1100 within a tunable component employing a MEMS element, such as the curved MEMS mirror 930A relative to the planar waveguide region 930B. As the optical waveguide is 10 μm thick the MEMSM 1100 at the air gap interface may be the same material structure atop an actuated silicon (Si) MEMS structure formed within the Si substrate. The optical waveguide 1000 has below it before the Si substrate a layer of polyimide which is etched back to form part of the pivot for the MEMSM 1100. Deposited onto the vertical end wall of the optical waveguide 1000 and wall of the MEMSM 1100 are anti-reflection coatings.

Now considering design guidelines for a $Si_3N_4$ waveguide based MEMSM wavelength tunable PIC circuit then consider a MEMS mirror design radius of 1.00 mm, that the optical waveguides coupling to the Bragg reflectors are spaced 200 μm away from the edge of the MEMSM, and that in each instance the distance from the pivot mounting of the MEMSM to the optical waveguides is equal to the radius of the MEMSM. Accordingly, the resulting width of the MEMSM is 950 μm and considering a maximum angular rotation of the MEMSM as ±3° then the lateral spacing between the upper and lower end waveguides is 105 μm respectively. Now considering 0.75 μm spaced waveguides the maximum number of channels accessible is 74 (+37 channels from centre) at a design radius of 1.00 mm and at a smaller 0.5 μm channel spacing it is 80 channels (±40 channels from centre). Accordingly, it would be evident that with a $Si_3N_4$ waveguide technology that the number of channels can be significant. With different design parameters devices such as smaller MEMS mirror design radius devices with channel counts of 12, 16, 18, 24, 32, and 40, for example, may be implemented within the ±3° MEMS mirror rotation and smaller die footprint. Accordingly, high channel count compact electro-statically actuated MEMS 1:N and N:1 optical switches with small footprint and low power consumption can be implemented upon a manufacturing platform supporting integrated CMOS electronics and high volume low cost standard processes.

3B.2: Silicon on Insulator Waveguide Platform

Amongst the optical waveguide technology options for optical waveguides in the telecommunication windows at 1300 nm and 1550 nm on silicon are silicon-on-insulator waveguides with air cladding at the top and silicon dioxide ($SiO_2$) cladding at the bottom. Such a platform is depicted in second waveguide cross-section 1000B in FIG. 10 with a waveguide geometry 1200 comprising a lower silicon dioxide ($SiO_2$) 130 lower cladding, a silicon 120 core, and relying on the refractive index of air or another material to form the upper cladding. The waveguide cross-section 1000B is similarly depicted where the optical waveguide 1200 couples via the air gap to the MEMSM 1300, such as the curved MEMS mirror 930A relative to the planar waveguide region 930B.

However, due to the high refractive index of the Si 120 the thickness limit of the silicon (Si) for a single-mode waveguide is 220 nm which is generally too thin for MEMS devices. However, at a thickness of 5 modes exist within a silicon planar waveguide having modal indices of 1 μm and accordingly a rib waveguide geometry may be employed in order to select the fundamental mode. Accordingly, the MEMSM 1300 for 1 μm Si may be formed from the same material. Due to the refractive indices the anti-reflection (AR) layer on the air gap of the optical waveguide 1200 and MEMSM 1300 can be formed from parylene with a refractive index of 1.66. The thickness of the AR coating would be approximately 233 nm.

Figure 11:
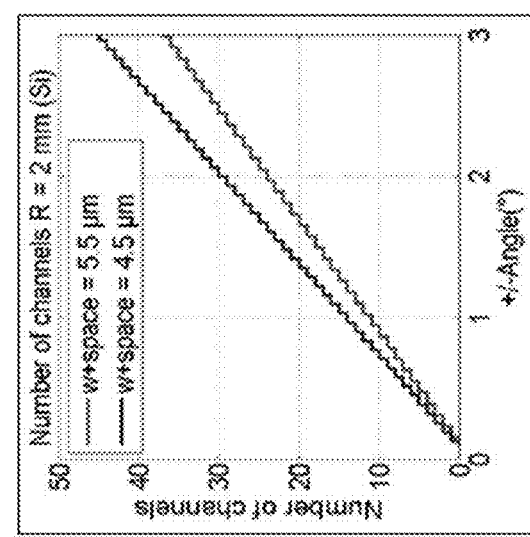

Now considering design guidelines for a silicon-on-insulator waveguide based MEMSM wavelength tunable PIC circuit then consider a MEMS mirror design radius of 2.00 mm, that the optical waveguides are spaced 200 μm away from the edge of the MEMSM and the distance from the pivot mounting of the MEMSM to the optical waveguides is equal to the radius of the MEMSM. Accordingly, the resulting width of the MEMSM is 680 μm and, again, considering a maximum angular rotation of the MEMSM as ±3° then the lateral spacing between the upper and lower end waveguides is 209 μm. Referring to FIG. 11 there is depicted the number of accessible channels for optical waveguides having spacings of 4.5 μm and 5.5 μm respectively. Accordingly, for 5.5 μm spaced waveguides the maximum number of channels accessible is 74 (+37 channels from centre) at design radii of 2.00 mm whilst the corresponding maximum number of channels accessible for this design radii with 4.50 μm channel spacing is 90 channels (+45 channels from centre).

Accordingly it would be evident that with a silicon-on-insulator waveguide technology similarly allows for a significant number of channels. With different design parameters devices such as smaller MEMS mirror design radius devices with channel counts of 12, 16, 18, 24, 32, 40, and 64, for example, may be implemented within the ±3° MEMS mirror rotation and smaller die footprint. Accordingly, high channel count compact electro-statically actuated MEMS 1:N and N:1 optical switches with small footprint and low power consumption can be implemented upon a manufacturing platform supporting integrated CMOS electronics and high volume low cost standard processes.

3C: MOTUS Based MOS Optical Switch Modules

The dimensions of the novel silicon photonics based MOTUS 1:N (e.g. N=32) then the packaged component is not constrained by the footprint of the circuit, but rather by the space required by the N+1, e.g. 33, strands of optical fiber attached to the chip. The planar optical circuit chip is designed with N+1 high-quality v-grooves, making it possible to attach, with low-loss, a large array of N+1 optical fibers. As a result of the large quantity of optical fibers attached to the same chip, a practical limit has been found in the packaging multiple, for example four, instances of high N 1:N planar optical switches onto the same chip. A fully silicon packaged chip, inclusive of four 1:32 planar MOTUS optical switches, measures less than 150 nm² and provides for enough space for the attachment of the required 4×(32+1)=132 strands of optical fiber. In contrast the MOTUS 4×(1:32) die itself is sufficiently small enough that over 200 chips can be made from a single 8-inch wafer. Wafer scale testing of the optical switches makes it possible to achieve a cost per chip similar to what is possible in the microelectronics industry for other kinds of silicon chips such as integrated circuits.

Accordingly, it would be evident that such 1: N MOTUS optical engines may form the basis of the 1:32 TxOS 740 and 32:1 RxOS 770 within the 3U Rack Unit 710 modules 730A to 730D or 1U Rack Unit 720. However, further integration using 16 "chips" with four 1:32 MOTUS switch instances within each would allow a single printed circuit board to be packaged with 64 fibers facing the ToR QSFP+ interfaces and 2048 fibers facing other modular optical switches. The resulting 64×2048 modular optical switch is compact enough with low power to support within a single data center rack unit configuration. The stacking of modular optical switches is made possible through high-density fiber optical jumpers connecting their internal fiber shuffles together. The modularity of the optical switches makes it possible to deploy them coincidentally with additional ToRs at the time of commissioning new racks. Further, as these MOTUS optical switches are low-power, low-cost, protocol agnostic, payload agnostic, wavelength division multiplexing agnostic and avoid single point of failures they support the upgrade of data rates through TDM and WDM.

3D: MOTUS Based Leaf and Spine Optical Switch Modules

Figure 12:
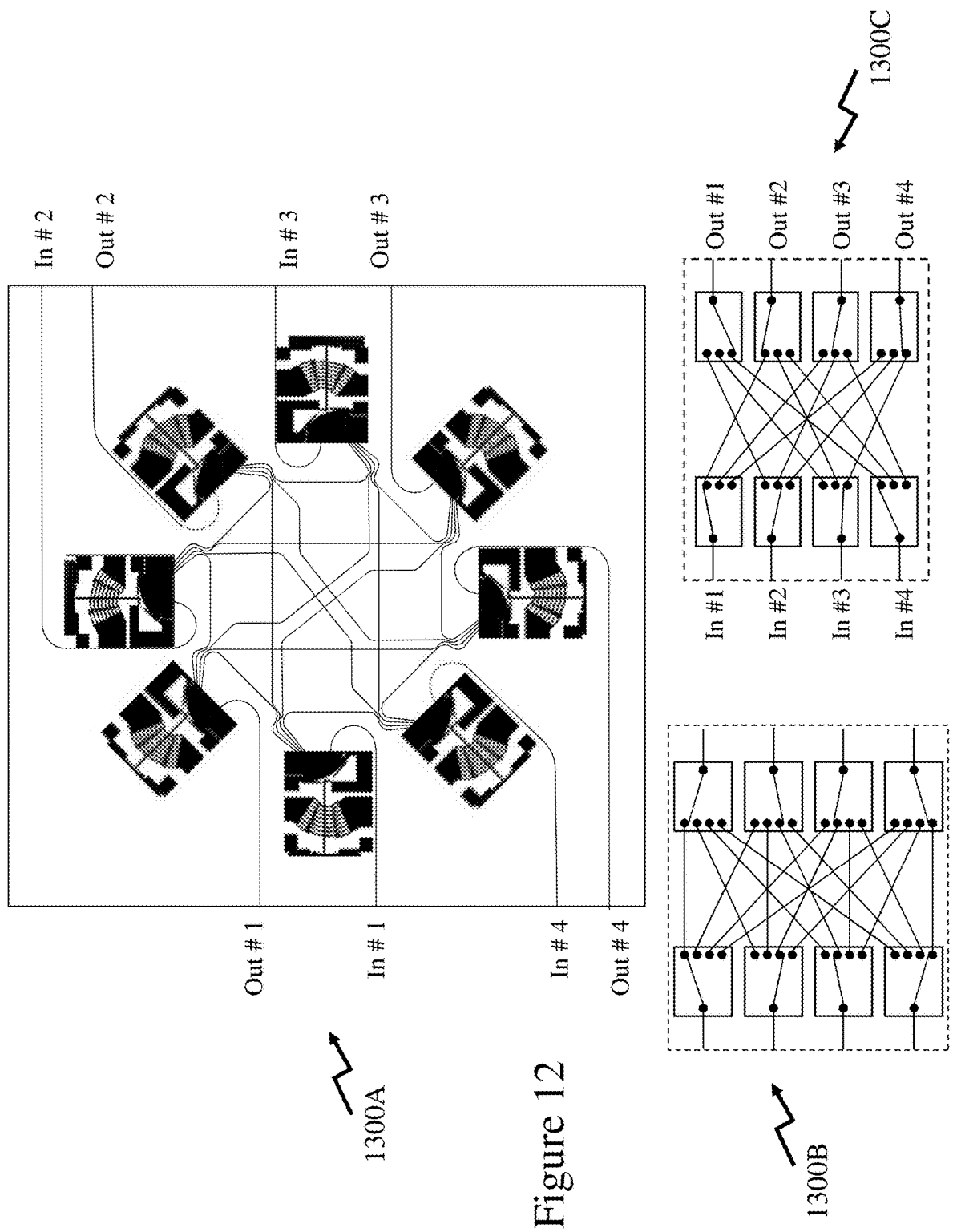
FIG. 12 depicts a 4×4 photonic switch fabric exploiting multiple instances of MOTUS on the same die providing reduced crossover count, perpendicular crossovers, and a strictly non-blocking architecture according to embodiments of the invention.

The MOTUS optical engines described and depicted above for high N 1:N and N:1 optical switches can also be applied to small N N×N optical switches such, for example, a 4×4 non-blocking building block using 4-ary 2-fly switching methodology. As N=4 then more compact rotary MEMS elements may be employed within the MOTUS optical engines allowing a fully integrated 4×4 matrix to be integrated into a 4 mm$^2$ die as depicted in FIG. 12 with layout 1300A comprising a fully connected switch matrix such as depicted in schematic 1300B 4 1:4 optical switches and 4 4:1 optical switches with fully connected optical interconnect. Accordingly, the 4×4 4 mm$^2$ die now has only 8 optical fiber connections. Such a 4×4 may form the basis of an optical switch module within a Leaf Switch. It would be evident that the fully connected switch matrix provides strictly non-blocking routing and reconfiguration within such a Leaf Switch. The architecture may be generalized to N×N using 1: N and N:1 optical switches although with increasing N the waveguide interconnect may be moved off-chip due to the complexities of routing the N$^2$ cross-connect.

Accordingly, it is possible to consider an optical spine switch wherein an input array of 64×(1×64) input switches are coupled to 64×(64×1) output switches via a 64×64=4, 096 fiber interconnection network. Such an optical interconnect may exploit optical fiber and/or polymer flexible planar interconnection methodologies or exploit staked V-groove interconnections for a compact 64×64 cross-connect with the 64 outputs of a switch in an input V-groove coupled to an output V-groove array of 64 V-groove assemblies at right angles.

Within optical switching applications according to embodiments of the invention the likelihood of a transmitter within a node routing to a connection that routes back to an associated receiver is low and accordingly depicted in FIG. 12 in second schematic 1300C there is depicted a reduced complexity (RC) N×N optical switch (RCOS) according to an embodiment of the invention. As depicted the RCOS employs N 1: (N−1) and (N−1): 1 switch matrices and having a (N−1)×(N−1) cross-connect. Accordingly, each input In #X(X=1, 2, 3, 4) may route to an output Out #Y(Y=1, 2, 3, 4)(Y≠X) with reduced complexity switching and optical interconnect.

Figure 13:
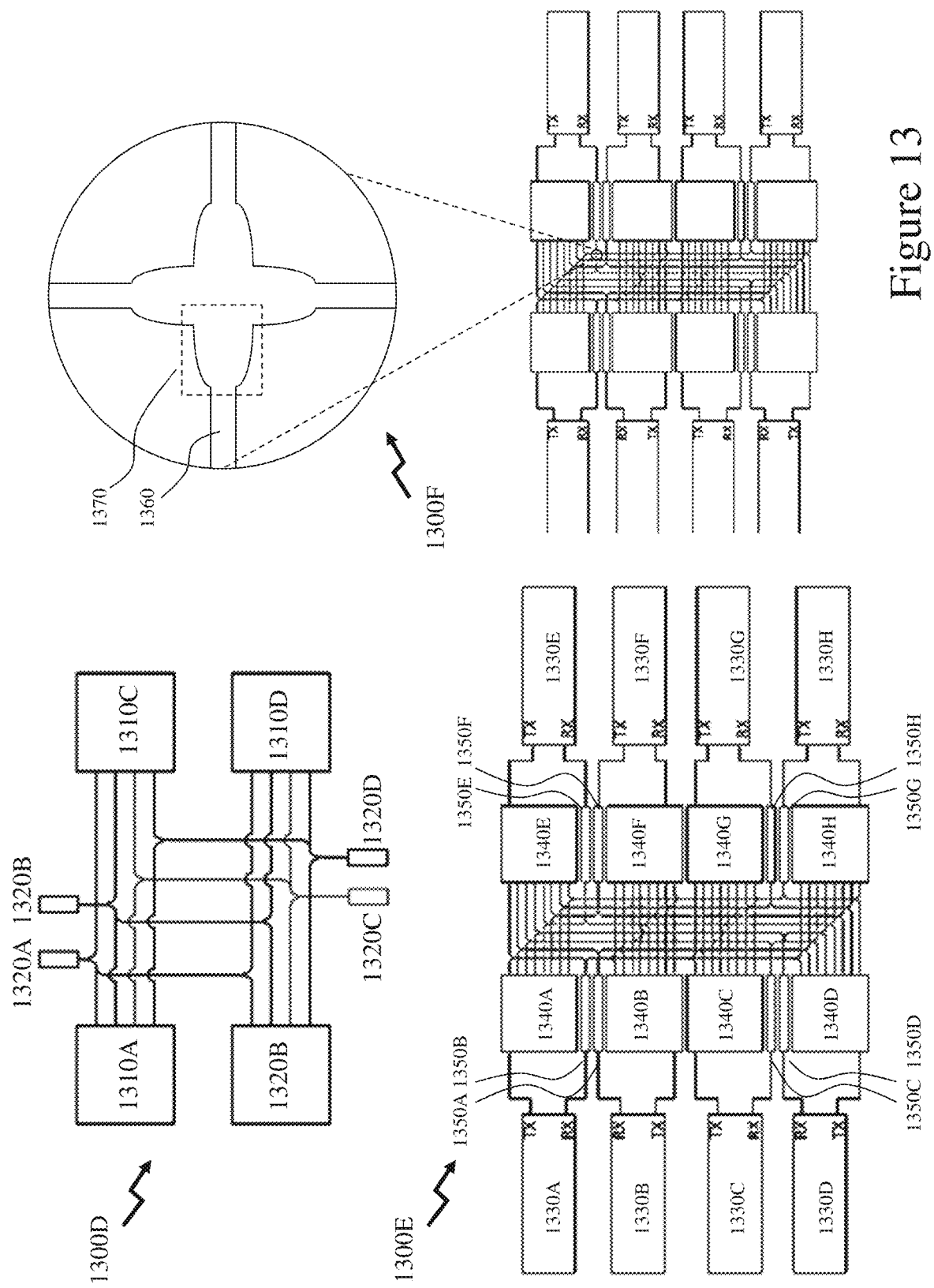
FIG. 13 depicts 4×4 and 8×8 optical switch matrices according to embodiments of the invention employing MOTUS optical engines and directional couplers for enhanced layout and reduced cross-overs.

Now referring to FIG. 13 there are depicted 4×4 and 8×8 optical switch matrices within first and second image 1300D and 1300E respectively according to embodiments of the invention employing and MOTUS optical engines respectively in conjunction with directional coupler based routing to the optical receivers. First image 1300D depicts an 4×4 optical switch comprising first to fourth MOTUS optical engines 1310A to 1310D which are coupled to data sources, not shown for clarity, and select an output port for transmission to a selected receiver of first to fourth optical receivers 1320A to 1320D respectively under control of a controller, not shown for clarity. Each output port from a MOTUS optical engine 1310A to 1310D respectively is coupled via one or more directional couplers to the selected receiver. Due to the design of the cross-over matrix each optical path consists of horizontal and vertical links to/from the directional couplers such that optical cross-overs between paths are 90 degrees for high crosstalk and low loss. However, the architecture also reduces the number of cross-connects when compared to a conventional fully connected architecture.

In contrast, in second image 1300E extension of the design methodology is presented for a 8×8 switch matrix wherein first to eighth pluggable transceivers 1330A to 1330H are coupled to first to eighth MOTUS optical switches 1340A to 1340H and first to eighth receivers 1350A to 1350H respectively. The optical output of each first to eighth MOTUS optical switches 1340A to 1340H is coupled to a directional coupler based routing matrix and therein to the appropriate receiver of the first to eighth receivers 1350A to 1350H respectively. This configuration provides for loop-back whereas if this feature is not required the matrix can be reduced to a multiple fiber interconnect. Again due to the design of the cross-over matrix each optical path consists of horizontal and vertical links from each MOTUS optical switch to a receiver via the directional couplers such that optical cross-overs between paths are 90 degrees for high crosstalk and low loss. Again, the architecture also reduces the number of cross-connects when compared to a conventional fully connected architecture.

Also depicted in FIG. 13 is a cross-over 1300F according to an embodiment of the invention such as implemented within the 4×4 and 8×8 optical switch matrices within first and second images 1300D and 1300E respectively in FIG. 13B. At the cross-over 1300F each optical waveguide 1360 has a taper 1370 expanding the optical beam thereby improving the performance of the cross-over 1300F. Within the tapers 1370 sub-wavelength nanostructures may be formed to further improve the performance of the cross-over by enhancing mode conversion to an expanded beam. Accordingly, insertion loss may be reduced.

Notwithstanding the aforementioned 4×4 and 8×8 optical switch matrices employing on-chip waveguide crossings, it would be apparent to one skilled in the art that larger switch matrices may be designed at the expense of additional crossings. For instances, a 48×48 design may require about 95 perpendicular crossings in the path of any switched position, which at 0.01 dB/crossing would result in about 1 dB of additional on-chip losses due to crossings.

4. Time Dilated Spatial Switch Matrices

Figure 14:
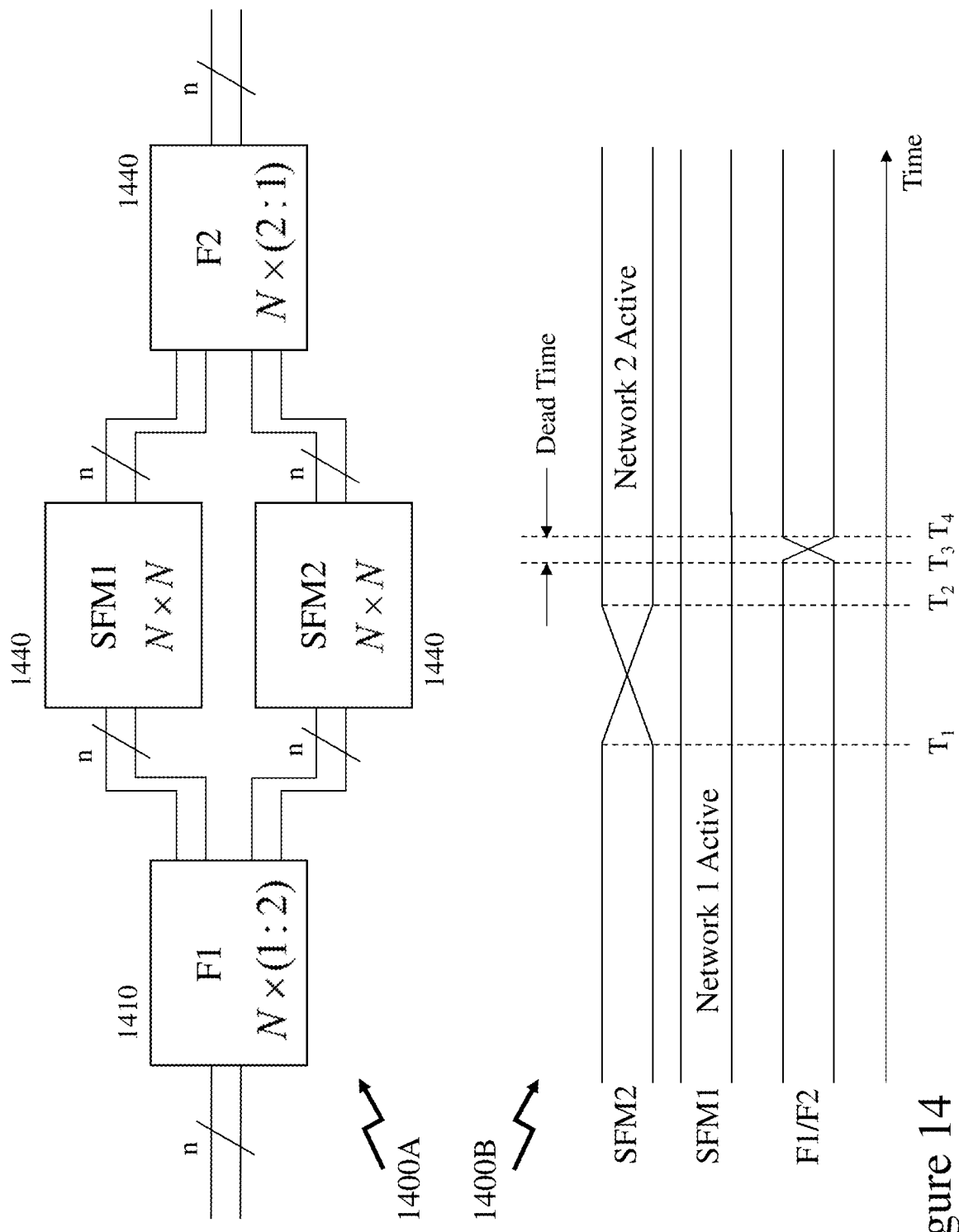
FIG. 14 depicts an architecture for spatial diversity photonic switching fabric employing an initial time domain switching planes according to an embodiment of the invention.

Within embodiments of the invention with respect to FIGS. 4 to 8 and FIG. 13 MOEMS based MOTUS optical switching engines provide a compact, low-power, low-cost, protocol agnostic, payload agnostic, and wavelength division multiplexing agnostic technology for providing photonic switching fabrics within Leaf-Spine routing structures within data centers. Such MOEMS based MOTUS optical switching engines may also be employed within other photonic switching fabrics such as the routers, wavelength add-drop multiplexers, protection switching, etc. However, the switching speed of these MOEMS based devices employing rotating mirrors is of the order of 10 μs-100 μs which in many applications may be too slow due to the requirement that the optical link being reconfigured is inactive during the switching process. Accordingly, the inventors have established time dilated spatial switch matrices or temporospatial switch matrices. Referring to FIG. 14 there is depicted a temporospatial N×N switch 1400A employing first and second temporal switching stages 1410 and 1440 in conjunction with central spatial switching stage comprising first and second matrices 1420 and 1430. First and second temporal switching stages $Si_3N_4$ 1410 and F2 1440 comprise N×(1×2) and N×(2×1) switching arrays whilst first and second matrices SFM1 1420 and SFM2 1430 comprise N×N switching matrices.

Accordingly, as depicted by timing diagram 1400B optical traffic is initially routed through first matrix SFM1 1420 until a time $T_1$ wherein the second matrix SFM2 1430 is triggered to the new desired configuration. Accordingly, at $T_2=T_1+T_{MEMS}$, where $T_{MEMS}$ is the switching time of the MOEMS switch, the second matrix SFM2 1430 is established and after a buffer period, $T_{BUFFER}$, the first and second temporal switching stages F1 1410 and F2 1440 are triggered, $T_3=T_2+T_{BUFFER}=T_1+T_{MEMS}+T_{BUFFER}$, such that at $T_4=T_3+T_{FAST}=T+T_{MEMS}+T_{BUFFER}+T_{FAST}$, where $T_{FAST}$ is the switching speed of the first and second temporal switching stages F1 1410 and F2 1440 respectively, the new switching configuration is established and active for live traffic. If the first and second temporal switching stages F1 1410 and F2 1440 which are depicted as arrays of 1:2 and 2:1 switches are implemented using lithium niobate photonic circuits then sub-nanosecond switching speeds can be achieved with ease. According to the photonic circuit technology of the first and second temporal switching stages F1 1410 and F2 1440 switching speeds from microseconds to sub-nanosecond may be achieved. As such the MOEMS switching time, $T_{MEMS}$, defines the maximum rate of reconfiguration of the temporospatial N×N switch 1400A provided $T_{MEMS} \leq T_{ELAPSE}+T_{FAST}$, whilst the first and second temporal switching stages F1 1410 and F2 1440 define the switching speed of the temporospatial N×N switch 1400A.

Figure 15:
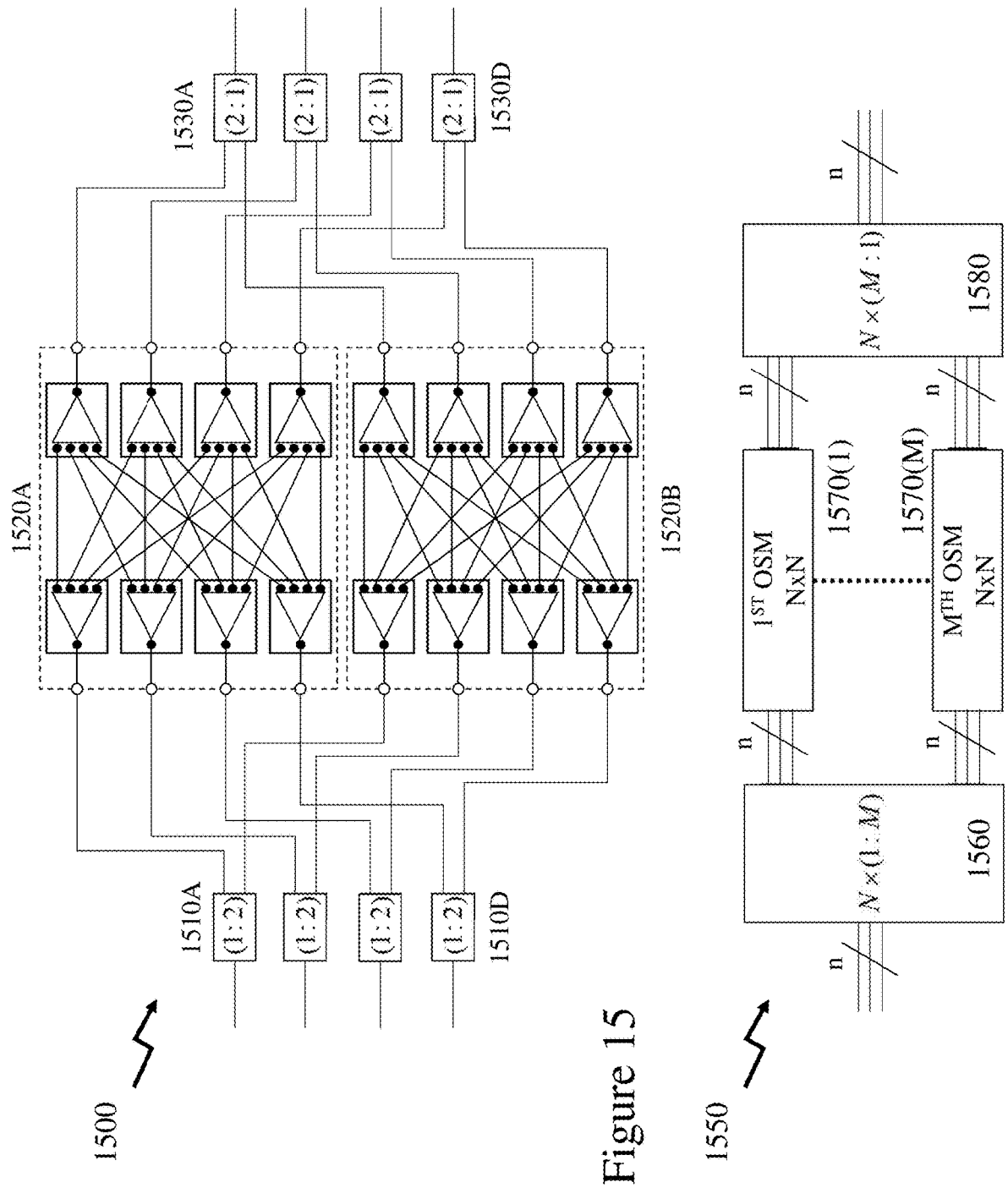
FIG. 15 depicts the architecture of FIG. 14 applied to an exemplary 4×4 strictly non-blocking spatial diversity fabric and as a generalized architecture of n channels in conjunction with m-order time domain diversity of N×N core spatial diversity fabric.

Referring to FIG. 15 there is depicted an exemplary temporospatial N×N switch 1500 comprising first and second 4×4 spatial matrices 1520A and 1520B together with first to fourth input 1×2 temporal switches 1510A to 1510D respectively and first to fourth output 1×2 temporal switches 1530A to 1530D respectively. Exploiting photonic circuit technologies all 8 temporal switches may be integrated to a single die and both 4×4 spatial matrices may be integrated to a single die and these co-packaged. Alternatively, compound semiconductor InGaAsP switches with or without integrated optical amplification may be employed for the temporal switches or as developments continue on silicon photonics potentially the temporal and spatial switches may be formed within the same silicon die.

The temporospatial N×N switch is generalized in temporospatial N×N switch 1550 in FIG. 15 wherein M N×N spatial switches 1570(1) to 1570(M) are depicted as being disposed between an input temporal switch 1560 providing N channels of 1:M switching and output temporal switch 1580 providing N channels of M:1 switching. In contrast to temporospatial N×N switch 1400A with only 2 spatial switching matrices the M spatial switching matrices allow the temporospatial N×N switch 1550 to reconfigure at a rate faster than $T_{MEMS}$ as, for example once a second spatial N×N switch has been configured and active then rather than the temporospatial N×N switch waiting for the first spatial N×N switch to reconfigure and be switched back for live traffic a third N×N switch may already be reconfiguring. Accordingly, the dimension M may be established in dependence upon the maximum reconfiguration rate and the switching time of the spatial matrices, ignoring buffering delays such as $T_{ELAPSE}$ and the temporal switching time $T_{FAST}$.

Figure 16:
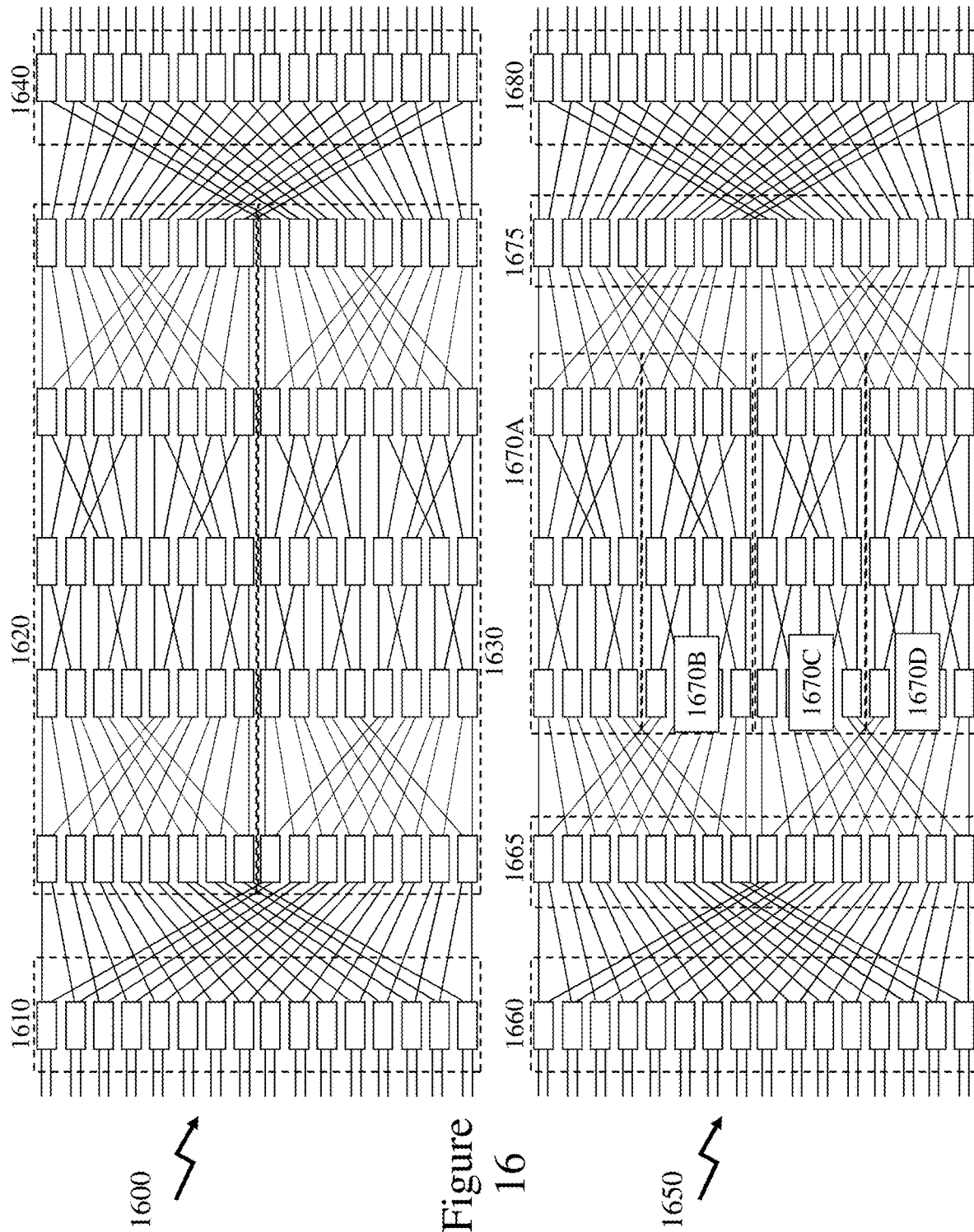
FIG. 16 depicts the architecture of FIG. 14 applied to an exemplary 8×8 spatial diversity fabric with 2-time domain diversity channels in conjunction with 8×8 core spatial diversity re-arrangeable non-blocking fabrics.

The temporospatial N×N switch (TSN2S) methodology according to embodiments of the invention may also be applied to rearrangeable non-blocking switch fabrics as well as strictly non-blocking switch fabrics as depicted in FIG. 16 with first and second TSN2S matrices 1600 and 1650 respectively employing a common 32×32 rearrangeable Benes network employing 2×2 switching elements. Referring to first TSN2S 1600 then this may be viewed as a degree-2 16×16 TSN2S employing first and second 16×16 spatial matrices 1620 and 1630 with input and output temporal matrices 1610 and 1640 of complexity 16×(2×2). Alternatively, as depicted in second TSN2S 1650 then this may be viewed as a degree-4 8×8 TSN2S employing first to fourth 8×8 spatial matrices 1670A to 1670D which are disposed between first and second input temporal 16×(2×2) matrices 1660 and 1665 and first and second output temporal 16×(2×2) matrices 1670 and 1675. The first and second input temporal 16×(2×2) matrices 1660 and 1665 and first and second output temporal 16×(2×2) matrices 1670 and 1675 being coupled via a perfect shuffle and the second input temporal 16×(2×2) matrix 1665 and second output temporal 16×(2×2) matrix 1675 being coupled to the first to fourth 8×8 spatial matrices 1670A to 1670D via 2 perfect shuffle networks connecting the upper 8 2×2 switches to first and second 8×8 spatial matrices 1670A and 1670B and the lower 8 2×2 switches to third and fourth 8×8 spatial matrices 1670C and 1670D.

Accordingly, if the 32×32 rearrangeable Benes network is constructed with fast switches for the first, second, sixth, and seventh ranks and slow switches for the third to fifth ranks of switches then it may be deployed as either a degree-2 16×16 TSN2S or degree-4 8×8 TSN2S. These configurations are depicted alternatively in first and second schematics 1700 and 1750 in FIG. 17 as alternating planes of switching. The first and second input temporal 16×(2×2) matrices 1660 and 1665 and first and second output temporal 16×(2×2) matrices 1670 and 1675 may alternatively be replaced by 8×(1×4) and 8×(4×1) input and output temporal matrices respectively.

Figure 17:
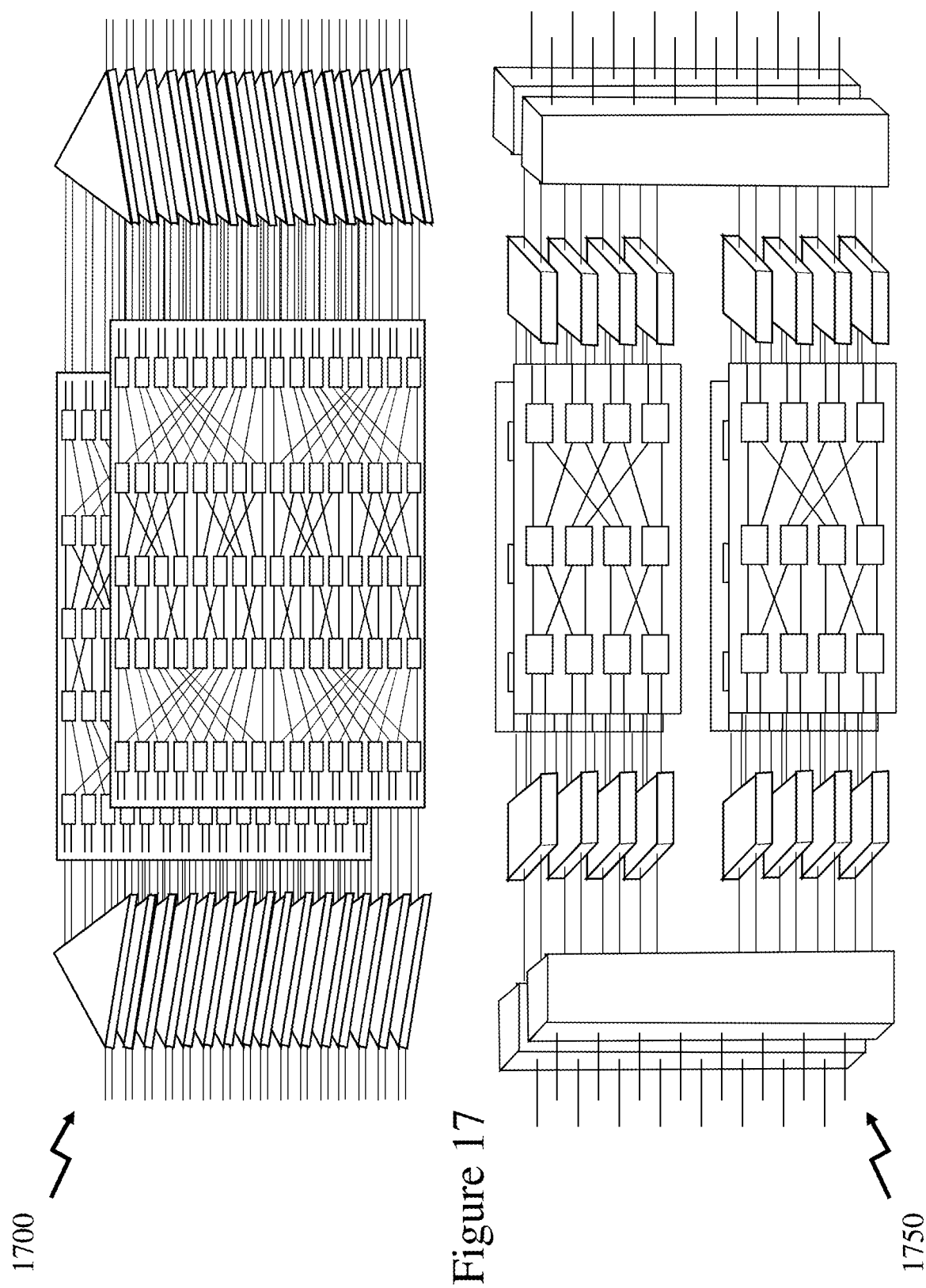
FIG. 17 depicts the architecture of FIG. 14 applied to an exemplary 8×8 spatial diversity fabric with 2 and 4-time domain diversity channels in conjunction with 8×8 and 4×4 core spatial diversity re-arrangeable non-blocking fabrics.
Figure 18:
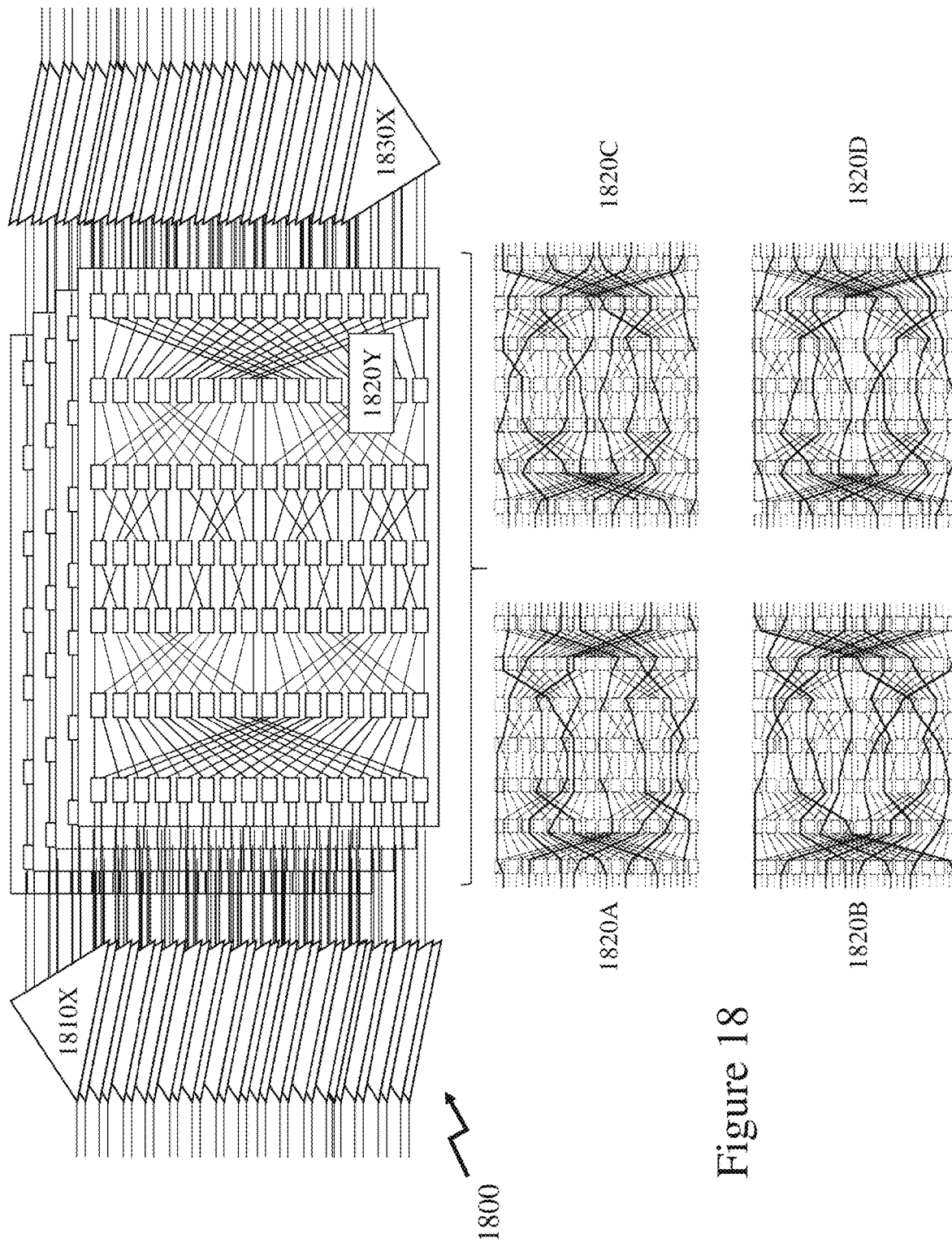
FIG. 18 depicts the architecture of FIG. 14 applied to an exemplary 16×16 spatial diversity fabric with 4-time domain diversity channels in conjunction with 16×16 core spatial diversity re-arrangeable non-blocking fabrics with concurrent spatial diversity fabric utilization.

A degree-4 32×32 temporospatial switching fabric employing such 32×(1×4) and 32×(4×1) input and output temporal matrices is depicted in FIG. 18 with first schematic 1800. However, in contrast to temporospatial switching fabrics described above in respect of FIGS. 14 to 17 wherein strictly non-blocking or rearrangeable non-blocking matrices are described explicitly or implicitly described as switched into use individually based upon the temporal switches all operating together. However, in these scenarios the spatial matrix being established for the next reconfiguration must be fully configured prior to the temporal switches switching. However, this does not necessarily have to be operated in such a manner. Alternatively, paths within the 4 32×32 temporospatial switching fabrics 1820Y (Y=A, B, C, D) may be established in parallel with the temporal input and output switches 1810X operating independently of one another. Accordingly, as depicted with first to fourth 32×32 temporospatial switching fabrics 1820A to 1820D respectively the paths may be established within the 32×32 temporospatial switching fabrics concurrently and the next configuration for reconfiguring paths established within another of the 32×32 temporospatial switching fabrics. Accordingly, only the path or paths reconfiguring must stop transmitting for the reconfiguration whereas in the routing of all paths through a single temporospatial switching fabric all paths must suspend transmission.

It would be evident that the temporospatial switching fabric such as depicted in FIG. 18 may through increased complexity within the control algorithm perform periodic re-packing of the paths so that the multiple planes employ the minimum number of switching elements thereby allowing increased flexibility in establishing new optical paths without requiring one or more existing paths be reconfigured at the same time. Alternate re-packing may, for example, seek to partition all routes to a particular spatial switch plane or re-pack subsets of input ports to different predetermined spatial switch planes. It would be evident that the temporospatial switching fabric such as depicted in FIG. 18 may be employed with strictly non-blocking spatial switch fabrics, wide sense non-blocking spatial switch fabrics, rearrangeable non-blocking spatial switch fabrics, and blocking spatial switch fabrics. Optionally, the plurality of spatial switching fabrics may be all the same or in other embodiments of the invention different blocking levels of spatial switching fabrics may be employed. Optionally, the input and output temporal switch arrays may be configurable in the wavelength domain such that particular ports are associated with specific wavelength(s). Optionally, some spatial switching fabrics may be of different dimensions to others within the temporospatial switching fabric or may exploit alternate technologies such that some planes of the plurality of spatial switching fabrics route at different rates. For example, a MOEMS 1:4 MOTUS optical engine with reduced angular rotation may be designed to switch faster than a MOEMS 1:32 MOTUS optical engine in the same technology. As such short burst "elephant" traffic may be routed through such a spatial switching fabric due to the ability to reconfigure the plane faster than others. Optionally, traffic routed to this plane may if the link exceeds a predetermined duration be routed onto another plane of the spatial switching fabrics. It would be evident that a range of configurations may be employed without departing from the scope of the invention.

Within the descriptions supra in respect of FIGS. 14 to 18 determination with respect to the configuration of the temporospatial switching fabrics in respect of mapping input ports to output ports is implicitly determined by a controller. It would be evident that in embodiments of the invention that the controller may be provided by the mapping from a remote controller, e.g. within the data center, based upon signaling from the devices connected to the temporospatial switching fabric (e.g. the leaf switches), or based upon signaling from devices impacted by traffic loading (e.g. spine switches wherein the temporospatial switching fabric is connected to leaf switches). Alternatively, the necessary control information for the temporospatial switching fabric may be locally derived such as for example, by analysis of the signals received, e.g. header/preamble data.

Within other embodiments of the invention the temporospatial switching fabric may be employed in offloading network pipelines where the packet switching layer is heavily loaded. Accordingly, the temporospatial switching fabric may be a hybrid switch with both optical and packet switch ports wherein these are then all routed optically but the packet switch ports are routed to the packet switch rather than to local/remote optical interfaced equipment/network(s). Accordingly, it would be possible to probe into the packet header in the switch pipeline deep buffers, and identify from the header, prior to the payload hitting the temporospatial switching fabric the configuration required for the next packet whilst the first packet is being transferred. Accordingly, the amount of dead time in transmitting could be reduced. Optionally, some planes of the spatial switching within the temporospatial switching fabric may be preferentially employed by the packet data.

Figure 19:
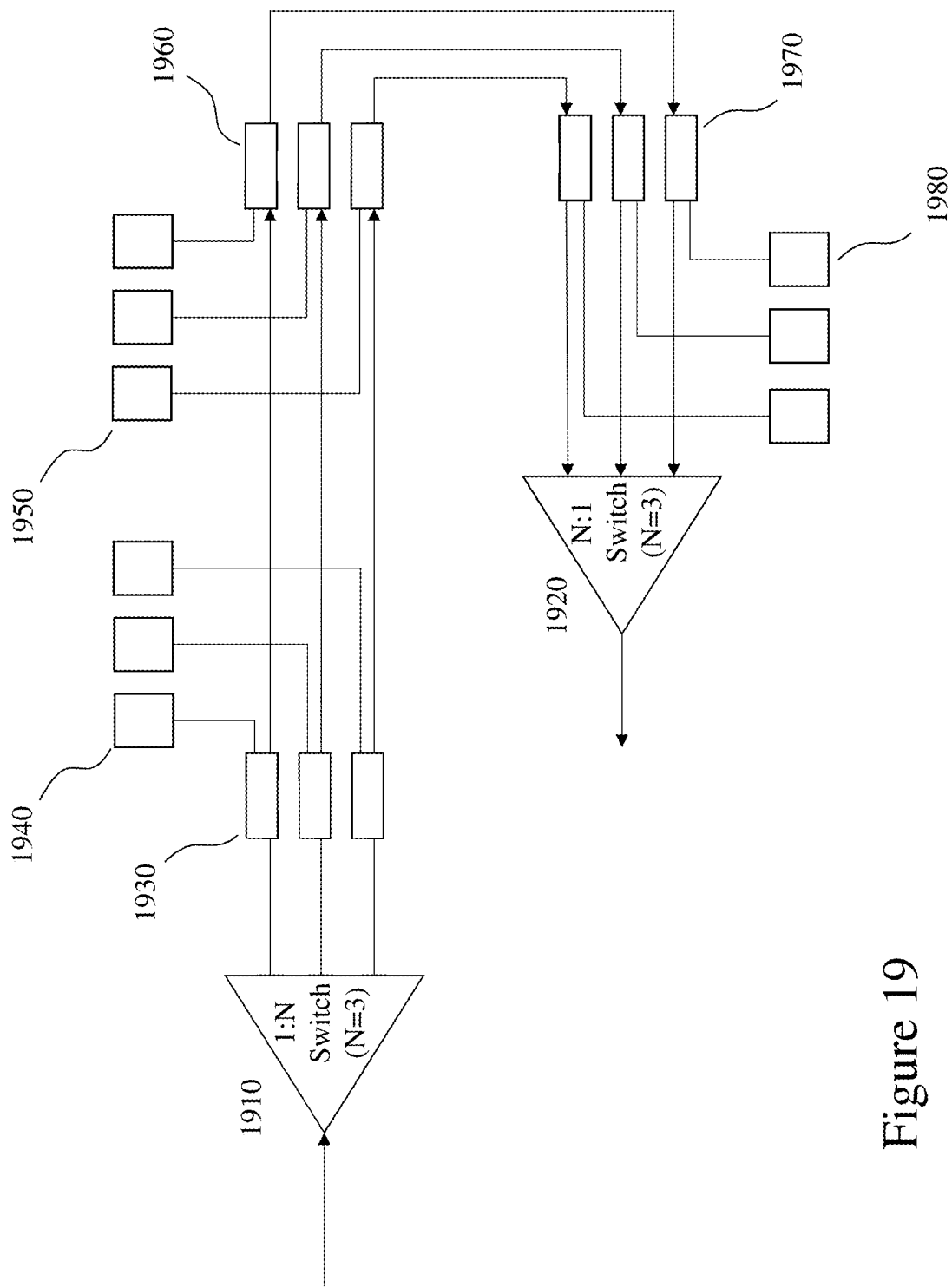
FIG. 19 depicts an out of band synchronization mechanism between a pair of optical circuit switches according to an embodiment of the invention.

Referring to FIG. 19 there is depicted an out of band synchronization mechanism between a pair of optical circuit switches 1910 and 1920. As depicted each output of the first optical switch 1910 is coupled to the second optical switch via first, second, and third taps 1930, 1960, and 1970 respectively. First taps 1930 couple X %, e.g. X=2, to first photodetectors 1940. Coupled to each of the second taps 1960 are optical sources 1950 such that Y %, e.g. Y=2, of the optical source 1950 output is coupled onto the optical fibers with the optical signals from the first optical circuit switch 1910 to the second optical circuit switch 1920. Each of these signals then passes through filters 1970 that couple the output from the optical sources 1950 to second photodetectors 1980 but pass the network signals directly to the second optical circuit switch 1920. Accordingly, a control circuit, not shown for clarity, receives the outputs from the first photodetectors 1940 to determine which optical sources 1950 to enable and therein provide signals to second photodetectors 1980.

Accordingly, for example, the presence of an optical signal on the switched channel from the first optical circuit switch triggers all optical sources 1950 other than that associated with the active channel such the outputs of these optical sources 1950, which may for example be out of transmission band LEDs, are active and coupled through the filters to the second photodetectors 1980 such that a second control circuit, also not shown for clarity, determines from the received signals "all but those active" as the port it is to switch on. As such the second optical circuit switch 1920 may be switched based upon a preamble signal within the transmitted optical signals. Generally the first taps 1930 and first photodetectors 1940 would be removed and the optical sources 1950 triggered based upon the control circuit knowing the configuration of the first optical switch circuit 1910. In this manner out of band signaling in the optical layer can be employed to synchronise the first and second optical switch circuits 1910 and 1920 respectively which may be geographically remote from one another. Whilst the example depicted in FIG. 19 is simple it would be evident that the approach applies to generalized switching fabrics as each inactive path carries an out of band signal such that these may be received at multiple remote switches in combination with others to make the determination of the active path. Alternatively, only the active path is lit with the out of band signal.

Optionally, the second taps 1960 may be multiplexers combining the transmission signals with the out of band optical source 1950 signals through coarse WDM. Such multiplexers may be integrated with the MOTUS optical engine as may the first taps 1930 if implemented. Similarly, the filters 1970, demultiplexers, may be integrated with the respective second optical circuit switch MOTUS optical engine. Accordingly, a low bitrate/continuous wave and ultra-low latency synchronization between optical switches can be implemented with cheap LEDs and low cost photodiodes. Not only may the multiplexer and demultiplexers be integrated with the silicon MOEMS but the photodetectors and LEDs may also be integrated to the silicon die using monolithic and/or hybrid integration techniques.

5. Enhanced MOEMS Optical Switching Devices

Within the preceding sections optical switching fabrics exploiting microoptoelectromechanical systems (MOEMS) have been described both with respect to small switching fabrics, i.e. 4×4, distributive switching elements, e.g. 1×48, and large switching fabrics. The inventors have established within preceding patent applications many building blocks of these MOEMS optical switches, these patent applications including:

- U.S. Provisional Patent Application 61/949,474 entitled "Mirror Based MicroElectroMechanical Systems and Methods" filed Mar. 7, 2014;
- World Intellectual Property Office Patent Cooperation Treaty Application entitled "Mirror Based MicroElectroMechanical Systems and Methods" filed Mar. 9, 2015;
- U.S. Provisional Patent Application 61/950,238 entitled "Methods and Systems Relating to Optical Networks" filed Mar. 10, 2014;
- World Intellectual Property Office Patent Cooperation Treaty Application entitled "Methods and Systems Relating to Optical Networks" filed Mar. 10, 2015;
- U.S. Provisional Patent Application 61/949,484 entitled "Methods and System for Wavelength Tunable Optical Components and Sub-Systems" filed Mar. 7, 2014; and
- World Intellectual Property Office Patent Cooperation Treaty Application entitled "Wavelength Tunable Optical Components and Sub-Systems" filed Mar. 9, 2015.

Within the following Sections 5.1 to 5.3 variant optical switches exploiting MOEMS technology are presented without the use of a reflecting mirror such as employed in the MOTUS optical engines described and depicted supra in respect of 1×N optical switches.

5.1 Direct MOEMS M×N Optical Switches with Full and Half Position Latching

Figure 20B:
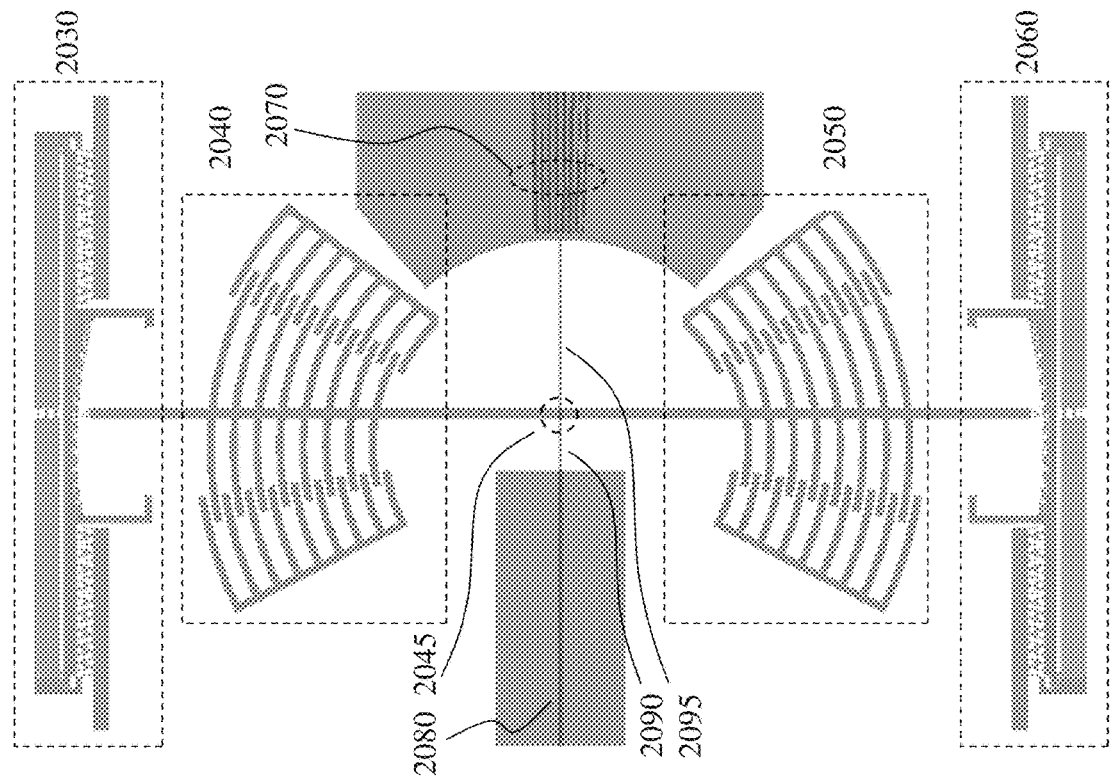
FIGS. 20A to 20C depict a direct waveguide-waveguide MOEMS optical switches without mirror elements employing pivoting suspended waveguide and dual lateral latching actuators for asymmetrically latching to double latching positions.
Figure 20A:
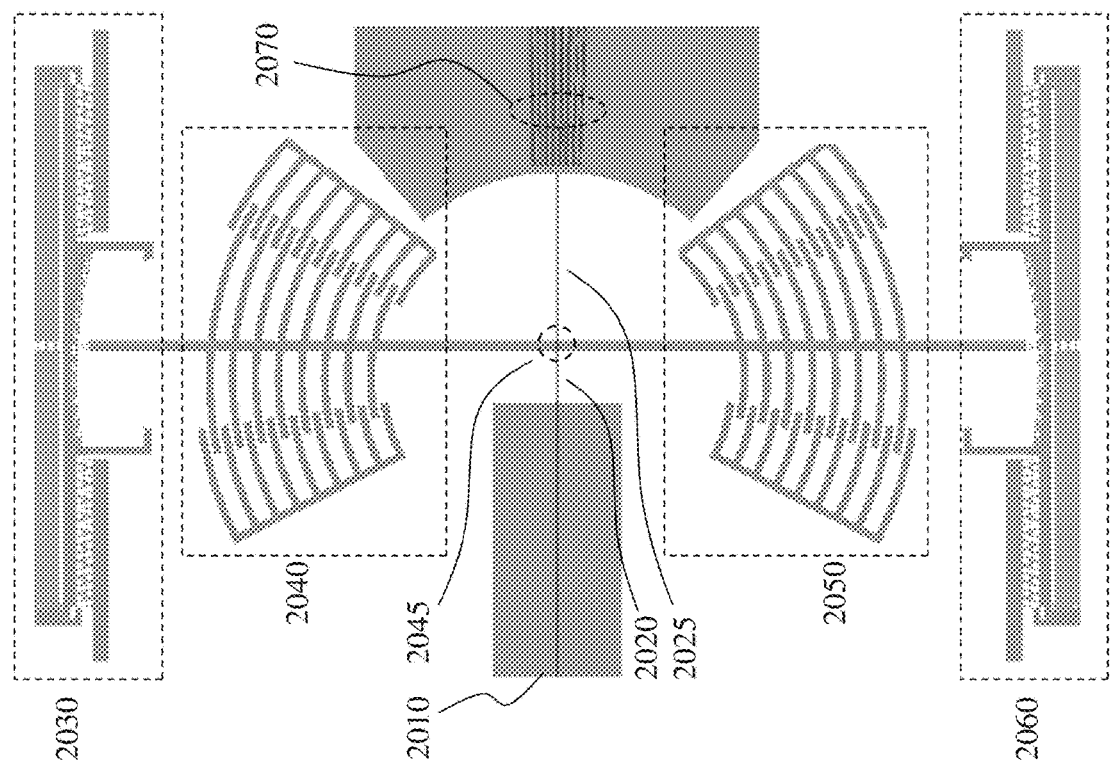

Referring to FIG. 20A there is depicted a direct waveguide-waveguide 1×N MOEMS optical switch with pivoting waveguide and dual lateral latching actuators. As depicted an input waveguide 2010 is formed upon region of the substrate which comprises the silicon substrate and intervening layers together with the optical waveguide stack in a well-known prior art configuration of a waveguide on a substrate, what the inventors refer to as a non-suspended waveguide. This then transitions to waveguide portions 2020 and 2025 which are suspended waveguide portions in that the substrate has been etched out below fully or leaving a thin layer beneath the waveguide structure. Waveguide portions 2020 and 2025 are before and after pivot point 2045 which is a pillar coupled to the waveguide structure etched through the substrate, such as depicted in third cross-section 2275 in FIG. 22. Laterally coupled to the beam supporting the optical waveguide portions 2020 and 2025 via beams are first and second rotary actuators 2040 and 2050. These under electrostatic forces generated through application of appropriate DC voltages to the first and second rotary actuators 2040 and 2050 twist the waveguide beam on its pillar about the pivot point 2045 such that the end of the optical waveguide can be aligned to the desired optical waveguide of the array of optical waveguides 2070 that are disposed upon a second non-suspended portion of the MOEMS structure.

Once rotated the first and second actuators 2040 and 2050 can be latched into position by either the first and second latching actuators 2030 and 2060 respectively thereby allowing the switch to be maintained in selected configuration without continued application of the DC voltages to the first and second rotary actuators 2040 and 2050 respectively. By offsetting the latching angles of, for example, second latching actuator 2060 at half the step of the first latching actuator 2030 then angular resolution can be increased for the latched position allowing the number of settable positions to be doubled thereby allowing either increased number of waveguides and/or lower rotation angle ranges. Accordingly, the MOEMS optical switch within FIG. 20A functions as a latchable 1×N optical switch where N is the number of addressable/provided waveguides within the array of optical waveguides 2070. It would be evident that alternatively the optical switch functions as a latchable N×1 optical switch by reversing the associations of waveguides as input and outputs.

Figure 20C:
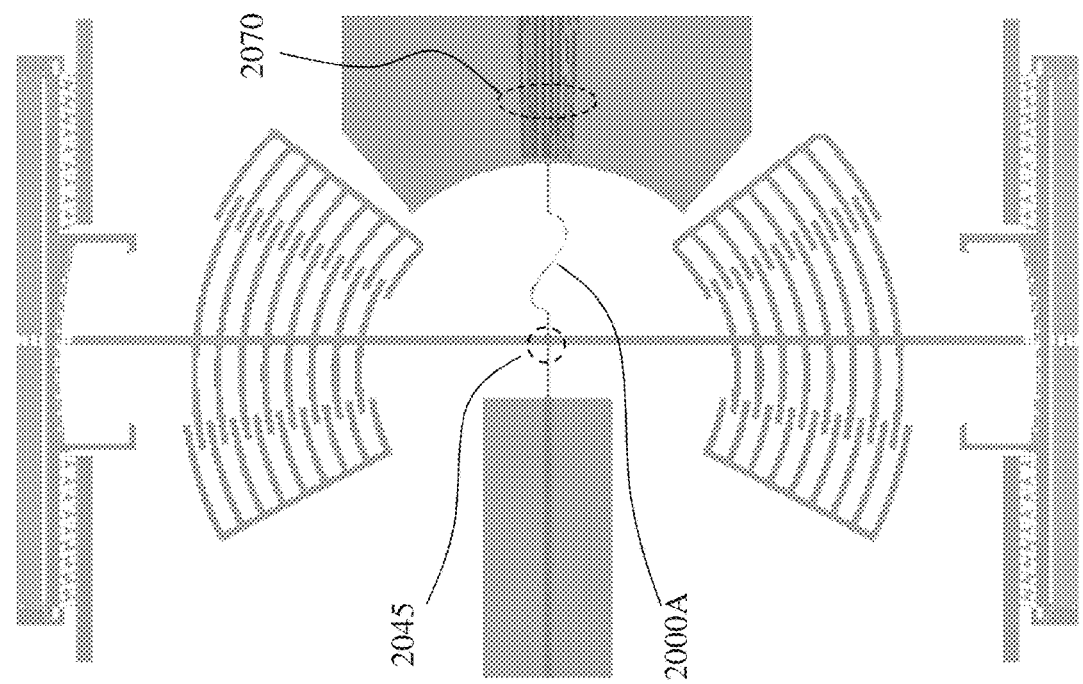

Now referring to FIG. 20B there is depicted essentially the same mechanical configuration as that depicted within FIG. 20 except that now the non-suspended input waveguide section 2080 has M optical waveguides as do the suspended waveguide portions 2090 and 2095 such that the rotation of the beam under the action of the first and second rotary actuators 2040 and 2050 now aligns the M optical waveguides to a subset of the N output waveguides within the array of optical waveguides 2070 or if these are at different pitches a selected one or subset of the M optical waveguides to a subset of the N output waveguides. For example, rotation in one direction aligns the M optical waveguides to one subset of the N output waveguides, e.g. M, where N=2×M, and when the rotation is in the other direction it aligns the M optical waveguides to another subset of the N output waveguides, e.g. M, where N=2×M. In this manner the optical switch depicted within FIG. 20B functions as M ganged 1×2 optical switches or M ganged 2×1 optical switches. It would be evident that other configurations such as ganged 1×4 or 1×8 switches, for example, may be implemented.

In order for the suspended beam with the waveguide(s) to rotate relative to the array of optical waveguides 2070 an air gap is provided. However, as evident to one skilled in the art the air gap increases optical loss even at dimensions of 1-3 µm. Accordingly, referring to FIG. 20C there is depicted a variant of the 1×N or M:N optical switches depicted in FIGS. 20A and 20B respectively. Accordingly, the suspended optical waveguide 2000A between the pivot point 2045 and array of waveguides 2070 is now shaped with a flexible gap closing structure allowing the gap losses to be minimized as the structure through stresses within the curved design seeks to reduce these and lengthen thereby bringing the rotating waveguide(s) into contact with the array of output waveguides 2070. Optionally, the flexible gap closing structure may be metallized such that heating increases stresses inducing additional flexure allowing the gap to be made prior to moving the MOEMS and then released subsequently. Due to the isolated nature of the suspended beam the thermal mass is low. Alternatively, the MOEMS may include a linear actuator to withdraw the waveguide(s), allow it (them) to be rotated and then re-close the gap wherein the flexible gap closing structure absorbs over-run in the linear actuator.

5.2 MOEMS 2×2 Optical Switch for Crossover Free Crossbar Topologies

Figure 21A:
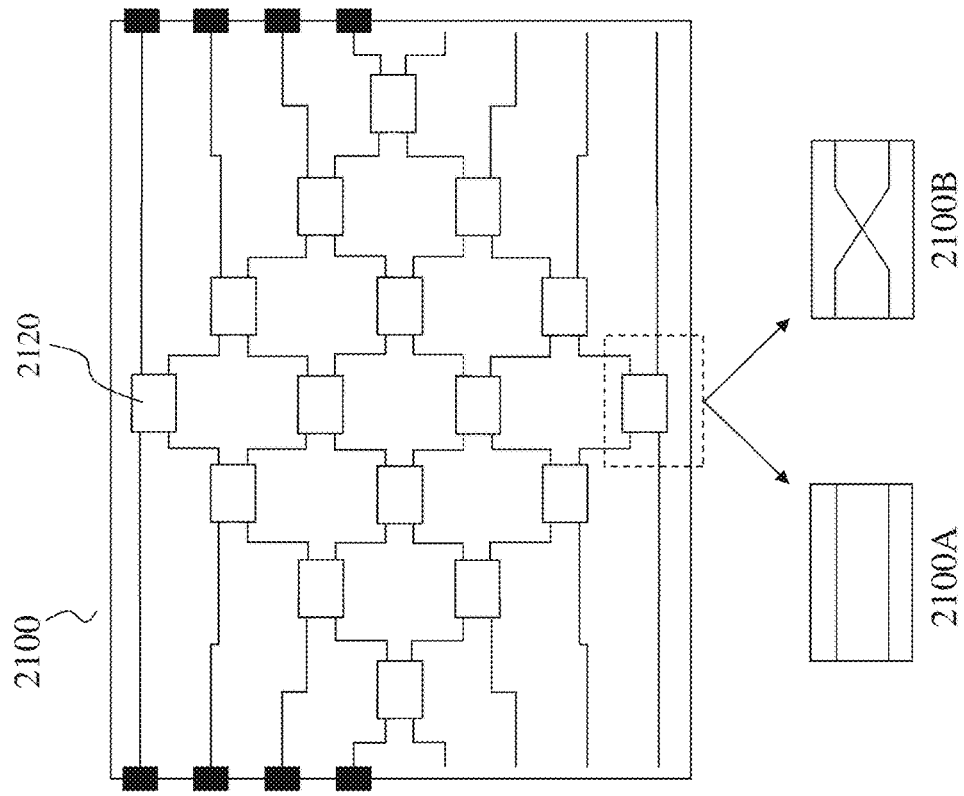
FIG. 21A depicts a 4×4 an expandable crossbar switch matrix composed of 16 2×2 switching elements.
Figure 21B:
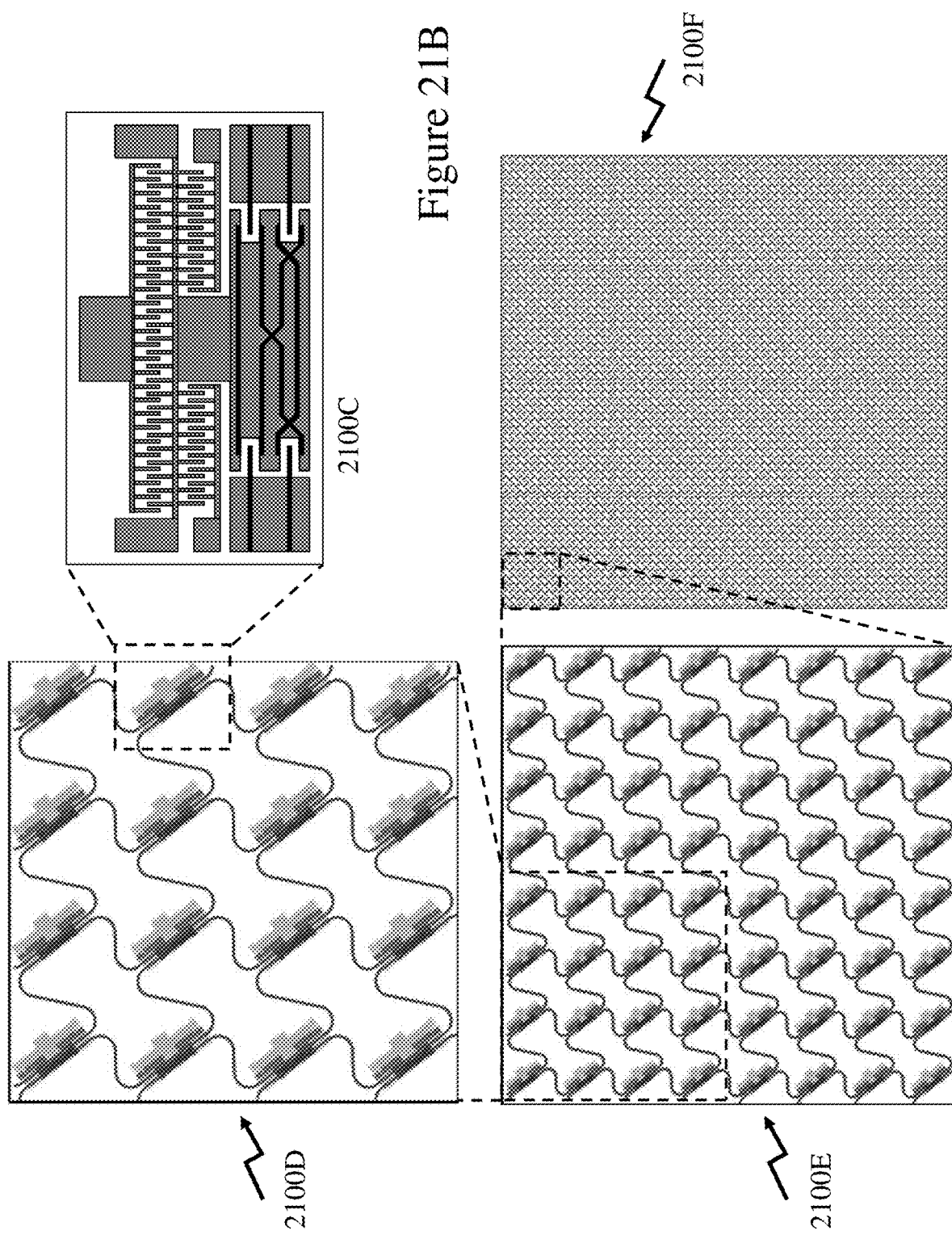
FIG. 21B depicts 4×4, 8×8, and 64×64 crossbar matrices exploiting 2×2 switching elements.

Within the preceding architectures described and discussed a significant portion exploit 1×N and N×1 optical switches, e.g. FIGS. 4-8B, 13, and 15, although others exploit 2×2 switching elements, such as depicted within FIGS. 16-18. Whilst a 2×2 switching element can be implemented with 4 1×2 switching elements with a passive interconnection this can lead to long building blocks for larger switch fabrics such that generally architectures employing 1×2 switching elements tend to favour fully connected architectures such as depicted in FIG. 13 rather than crossbar architectures such as depicted in FIG. 21A for example. The strictly non-blocking 4×4 crossbar depicted in FIG. 21A employs 16 2×2 optical switches or 64 1×2 if these are implemented as the 2×2 building blocks. In contrast the fully connected requires only 24 1×2 but does require a significant number of waveguide intersections unlike the crossbar architecture. Further referring to FIG. 21B there are depicted 4×4 matrix 2100D, 8×8 matrix 2100E, and 64×64 crossbar matrix 2100F all exploiting a 2×2 MOEMS switching elements 2100B such as described below in respect of FIGS. 22A to 26B according to embodiments of the invention. As evident from FIG. 21B 4×4 matrix 2100D which employs 16 2×2 MOEMS switching elements 2100B forms a "building block" within 8×8 matrix 2100E such that 4 4×4 matrices 2100D are employed comprising a total of 64 2×2 MOEMS switching elements 2100B. Each 8×8 matrix 2100E then becomes a "building block" such that 64 8×8 matrices 2100E form 64×64 crossbar matrix 2100F thereby employing 1,296 2×2 MOEMS switching elements 2100B.

Accordingly, the inventors have established in FIG. 22 with first image 2200 a MOEMS 2×2 through provisioning of 1×2 evanescently coupled optical elements (ECOEs). As depicted within first to fifth cross-sections 2260 to 2290 the 1×2 ECOE employs in various regions:

Anchored MEMS structures (first cross-section 226) wherein the upper silicon (Si) 2220 is anchored to the silicon (Si) 2220 substrate via the intermediate silicon dioxide (SiO$_2$) 2230 sacrificial layer;

Unanchored MEMS structures (second cross-section 2270) wherein the SiO$_2$ 2230 and Si 2220 substrate have been etched and removed leaving the Si MEMS element free-standing;

Pivoted suspended waveguide (third cross-section 2275) wherein a SiO$_2$ 2230 clad and silicon nitride (Si$_3$N$_4$) core optical waveguide sits atop a Si 2220 beam which has an isolated pillar to the substrate (the pivot);

Suspended waveguide (fourth cross-section 2280) wherein a SiO$_2$ 2230 clad and silicon nitride (Si$_3$N$_4$) core optical waveguide sits atop a free Si 2220 beam; and Non-suspended waveguide (fifth cross-section 2290) wherein a SiO$_2$ 2230 clad and silicon nitride (Si$_3$N$_4$) core optical waveguide is anchored to the silicon (Si) 2220 substrate via the intermediate silicon dioxide (SiO$_2$) 2230 sacrificial layer.

Figure 22B:
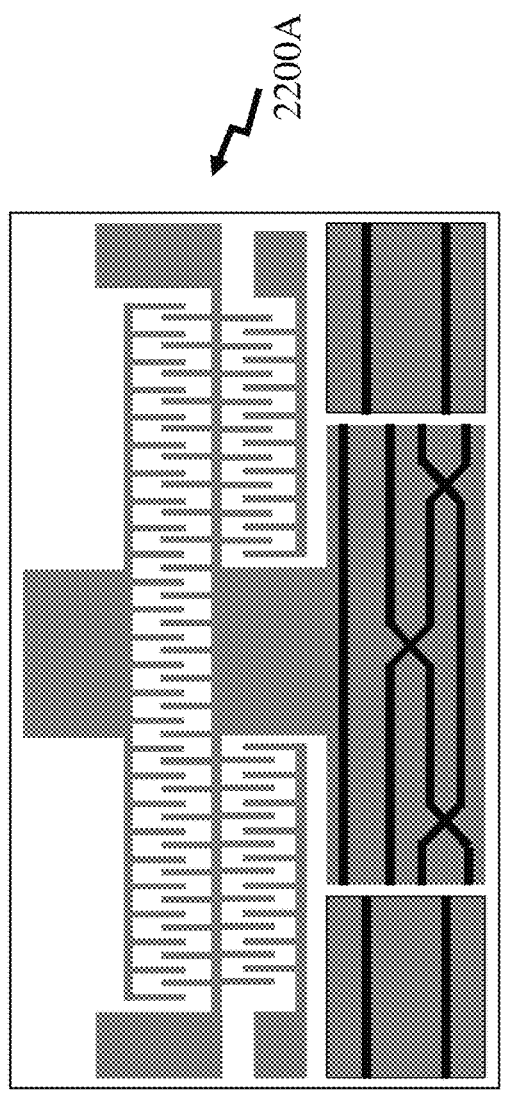
Figure 23A:
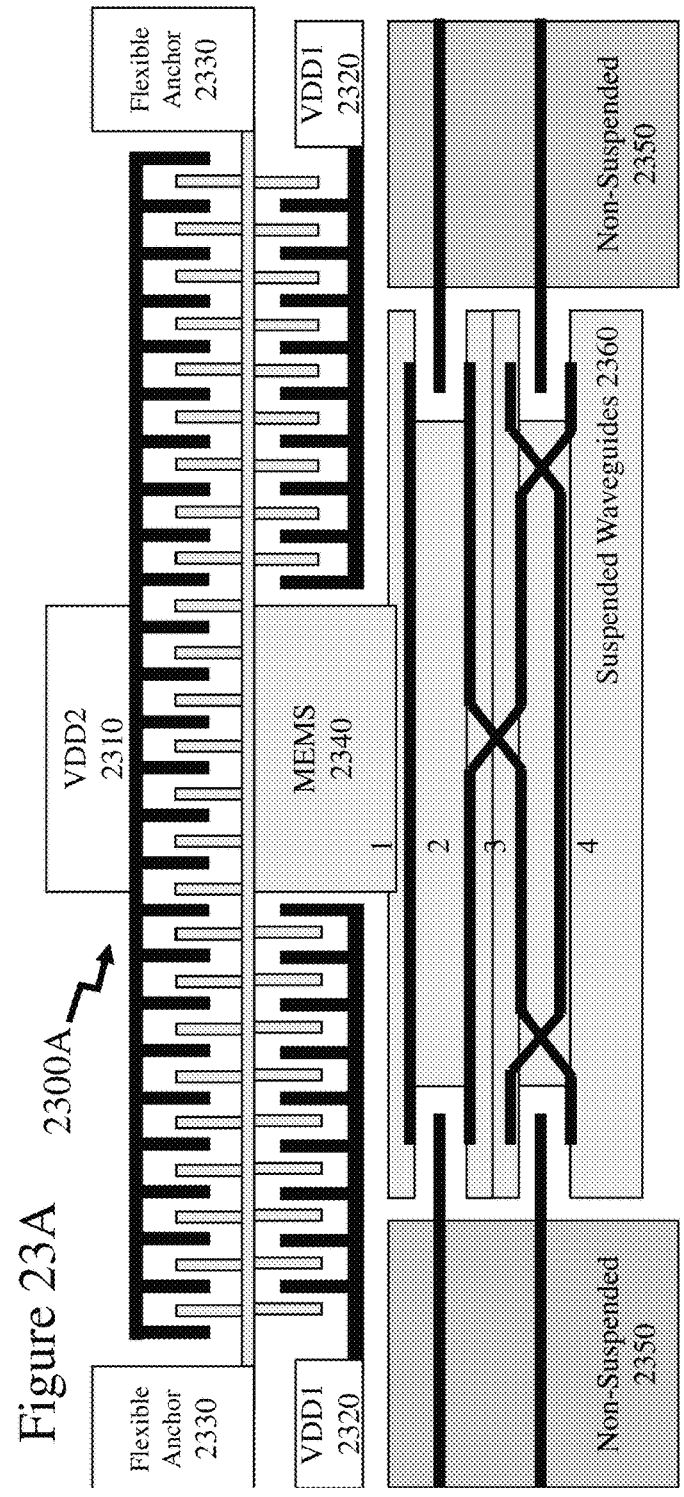
FIG. 23A depicts the 2×2 switching element according to the embodiment of the invention depicted in FIG. 22 in "default" state.
Figure 23B:
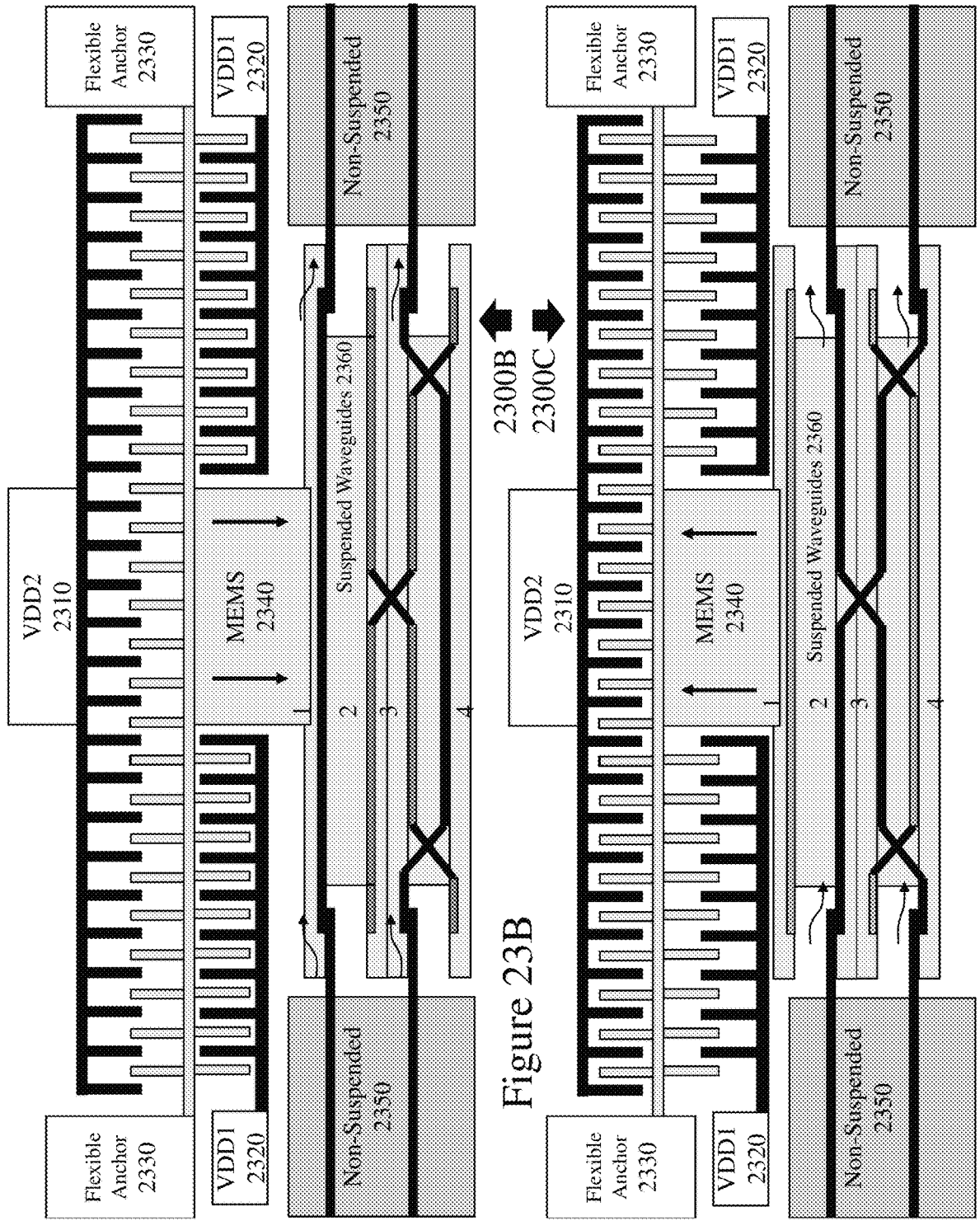
FIG. 23B depicts the 2×2 switching element according to the embodiment of the invention depicted in FIG. 22 in "bar" and "cross" states.

Thin Si$_3$N$_4$ core layers, e.g. 70 nm≤t≤220 μm, may be employed where polarization independent operation is not required whilst in other embodiments of the invention thicker Si$_3$N$_4$ core layers may be employed, t≈1 μm, for polarization independent switching operation. The operation of the 1×2 ECOE is depicted in FIGS. 23A and 23B respectively for the "default", "bar" and "cross" states respectively. However, FIG. 22B depicts a 2×2 butt coupled optical element (BCOE) 2200A exploiting similar waveguide-waveguide coupling, commonly referred to butt coupling, as the preceding embodiments of optical switches. In principle the 2×2 BCOE switching element according to an embodiment of the invention exploiting MOEMS elements operated in the same manner as the 2×2 ECOE but with end-end waveguide coupling rather than evanescent coupling. Considering initially first image 2300A in FIG. 23A then a suspended waveguide structure 2360 is depicted in-line with non-suspended waveguide structures 2350.

Each non-suspended waveguide structure 2350 having a pair of waveguides representing the input waveguide pair or output waveguide pair. The suspended waveguide structure 2360 comprises four optical waveguides, labelled 1-4, running from one end to the other with one isolated and the other three crossing each other in a predetermined pattern. The suspended waveguide structure 2360 is coupled to MEMS 2340 which is a linear comb actuator with flexible anchors 2330 at either end and is disposed between first and second fixed combs coupled to $V_{DD2}$ 2310 and $V_{DD1}$ 2320. As depicted in first image 2300A in FIG. 23A with neither of the two voltages $V_{DD1}$ and $V_{DD2}$ applied such that the MEMS 2340 is in a "neutral" default state.

Now referring to second image 2300B in FIG. 23B the appropriate voltages $V_{DD1}$ and $V_{DD2}$ have been applied such that the MEMS 2340 and suspended waveguides 2360 are moved such that waveguides 1 and 4 are now evanescently coupled to the input and output waveguides by virtue of the waveguides 1 and 4 being physically abutted to the projected suspended portions of the input and output waveguides on the non-suspended waveguide structures 2350. Accordingly, the input and output waveguides are coupled in the "bar" state via waveguides 1 and 4. Within third image 2300C in FIG. 23C the appropriate voltages $V_{DD1}$ and $V_{DD2}$ have been applied such that the MEMS 2340 and suspended waveguides 2360 are moved such that waveguides 2 and 3 are now evanescently coupled to the input and output waveguides by virtue of the waveguides 2 and 3 being physically abutted to the projected suspended portions of the input and output waveguides on the non-suspended waveguide structures 2350. Accordingly, the input and output waveguides are coupled in the "cross" state via waveguides 2 and 3. As such the 2×2 switching element supports both bar and cross states as well as a non-switched state blocking the outputs from the inputs.

An alternate 2×2 switching element is depicted in FIG. 24 in first and second states 2400A and 2400B respectively according to an embodiment of the invention exploiting MOEMS elements and optical evanescent coupling. In first state 2400A the 2×2 switching element comprises a pair of MEMS actuators that are in first and second MEMS positions 2410A and 2420A that control the motion of first and second suspended waveguide portions 2430 and 2440 such that they are decoupled from the first and second waveguides 2450 and 2460 which cross-over in the middle of the device. Accordingly, with the first and second suspended waveguide portions 2430 and 2440 decoupled the 2×2 switching element is in a default cross-state. In second image 2300B the MEMS actuators have been actuated into first and second MEMS positions 2410B and 2420B such that first and second suspended waveguide portions 2430 and 2440 are now a coupled to the first and second waveguides 2450 and 2460 such that optical signals coupled to the 2×2 switching element are evanescently coupled to the first and second suspended waveguide portions 2430 and 2440 propagate within and then re-couple back. In this manner the optical signals within first and second suspended waveguide portions 2430 and 2440 bypass the cross-over in the middle of the device thereby putting the 2×2 switching element into the bar-state. Optionally, the central portion of the non-suspended waveguide portion of the design with the waveguide cross-over and the optical waveguides coupling to/from the structure may be designed such that the first and second suspended waveguide portions 2430 and 2440 form zero-gap directional couplers or defined gap directional couplers wherein the waveguides upon the non-suspended waveguide portion transition away within the central portion to remove potential re-coupling back prior to the cross-over thereby leading to increased crosstalk.

Figure 25A:
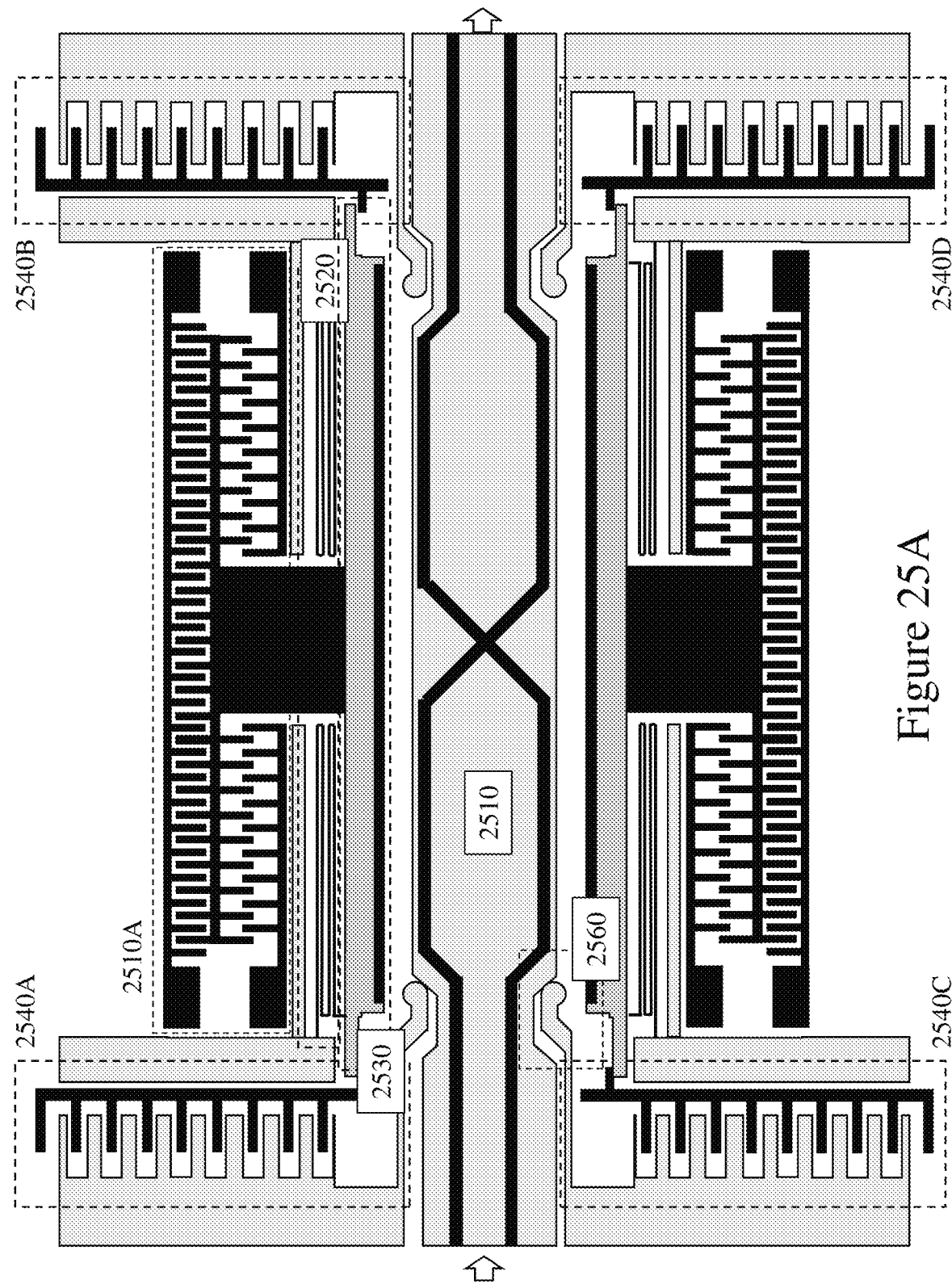
FIGS. 25A and 25B depict a latching 2×2 switching element according to an embodiment of the invention exploiting MOEMS elements and optical evanescent coupling in "cross" and "bar" states respectively.
Figure 25B:
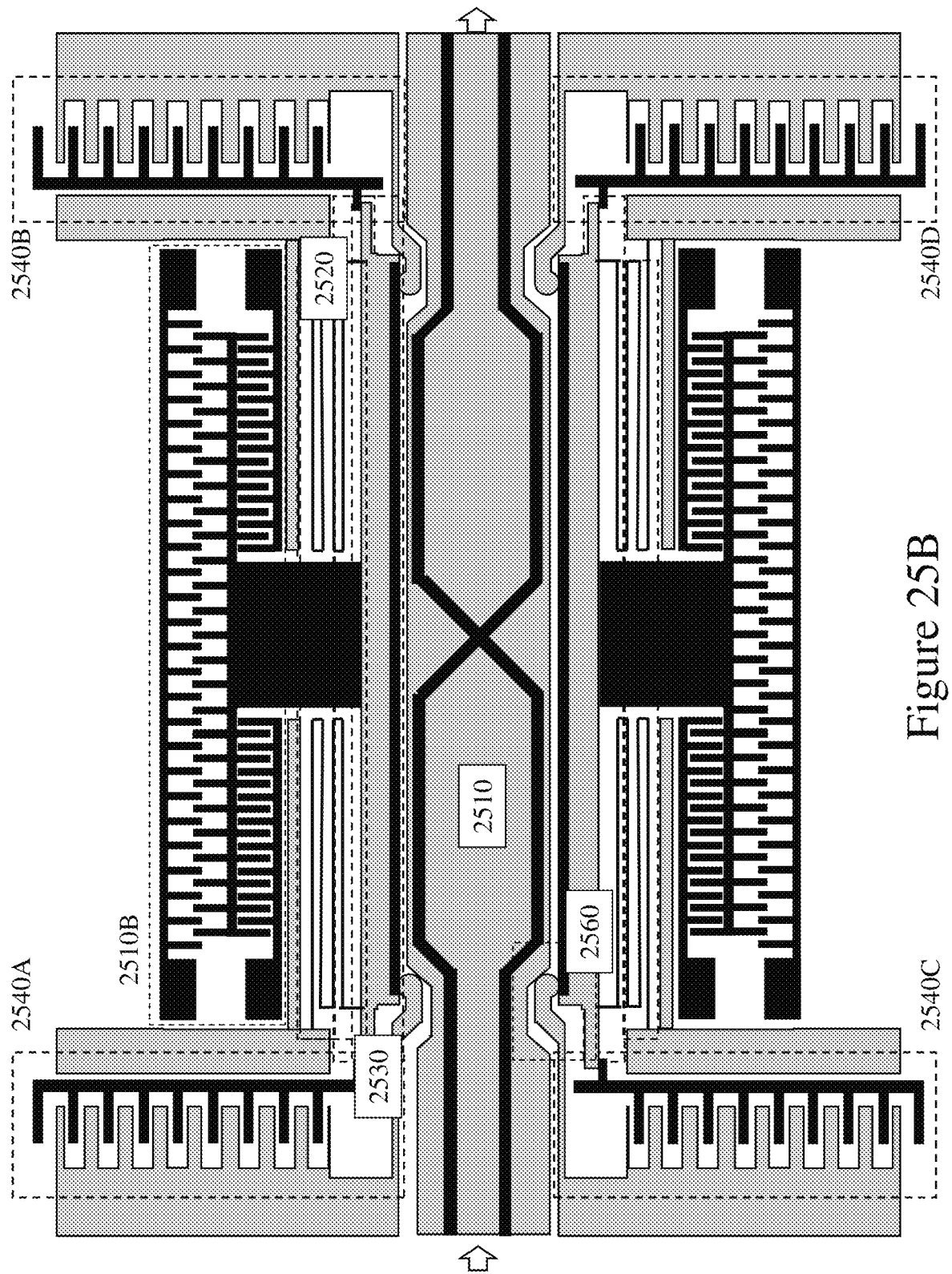

5.3 Latching MOEMS 2×2 Optical Switch for Crossover Free Crossbar Topologies Now referring to FIGS. 25A and 25B there is depicted a latching 2×2 switching element according to an embodiment of the invention exploiting MOEMS elements and optical evanescent coupling in "cross" and "bar" states respectively such as described supra in respect of FIG. 24. Accordingly, the default cross-state of the 2×2 switching element is set by the waveguide cross-over within the non-suspended waveguide portion 2510. Whilst the suspended waveguide portions 2530 may be moved under linear actuator control from actuators 2510 to transition the 2×2 switching element into the bar state by bring the suspended waveguide portions 2530 into predefined spacing relative to the non-suspended waveguide portion 2510 or back to the cross state by separating the suspended waveguide portions 2530 from the non-suspended waveguide portion 2510 in either state first to fourth latches 2540A to 2540D in combination with springs 2520 maintain the switch in a defined state by latching the suspended waveguide portions 2530 into position in each switch state. Springs 2520 act to pull the suspended waveguide portion 2530 against the latches 2540A to 2540D. Also depicted are limiters 2560 that limit motion of the suspended waveguide portions when the switch is placed into the bar state. These limiters 2560 setting the waveguide spacing between the suspended waveguide portion 2530 and non-suspended waveguide portion 1310 to that established in coupling mode theory for 100% power coupling between the waveguides by the time they re-separate from the "coupling" region.

Figure 25C:
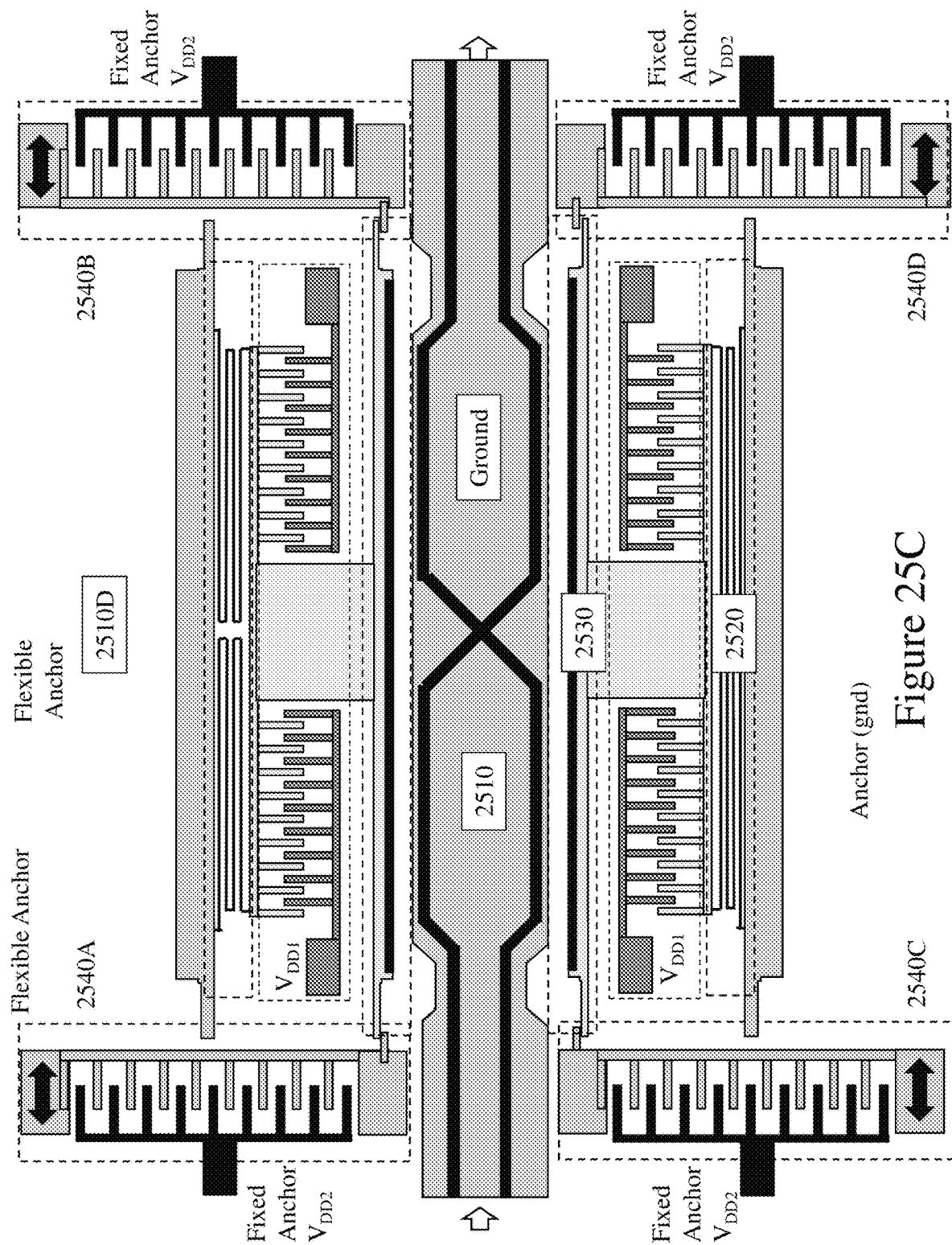
FIGS. 25C and 25D depict a latching 2×2 switching element according to an embodiment of the invention exploiting MOEMS elements and optical evanescent coupling in "cross" and "bar" states respectively.
Figure 25D:
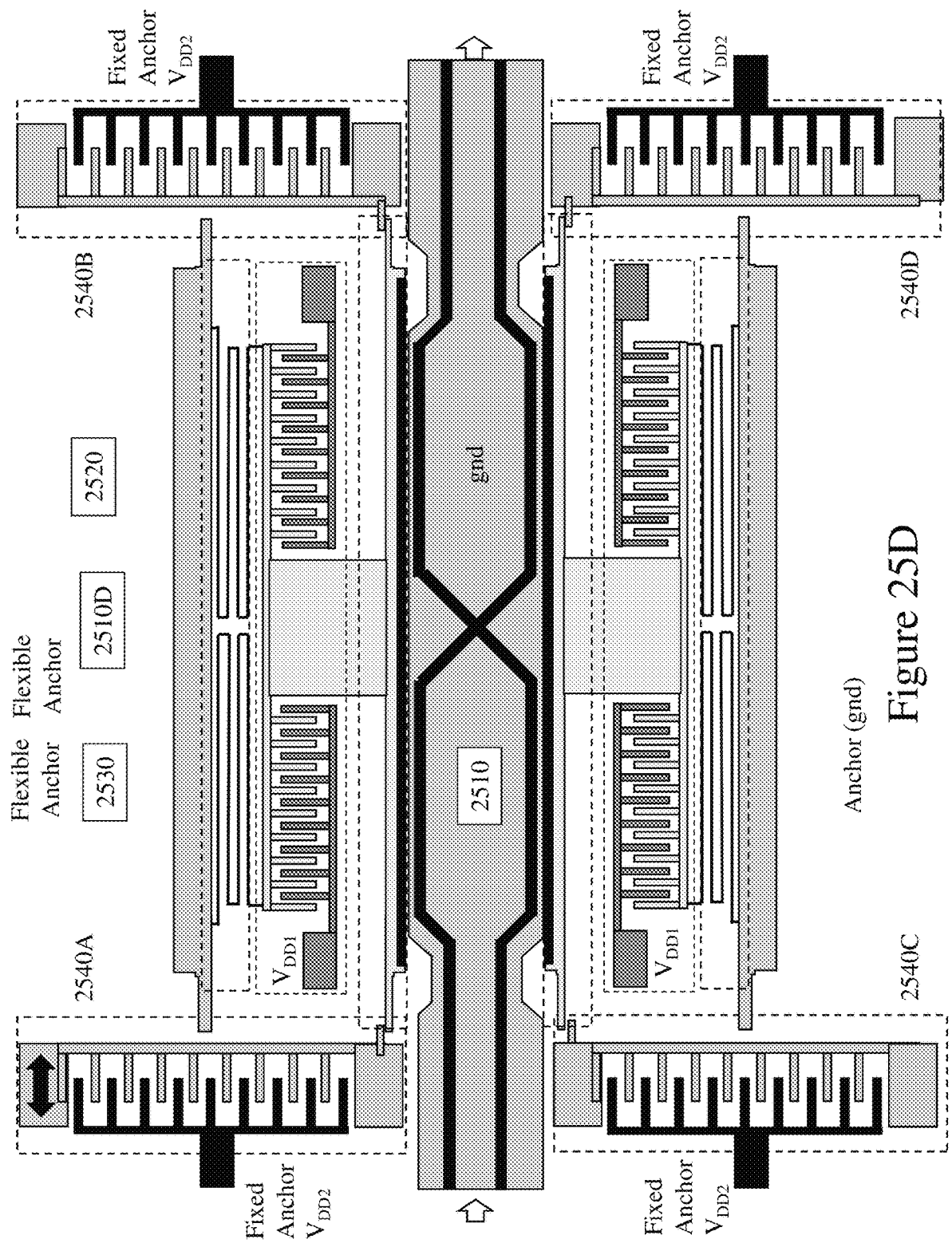
Figure 26A:
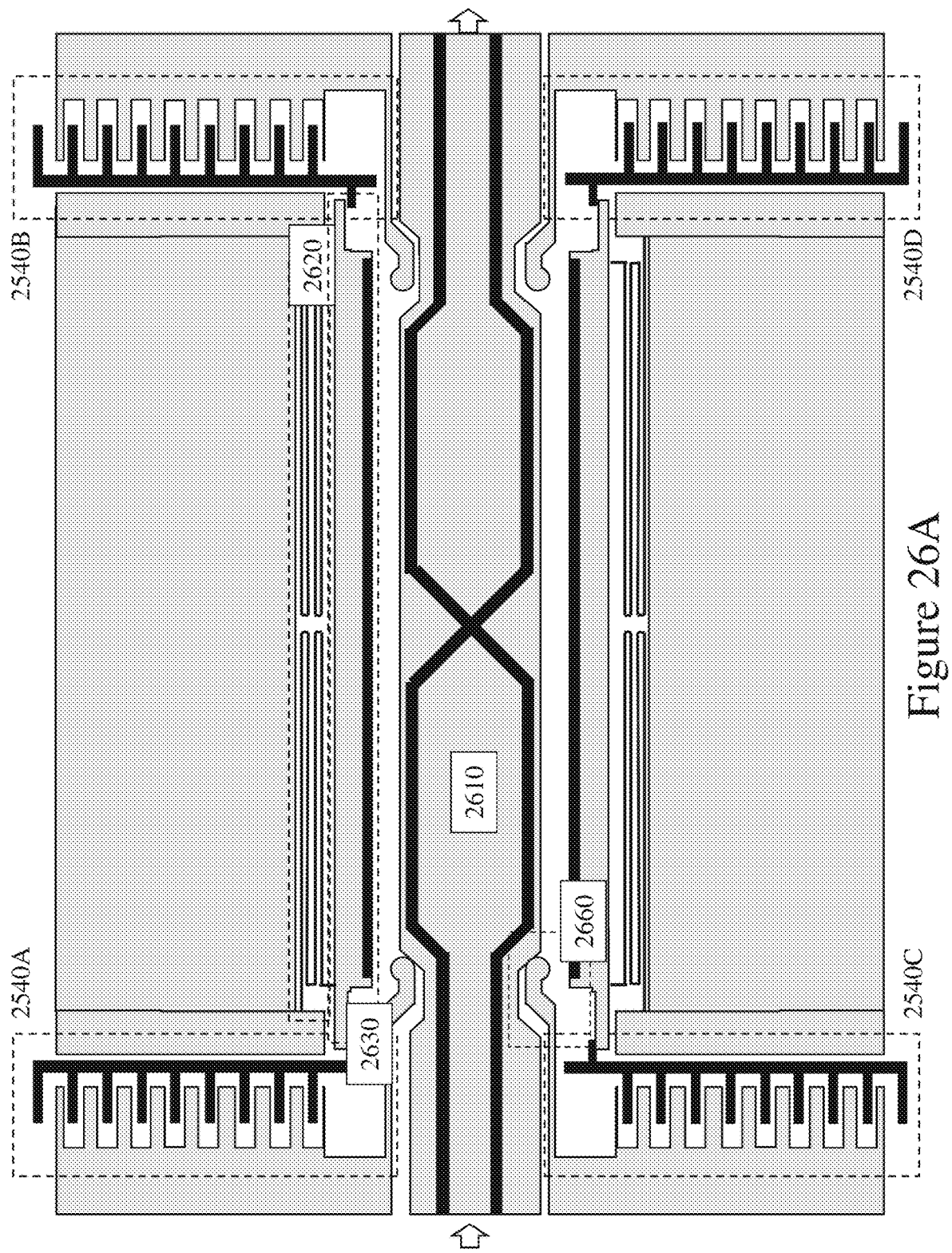
FIGS. 26A and 26B depict a latching 2×2 switching element according to an embodiment of the invention exploiting MOEMS elements and optical evanescent coupling in "cross" and "bar" states respectively requiring MEMS actuators only for the latching.
Figure 26B:
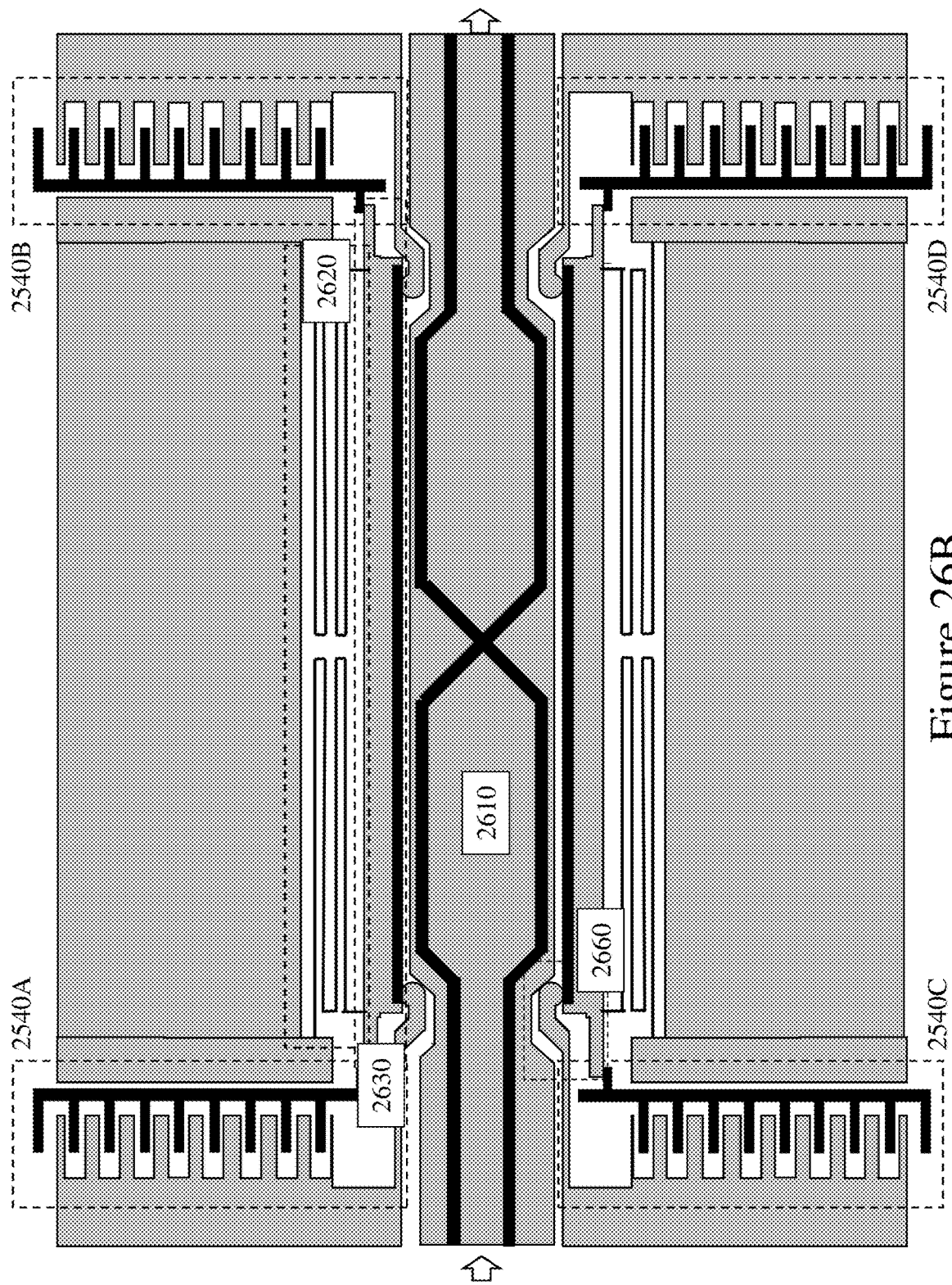

Now referring to FIGS. 25C and 25D there is depicted a latching 2×2 switching element according to an embodiment of the invention exploiting MOEMS elements and optical evanescent coupling in "cross" and "bar" states respectively such as described supra in respect of FIG. 24 and FIGS. 25A and 25B respectively. Accordingly, the default cross-state of the 2×2 switching element is set by the waveguide cross-over within the non-suspended waveguide portion 2510 which is held at ground potential. Whilst the suspended waveguide portions 2530 may be moved under linear actuator control from actuators 2510 to transition the 2×2 switching element into the bar state by bring the suspended waveguide portions 2530 into predefined spacing relative to the non-suspended waveguide portion 2510 or back to the cross state by separating the suspended waveguide portions 2530 from the non-suspended waveguide portion 2510 in either state first to fourth latches 2540A to 2540D in combination with springs 2520 maintain the switch in a defined state by latching the suspended waveguide portions 2530 into position in each switch state. Springs 2520 act to pull the suspended waveguide portion 2530 against the latches 2540A to 2540D in the bar-state depicted in FIG. 25D and push the suspended waveguide portion 2530 against the latches 2540A to 2540D in the cross-state depicted in FIG. 25C. As indicated the suspended waveguide portions 2530 are actuated via $V_{DD1}$ applied to the fixed portion of the MEMS actuators and the latches 2540A to 2540D actuated via $V_{DD2}$ again applied to the fixed portion of the MEMS actuators.

5.4 Latching Actuator-Less MOEMS 2×2 Optical Switch for Crossover Free Crossbar Topologies Within the preceding structures MEMS actuators have moved one or more elements of a MOEMS optical switch in order to transition the optical switch from one switch state to another. However, referring to FIGS. 26A and 26B there is depicted an alternate MEMS optical switch exploiting electromagnetic force induced between the non-suspended waveguide 1330 and suspended waveguide 1350 portions. Accordingly, in FIG. 26A the default cross-state of the 2×2 switching element is again set by the waveguide cross-over within the non-suspended waveguide portion 1330 when the suspended waveguide portions 1350 have been separated under the action of the springs 1340 and then latched using first to fourth latches 2540A to 2540D. However, when the first to fourth latches 2540A to 2540D are released electromagnetic attraction between the non-suspended waveguide portion 1330 and the suspended waveguide portions 1350 can be established pulling them towards the non-suspended waveguide portion 1330. Again, limiters 2660 act to limit the motion of the suspended waveguide portions 1350 such that the gap between the waveguides is that established by coupling mode theory for 100% power coupling between the waveguides by the time they re-separate from the "coupling" region. Electromagnetic attraction of the suspended waveguide portions 1350 can be established by appropriate biasing the suspended waveguide portion 1350 relative to the non-suspended waveguide portion 1330.

Figure 27A:
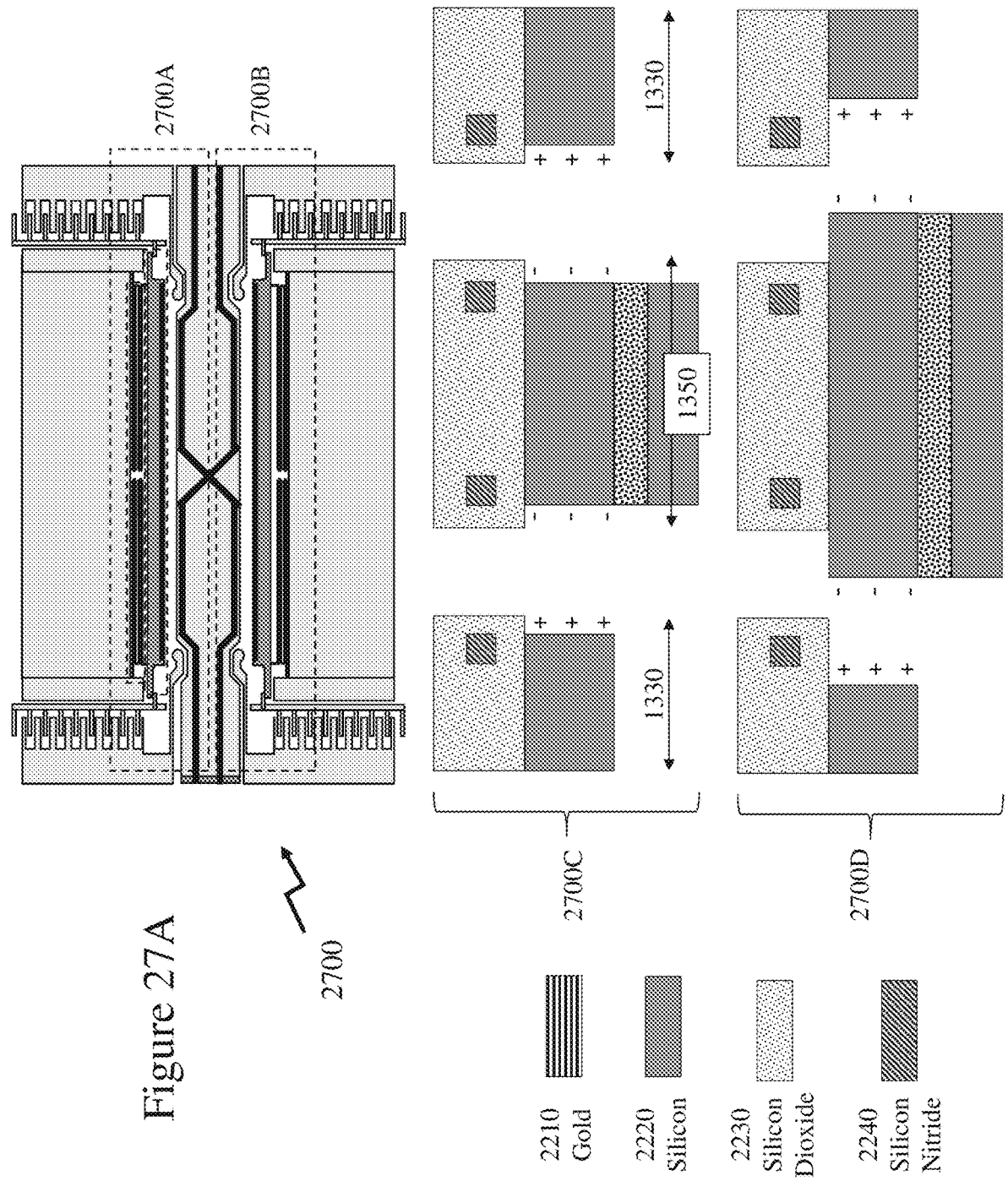
FIGS. 27A and 27B depict cross-sectional views of the latching 2×2 switching element according to FIGS. 26A and 26B without limiter structures and employing waveguide dielectric cladding as limiter for the gap closing mechanism formed using RIE etching processes according to an embodiment of the invention
Figure 27B:
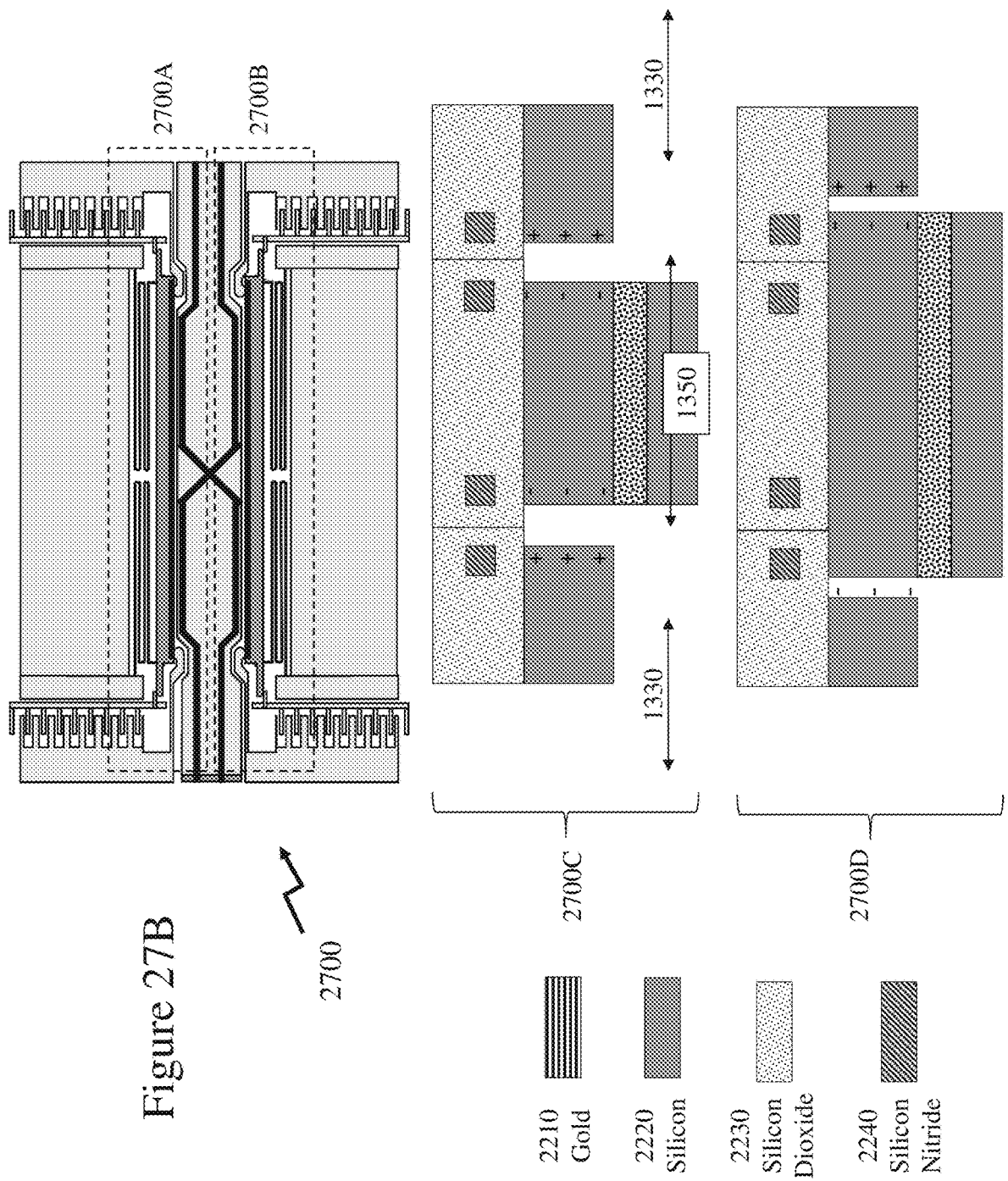

5.5 Latching Actuator-Less MOEMS 2×2 Optical Switch for Crossover Free Crossbar Topologies Using Passivation Layer as Spacer Now referring to FIG. 27 there are depicted first and second cross-sectional views 2700C and 2700D of embodiments of a latching actuator-less MOEMS 2×2 optical switch 2700 according to an embodiment of the invention. Latching actuator-less MOEMS 2×2 optical switch 2700 exploits a similar design and structure as that depicted by the MOEMS optical switch in FIGS. 26A and 26B respectively exploiting electromagnetic force induced between the non-suspended waveguide and suspended waveguide portions. However, the latching actuator-less MOEMS 2×2 optical switch 2700 does not employ limiter structures 2660 as it alternatively relies upon direct physical abutment of the suspended waveguide portions 1350 and non-suspended waveguide portion 1330. In FIG. 27 the upper region 2700A is depicted in "disengaged" state where the suspended waveguide 1330 has been pulled away from the non-suspended waveguide 1350 by the spring alone or in combination with repulsion by changing the polarity of the isolated suspended silicon whilst in lower region 2700B it is depicted in "engaged" state where the suspended waveguide 1330 has been engaged against the non-suspended waveguide 1350 by electrostatic attraction against the spring force.

In first cross-section 2700C the $Si_3N_4$ core-$SiO_2$ cladding atop the silicon 2220 is overhanging on each of the suspended waveguides 1330 and non-suspended waveguide 1350. In second cross-section 2700D the $Si_3N_4$ core-$SiO_2$ cladding atop the silicon 2220 is over-hanging on each of the suspended waveguides 1330 but under-hung on the non-suspended waveguide 1350. It would be evident that other variants may be implemented without departing from the scope of the invention.

Within FIGS. 22A to 27 waveguide cross-overs are depicted as simple linear junctions between the two waveguides. However, within embodiments of the invention these cross-over regions may exploit beam forming through shaped waveguide transitions, mode coupling via sub-wavelength structures, etc. to enhance the crosstalk and loss performance of the cross-overs. It would also be evident that the performance of the directional couplers either zero-gap or fixed gap, will require tailoring to the wavelength range of the optical switching network.

6. Vertical Directional Coupler Based MOEMS Optical Switching Elements

Figure 28A:
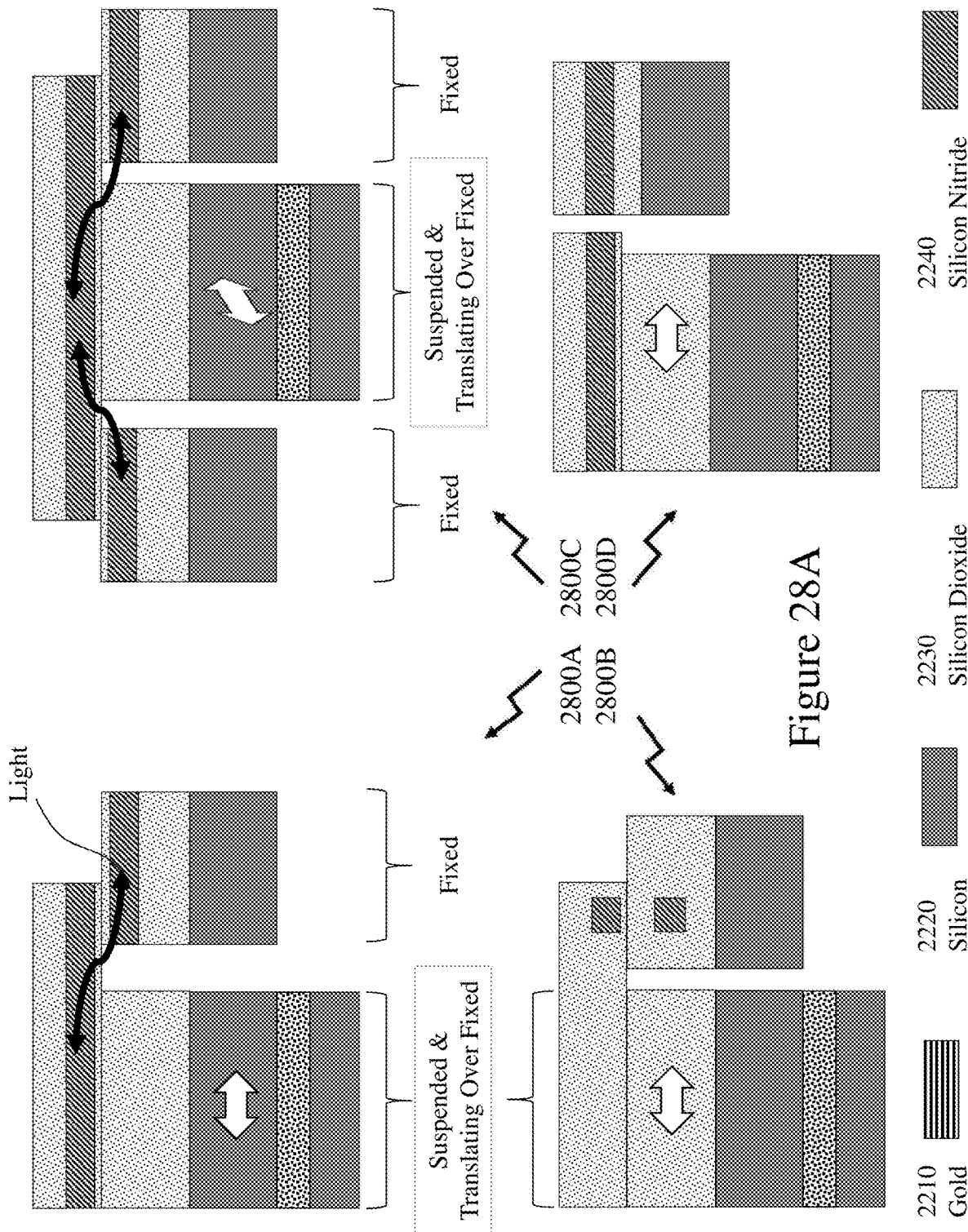
FIG. 28A depicts cross-sectional views of linear motion MOEMS based vertical optical coupling elements according to embodiments of the invention.

Within the descriptions supra in respect of FIGS. 21B to 27B respectively optical switching elements exploiting MOEMS activated lateral directional coupler elements have been described and depicted. However, the inventors have also established directional coupler elements exploiting linear MOEMS motion with vertical directional couplers rather than lateral directional couplers. For example, referring to FIG. 28A there are depicted first to fourth cross-sectional views 2800A to 2800D of linear motion MOEMS based vertical optical coupling elements according to embodiments of the invention. These being:

First cross-sectional view 2800A wherein the linear motion of a suspended and translating MOEMS element with an optical waveguide formed atop and overhanging allows the optical signals to couple evanescently from the fixed optical waveguide to/from the MOEMS optical waveguide and the linear translation motion longitudinally alone or in combination with vertical translation adjusts/stops the evanescent coupling;

Second cross-sectional view 2800B wherein the linear motion of the suspended and translating MOEMS element with an optical waveguide formed atop and overhanging allows the optical signals to couple evanescently from the fixed optical waveguide to/from the MOEMS optical waveguide and linear lateral motion alone or in combination with vertical translation adjusts/stops the evanescent coupling;

Third cross-sectional view 2800C wherein the linear motion of the suspended and translating MOEMS element with an optical waveguide formed atop and overhanging allows the optical signals to couple evanescently to and from fixed optical waveguides either end of the MOEMS element; and Fourth cross-sectional view 2800D wherein the linear motion of the suspended and translating MOEMS element with an optical waveguide formed atop allows the optical signals to butt couple to and from fixed optical waveguides.

Figure 28B:
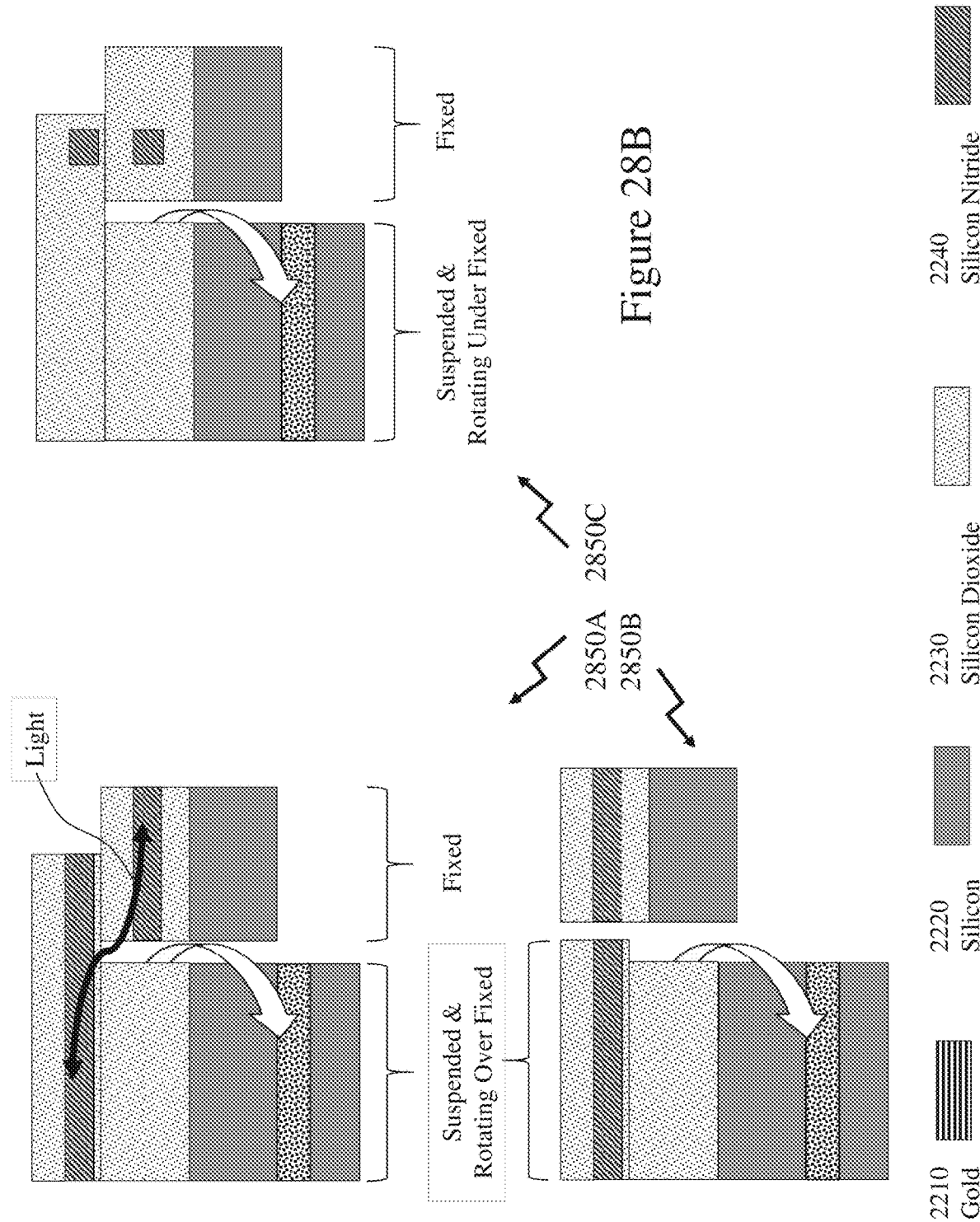
FIG. 28B depicts cross-sectional views of a rotary motion MOEMS based vertical optical coupling element according to an embodiment of the invention.

It would be evident that within alternate embodiments of the invention that the translating element may be the lower waveguide of the vertical directional coupler rather than the upper waveguide as depicted in first to third cross-sections 2800A to 2800D respectively. In third cross-sectional view 2800C translation of the central waveguide provides a different configuration of switching functionality to that where the central waveguide is fixed and input and/or output waveguides are moved together or independently. Now referring to FIG. 28B there are depicted first to third cross-sectional views 2850A to 2850C of rotary motion MOEMS based vertical optical coupling elements according to embodiments of the invention. These being:

First cross-sectional view 2850A wherein the rotary motion of a suspended MOEMS element with an optical waveguide formed atop and overhanging allows the optical signals to couple evanescently from the fixed optical waveguide to/from the MOEMS optical waveguide and the rotary motion alone or in combination with vertical translation adjusts/stops the evanescent coupling;

Second cross-sectional view 2850B wherein the rotary motion of the suspended MOEMS element with an optical waveguide formed atop allows the optical signals to couple through butt-coupling of the fixed optical waveguide to/from the MOEMS optical waveguide and rotary motion alone or in combination with vertical translation adjusts/stops the coupling;

Third cross-sectional view 2800C wherein the rotary motion of the suspended MOEMS element with an optical waveguide formed atop and overhanging allows the optical signals to couple evanescently to and from fixed optical waveguides in the aligned configuration but rotation of the upper waveguide results in coupling being stopped.

It would be evident that within alternate embodiments of the invention that the rotating element may be the lower waveguide of the vertical directional coupler rather than the upper waveguide as depicted in first to third cross-sections 2850A to 2850C respectively.

7. Blocking 2×2 Unit Cells and Switch Matrices Exploiting Same

Figure 29A:
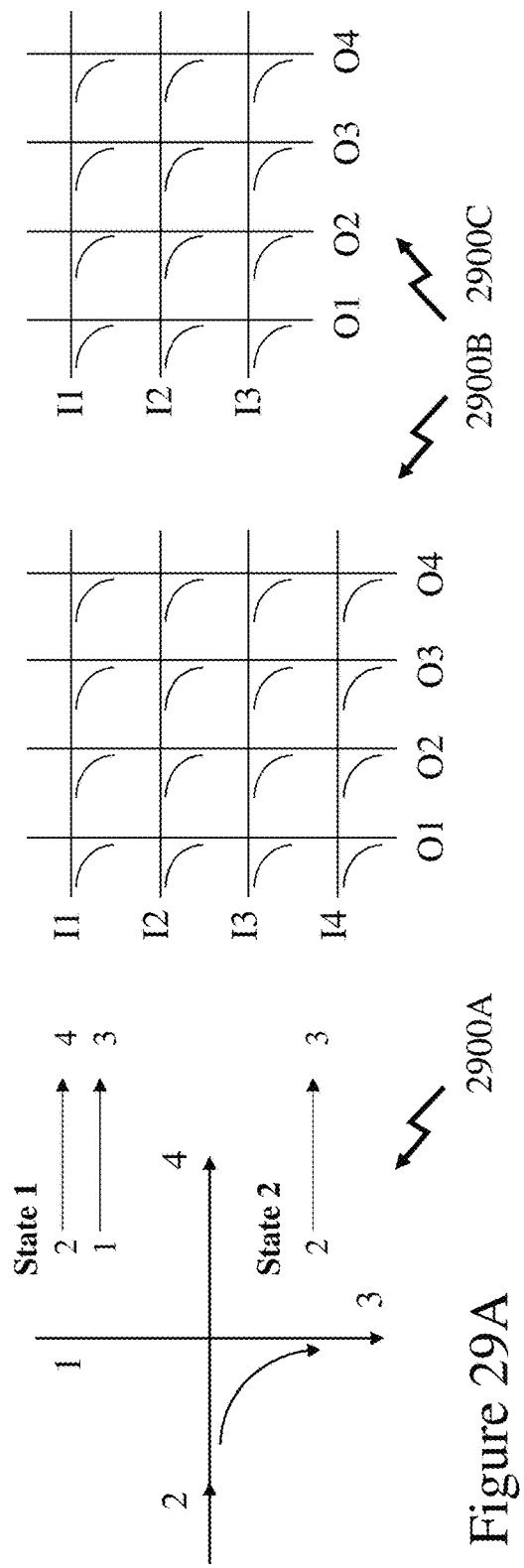
FIG. 29A depicts an 1×2 optical switching element and 4×4/3×4 optical switch matrices employing such an 1×2 optical switching element.
Figure 29B:
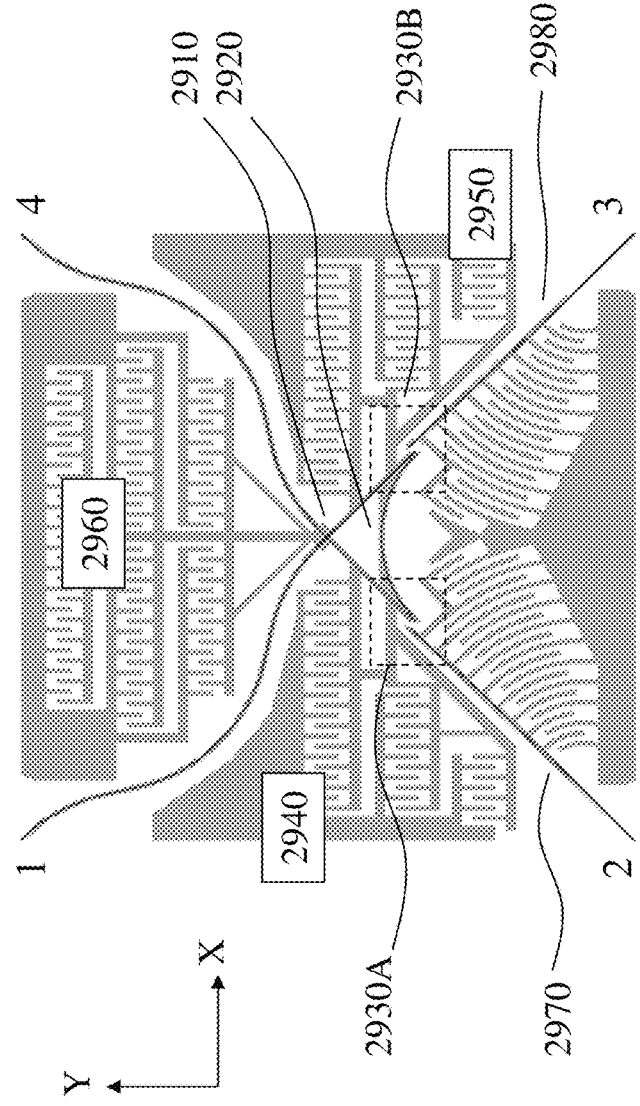
FIG. 29B depicts a linear motion MOEMS based 1×2 optical switching element exploiting the topology depicted in FIG. 29A for the 1×2 switching element according to an embodiment of the invention.

Now referring to FIG. 29A there is depicted in first schematic 2900A an 1×2 optical switching element according to an embodiment of the invention employing an optical switch supporting coupling in a first state of inputs 2/1 to outputs 4/3 respectively and in a second state routing from input 2 to output 3. Such an 1×2 element may then form the basis of a range of M×N optical switch matrices such as the 4×4 and 3×4 optical switch matrices depicted in second and third schematics 2900B and 2900C respectively. Referring to FIG. 29B there is depicted a linear motion MOEMS based 1×2 optical switching element exploiting the topology depicted in FIG. 29A for the 1×2 switching element according to an embodiment of the invention. As depicted first and second MEMS actuators 2940 and 29560 respectively provide lateral motion (X-axis) of a suspended MOEMS platform including curved waveguide 2920 and crossover 2910 whilst third MEMS actuator 2950 provides for movement of the suspended MOEMS platform in the Y-axis.

Figure 30:
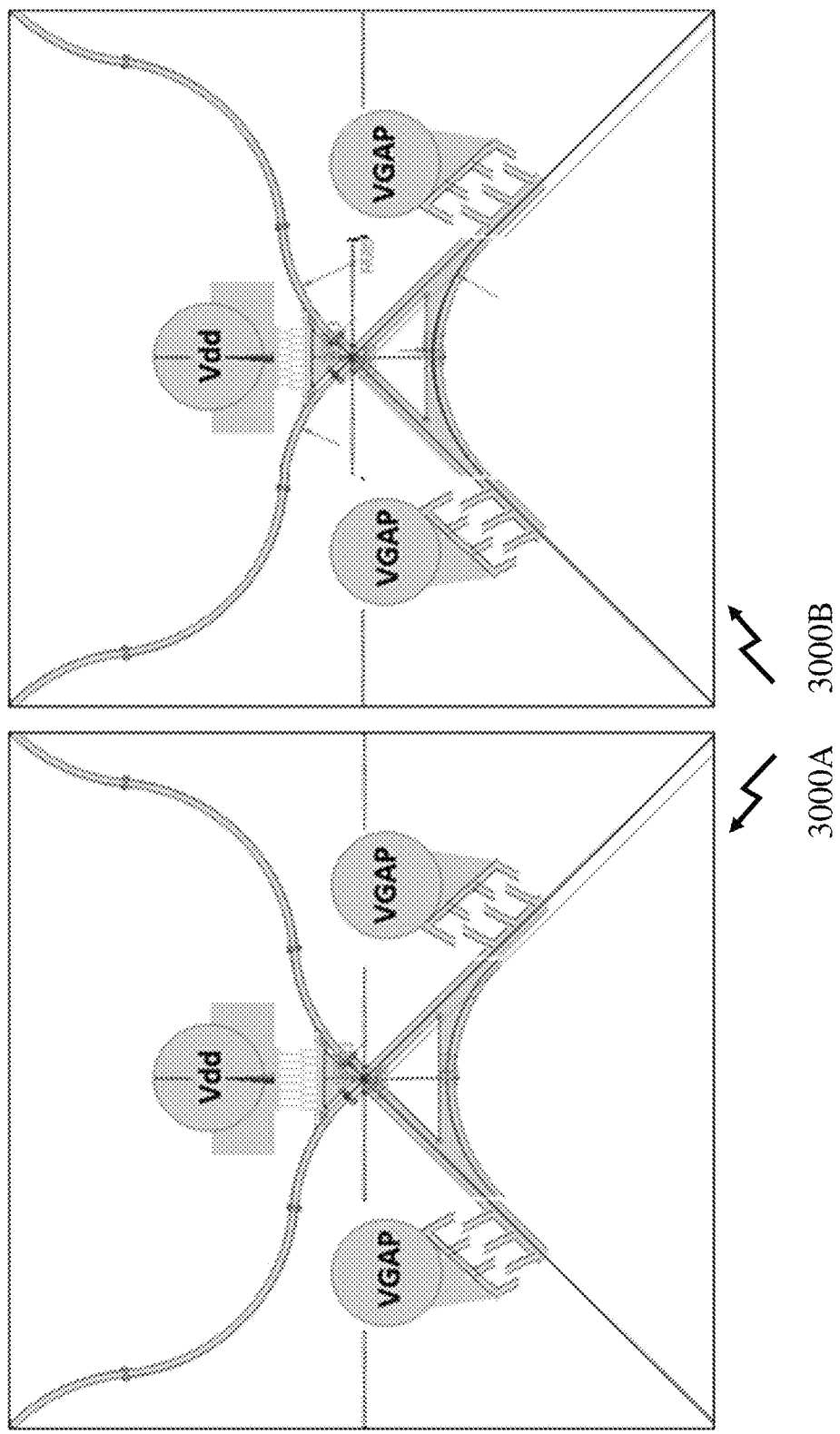
FIG. 30 depicts the linear motion MOEMS based 1×2 optical switching element depicted in FIG. 29B according to an embodiment of the invention in bar and cross-states wherein the waveguides are shown with a gap for clarity.
Figure 31:
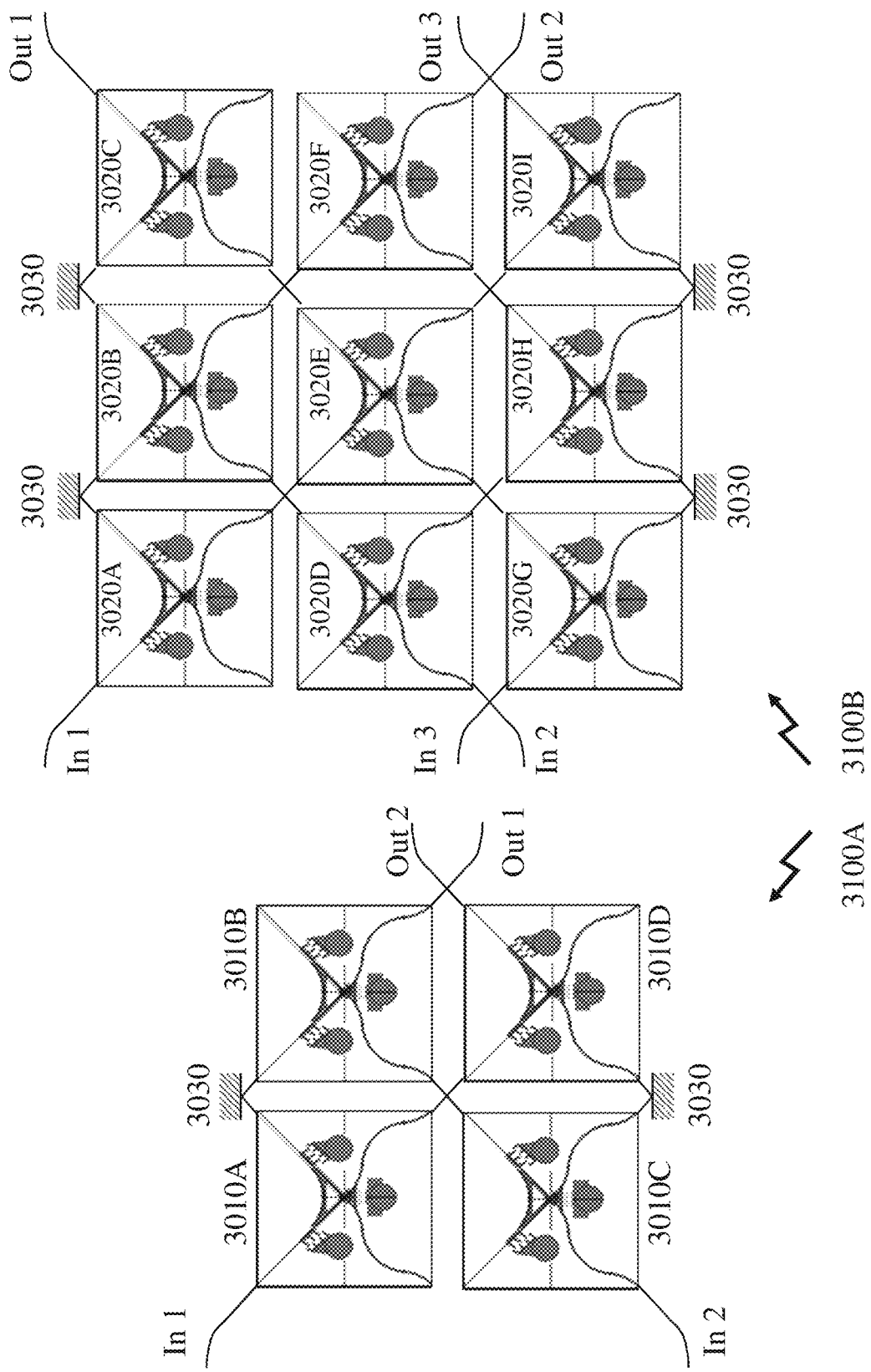
FIG. 31 depicts 2×2 and 3×3 optical switching circuits according to an embodiment of the invention exploiting linear motion MOEMS based 1×2 optical switching element according to FIGS. 29B and 30.

Accordingly, the waveguides 2970 and 2980 are either coupled to the curved waveguide 2920 or to the straight waveguides and therein the crossover 2910. Accordingly, the MEMS actuators allow the MOEMS based 1×2 optical switching element to be configured as depicted in first schematic 2900A in FIG. 29A into State 1 and State 2. These states being depicted schematically in first and second schematics 3000A and 3000B respectively wherein the linear motion MOEMS based 1×2 optical switching element depicted in FIG. 29B according to an embodiment of the invention may exploit linear butt-coupling in bar and cross-states wherein the waveguides are shown with a gap for clarity such as depicted in respect of fourth schematic 2800D in FIG. 28A or vertical coupling such as depicted in first schematic 2800A in FIG. 28A, Now referring to FIG. 31 there are depicted 2×2 and 3×3 optical switching circuits 3100A and 3100B respectively according to an embodiment of the invention exploiting linear motion MOEMS based 1×2 optical switching element according to FIGS. 29B and 30. The outer waveguide paths of the 1×2 optical switching element pairs 3010A/3010B and 3010C/3010D in the 2×2 optical switching circuit 3100A are coupled via waveguide mirrors 3030. Similarly, within the 3×3 optical switching circuit 3100B the 1×2 optical switching element pairs 3020A/3020B; 3020B/3020C; 3020G/3020H; and 3020H/3020I are similarly coupled by waveguide mirrors 3030. However, now referring to FIG. 32 there is depicted an 8×8 optical switching matrix exploiting linear motion MOEMS based first and second 1×2 optical switching elements 3210 and 3220 such as depicted in FIGS. 29B and 30 according to an embodiment of the invention wherein second 1×2 optical switching elements 3220 is an inverted design of first 1×2 optical switching elements 3210. Accordingly, the optical signals input at any input are coupled to their respective output ports by a single MOEMS activation and the optical switch matrix operates in a Path Independent LOSS (PILOSS) configuration.

Figures 32, 33:
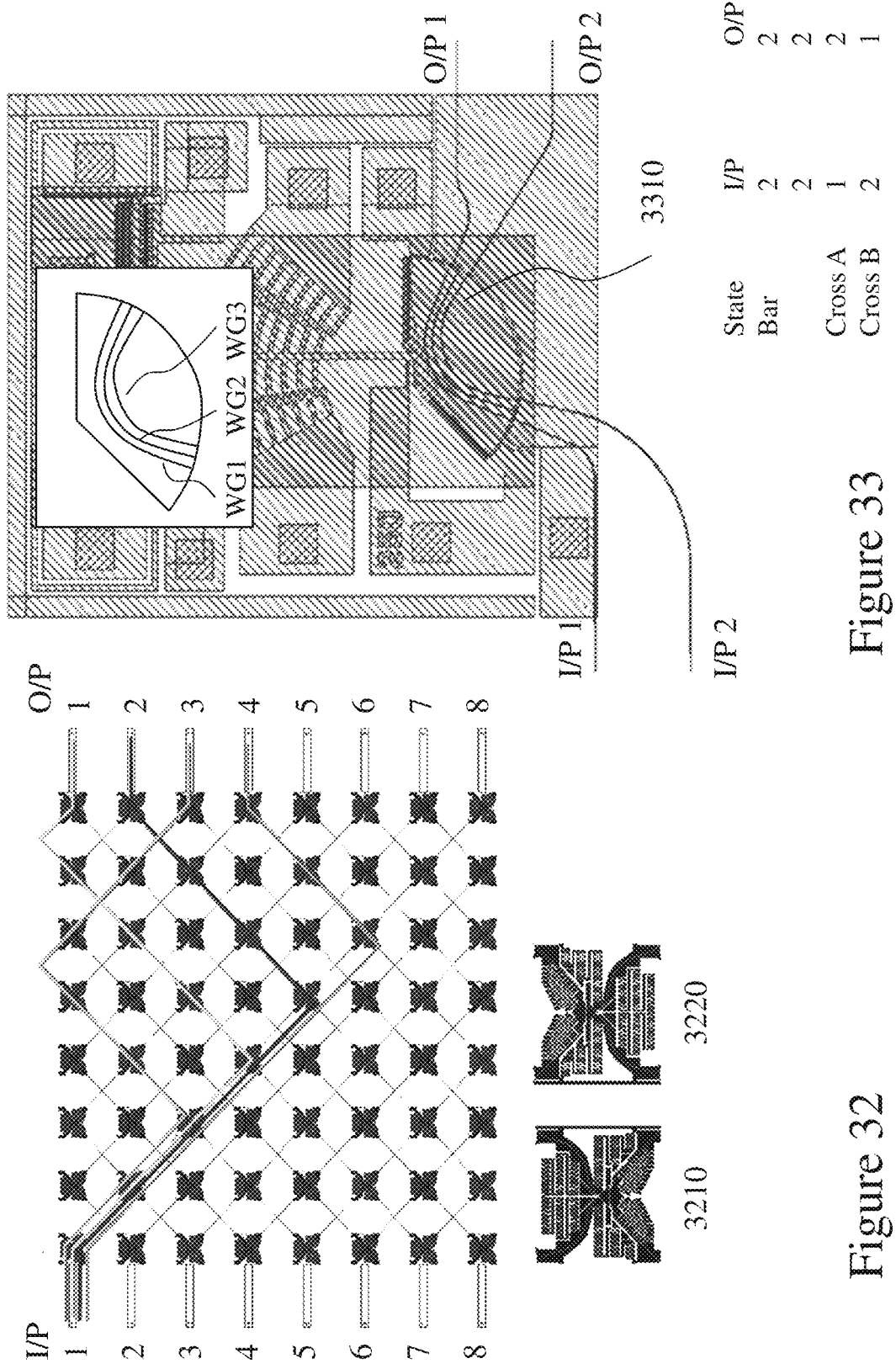
FIG. 32 depicts an 8×8 optical switching matrix exploiting linear motion MOEMS based 1×2 optical switching element depicted in FIG. 29B according to an embodiment of the invention to provide Path Independent Loss (PILOSS) switching.
FIG. 33 depicts a rotary motion MOEMS based 2×2 blocking optical switching element according to an embodiment of the invention.

Now referring to FIG. 33 there is depicted a rotary motion MOEMS based 2×2 blocking optical switching element according to an embodiment of the invention which performs similar routing as that depicted within FIG. 29B. Accordingly, a rotary MOEMS element 3310 rotates such that the circular section rotates around its center of rotation coupling the waveguides on it with the inputs, U/P 1 and I/P 2, and outputs O/P 1 and O/P 2. Disposed upon the rotary MOEMS element 3310 are first to third waveguides WG1, WG2, and WG3 respectively. Accordingly, the connectivity of the rotary motion MOEMS based 2×2 optical switching element is given by Table 2 below.

TABLE 2

Connectivity of Rotary Motion MOEMS based 2 × 2 Optical Switching Element

| Configuration | Input | Link | Output |
| --- | --- | --- | --- |
| A | I/P 1 | WG 1 | O/P 1 |
|   | I/P 2 | WG 3 | O/P 2 |
| B | I/P 1 | WG 2 | O/P 2 |
|   | I/P 2 | N/C | N/C |
| C | I/P 1 | N/C | N/C |
|   | I/P 2 | WG 2 | O/P 1 |

Figure 34:
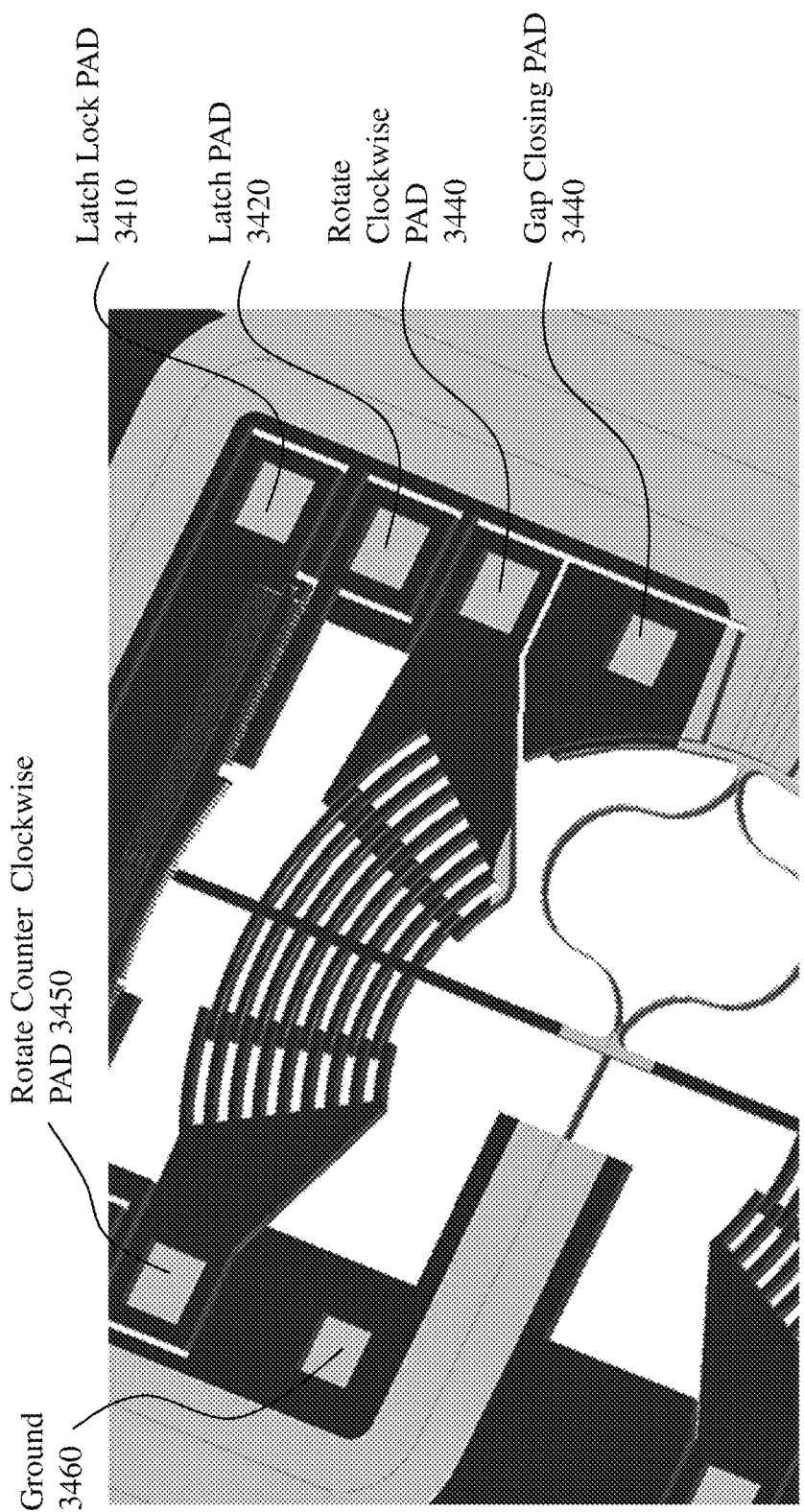
FIGS. 34 and 35 depict a rotary motion MOEMS based 1×5 optical switching element according to an embodiment of the invention.
Figure 35:
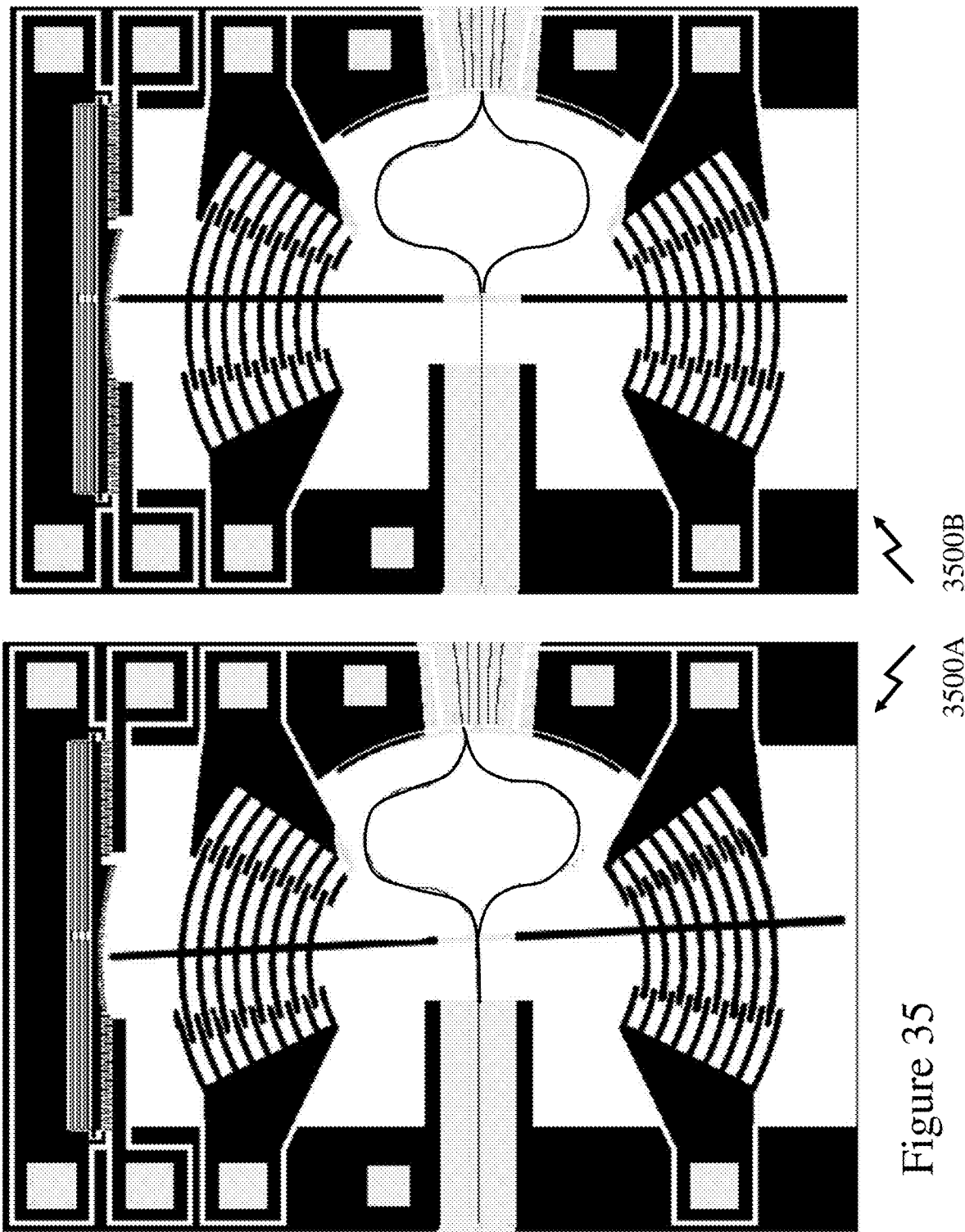

Now referring to FIGS. 34 and 35 there are depicted schematics of a rotary motion MOEMS based 1×5 optical switching element according to an embodiment of the invention. As depicted in FIG. 34 the electrical connections to the MOEMS are:

Latch lock pad 3410;
Latch pad 3420;
Rotate clockwise pad 3430;
Gap closing pad 3440;
Rotate counter clockwise pad 3450; and
Ground 3460.

Figure 36:
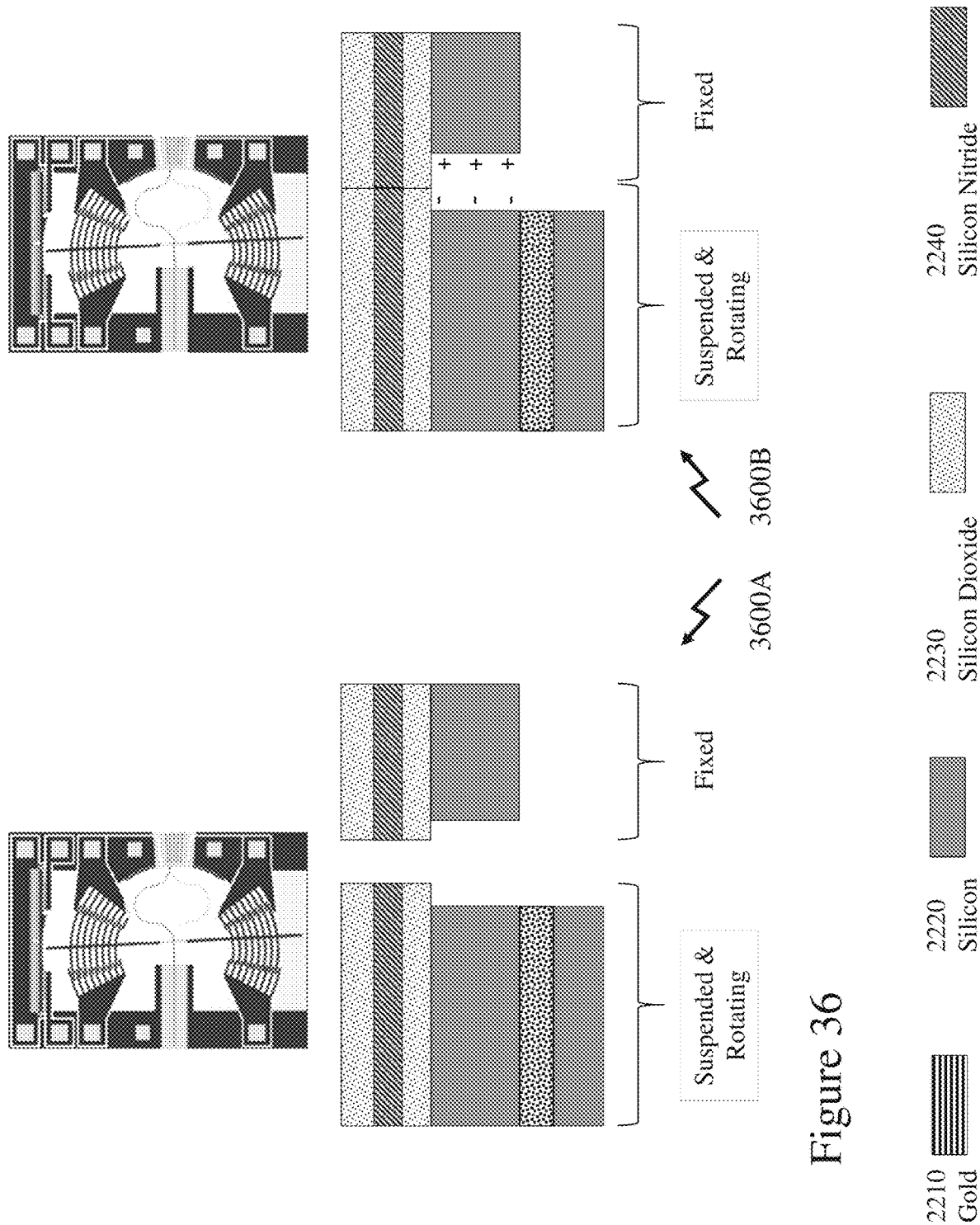
FIG. 36 depicts electro-static gap closing within a rotary motion MOEMS based 1×5 optical switching element according to an embodiment of the invention.

Referring to FIG. 35 the rotary motion MOEMS based 1×5 optical switching element is depicted coupled to the first and third waveguides respectively in first and second schematics 3500A and 3500B respectively. Now referring to FIG. 36 there are depicted first and second electro-static gap closing schematics within a rotary motion MOEMS based 1×5 optical switching element according to an embodiment of the invention and as compatible with other rotary motion MOEMS based optical switching elements and circuits. In first schematic 3600A the suspend and rotating MOEMS element and fixed MOEMS element are uncharged (or may be similarly charged) when the rotating MOEMS element may be moved relative to the fixed MOEMS element. In contrast, in second schematic 3600B the rotating and fixed MOEMS elements are oppositely charged such that they are attracted to each other.

Referring to FIG. 37 there is depicted a variant of electro-static gap closing is depicted compatible with linear or rotary motion MOEMS based optical switching elements according to an embodiment of the invention. In contrast to the configuration depicted in FIG. 36 the fixed element silicon has been etched such that the profile of the silicon is sloped such that as the rotating/linear element translates the optical waveguide structure is raised, if it has dropped, to the same level as the optical waveguide on the fixed element.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An optical device comprising:
a first non-suspended portion supporting an input optical waveguide;
a second non-suspended portion supporting a plurality of output optical waveguides;
a suspended portion disposed between the first non-suspended portion and the second non-suspended portion comprising:
a pivot coupled to a substrate of the optical device;
a beam comprising:
a first suspended waveguide portion disposed between the pivot and the first non-suspended portion;
a second suspended waveguide portion disposed between the pivot and the second non-suspended portion having a first end coupled to the pivot and a second distal end where the beam for the second suspended waveguide portion is split in two between the first end and the second end; and
a waveguide disposed upon the first suspended waveguide portion and the second suspended waveguide portion coupled at a first end to the input optical waveguide and having a second end at the second distal end of the second suspended waveguide portion for coupling optical signals from the input optical waveguide to an output optical waveguide of the plurality of output optical waveguides; and
a first microelectromechanical systems (MEMS) actuator mechanically coupled to the pivot; wherein
the waveguide is disposed upon one of the split portions of the beam between the first end of the second suspended waveguide portion and the second distal end of the second suspended waveguide portion; and the second distal end of the second suspended waveguide portion is translated relative to the second non-suspended portion by the first MEMS actuator to align the second end of the waveguide with the output optical waveguide of the plurality of output optical waveguides.

2. The optical device according to claim 1, further comprising a second MEMS actuator mechanically coupled to the pivot and disposed to another side of the suspended portion to that of the first MEMS actuator.

3. The optical device according to claim 2, wherein
the first MEMS actuator is a first rotational actuator; and
the second MEMS actuator is a second rotational actuator.

4. The optical device according to claim 1, wherein
the waveguide is optically coupled to another output optical waveguide of the plurality of output optical waveguides by the appropriate action of the first MEMS actuator.

5. The optical device according to claim 1, wherein
the first MEMS actuator is a rotational actuator.

6. The optical device according to claim 1, wherein
the second distal end of the second suspended waveguide portion is attracted to the second non-suspended portion when the second distal end of the second suspended waveguide portion and the second non-suspended portion are oppositely charged to close a gap between the second distal end of the second suspended waveguide portion and the second non-suspended portion; and the second distal end of the second suspended waveguide portion can be moved relative to the second non-suspended portion when the second distal end of the second suspended waveguide portion and the second non-suspended portion are either uncharged or similarly charged.

7. The optical device according to claim 1, wherein
each of the split portions of the beam between the first end of the second suspended waveguide portion and the second distal end of the second suspended waveguide portion have a curved geometry; and the split portions are disposed on either side of an axis of the suspended portion between the first end of the second suspended waveguide portion and the second distal end of the second suspended waveguide portion.

8. A method of optical switching of an optical device comprising:
providing a first non-suspended portion supporting a plurality of input optical waveguides;
providing a second non-suspended portion supporting a plurality of output optical waveguides;
providing a suspended portion disposed between the first non-suspended portion and the second non-suspended portion comprising:
a pivot coupled to a substrate of the optical device;
a beam comprising:
a first suspended waveguide portion disposed between the pivot and the first non-suspended portion;
a second suspended waveguide portion disposed between the pivot and the second non-suspended portion having a first end coupled to the pivot and a second distal end where the beam for the second suspended waveguide portion is split in two between the first end and the second end; and
a waveguide disposed upon the first suspended waveguide portion and the second suspended waveguide portion coupled at a first end to the input optical waveguide and having a second end at the second distal end of the second suspended waveguide portion for coupling optical signals from the input optical waveguide to an output optical waveguide of the plurality of output optical waveguides; and providing a first microelectromechanical systems (MEMS) actuator mechanically coupled to the pivot; wherein the waveguide is disposed upon one of the split portions of the beam between the first end of the second suspended waveguide portion and the second distal end of the second suspended waveguide portion; and the second distal end of the second suspended waveguide portion is translated relative to the second non-suspended portion by the first MEMS actuator to align the second end of the waveguide with the output optical waveguide of the plurality of output optical waveguides.

9. The method of optical switching according to claim 8, further comprising
providing a second MEMS actuator mechanically coupled to the pivot and disposed to another side of the suspended portion to that of the first MEMS actuator.

10. The method of optical switching according to claim 9, wherein
providing the first MEMS actuator comprises providing a first rotational actuator; and
providing the second MEMS actuator comprises providing a second rotational actuator.

11. The method of optical switching according to claim 8, wherein the waveguide is optically coupled to another output optical waveguide of the plurality of output optical waveguides by the appropriate action of the first MEMS actuator.

12. The method of optical switching according to claim 8, wherein
providing the first MEMS actuator comprises providing a rotational actuator.

13. The method of optical switching according to claim 8, wherein
the second distal end of the second suspended waveguide portion is attracted to the second non-suspended portion when the second distal end of the second suspended waveguide portion and the second non-suspended portion are oppositely charged to close a gap between the second distal end of the second suspended waveguide portion and the second non-suspended portion; and the second distal end of the second suspended waveguide portion can be moved relative to the second non-suspended portion when the second distal end of the second suspended waveguide portion and the second non-suspended portion are either uncharged or similarly charged.

14. The method of optical switching according to claim 8, wherein
each of the split portions of the beam between the first end of the second suspended waveguide portion and the second distal end of the second suspended waveguide portion have a curved geometry; and the split portions are disposed on either side of an axis of the suspended portion between the first end of the second suspended waveguide portion and the second distal end of the second suspended waveguide portion.

15. An optical device comprising:
a first non-suspended portion supporting M input optical waveguides;
a second non-suspended portion supporting N output optical waveguides;
a suspended portion disposed between the first non-suspended portion and the second non-suspended portion comprising:
- a pivot coupled to a substrate of the optical device;
- a beam comprising:
  - a first suspended waveguide portion disposed between the pivot and the first non-suspended portion;
  - a second suspended waveguide portion disposed between the pivot and the second non-suspended portion having a first end coupled to the pivot and a second distal end where the beam for the second suspended waveguide portion is split in two between the first end and the second end; and
- M waveguides disposed upon the first suspended waveguide portion and the second suspended waveguide portion coupled at a first end to the M input optical waveguides and at a second end at the second distal end of the second suspended waveguide portion for coupling optical signals from the M input optical waveguides to a subset of the N output optical waveguides; and
a first microelectromechanical systems (MEMS) actuator mechanically coupled to the pivot; wherein
the second distal end of the second suspended waveguide portion is translated relative to the second non-suspended portion to align the M waveguides with the subset of the N output optical waveguides.

16. The optical device according to claim 15, wherein the M waveguides are optically coupled to another subset of the N output optical waveguides by the appropriate action of the first MEMS actuator.

17. The optical device according to claim 15, further comprising a second MEMS actuator mechanically coupled to the pivot and disposed to another side of the suspended portion to that of the first MEMS actuator.

18. The optical device according to claim 15, wherein
the second distal end of the second suspended waveguide portion is attracted to the second non-suspended portion when the second distal end of the second suspended waveguide portion and the second non-suspended portion are oppositely charged to close a gap between the second distal end of the second suspended waveguide portion and the second non-suspended portion; and
the second distal end of the second suspended waveguide portion can be moved relative to the second non-suspended portion when the second distal end of the second suspended waveguide portion and the second non-suspended portion are either uncharged or similarly charged.

19. The optical device according to claim 15, wherein
each of the split portions of the beam between the first end of the second suspended waveguide portion and the second distal end of the second suspended waveguide portion have a curved geometry; and
the split portions are disposed on either side of an axis of the suspended portion between the first end of the second suspended waveguide portion and the second distal end of the second suspended waveguide portion.

* * * * *